United States Patent [19]
Phillips et al.

[11] Patent Number: 5,590,696
[45] Date of Patent: Jan. 7, 1997

[54] INFLATION SYSTEM UTILIZING A PRESSURIZED GAS INFLATION DEVICE AND ADAPTOR THEREFOR

[75] Inventors: Matthew L. Phillips, N. Easton, Mass.; Bert D. Heinzelman, Tenafly, N.J.; Paul J. Mulhauser, New York, N.Y.; David R. Schiff, Highland Park, N.J.; Christopher Brooks, Glen Head, N.Y.; Stanley H. Remiszewski, Bolton, Mass.

[73] Assignee: Reebok International Ltd., Stoughton, Mass.

[21] Appl. No.: 274,861

[22] Filed: Jul. 14, 1994

[51] Int. Cl.⁶ .................................................. B65B 31/00
[52] U.S. Cl. ............................. 141/47; 141/19; 141/95; 141/98; 222/3; 222/5; 36/29
[58] Field of Search ........................... 141/19, 38, 39, 141/47, 95, 98, 318, 329; 222/3, 5; 441/41, 94; 36/88, 29, 71; 604/70, 71; 623/56

[56] References Cited

U.S. PATENT DOCUMENTS

| | | | |
|---|---|---|---|
| 710,674 | 10/1902 | Fassmann | 74/101 |
| 1,071,271 | 8/1913 | Spangler | 137/516.29 |
| 1,444,189 | 2/1923 | Key | 222/525 |
| 1,802,523 | 4/1931 | Morangier | 222/525 |
| 2,016,113 | 10/1935 | Lambert et al. | 221/73.5 |
| 2,036,695 | 4/1936 | Heigis | 221/73.5 |
| 2,205,938 | 6/1940 | Ward | 221/74 |

(List continued on next page.)

FOREIGN PATENT DOCUMENTS

| | | | |
|---|---|---|---|
| 8305004 | 4/1985 | Brazil | A43B 13/20 |
| 3205264A1 | 8/1983 | Germany | B60S 5/04 |
| 3511379A1 | 2/1986 | Germany | F41B 11/06 |

OTHER PUBLICATIONS

Innovations in Cycling, Inc., Interbike™ Buyer Official Show Guide, 10th Ann. Interbike 1991 Int'l. Bicycle Expo.

Mega MicroBlast $CO_2$ Air Dispenser, Date Unknown.

*Primary Examiner*—Henry J. Recla
*Assistant Examiner*—Steven O. Douglas
*Attorney, Agent, or Firm*—Sterne, Kessler, Goldstein & Fox

[57] ABSTRACT

The present invention is an inflation system utilizing an inflation device and an adaptor therefor. The inflation device includes a cylindrical housing which receives a pressurized cartridge of gas, a head unit, and a nozzle. The head unit of the device includes structure for creating and delivering a metered bolus of gas per each actuation of the device. The device audibly indicates to the user when a single bolus of gas has been successfully delivered to an inflatable bladder. In another aspect of the invention, an elastomeric inflation port which serves as an adaptor for connecting the inflation device of the invention to an inflatable bladder is provided. The inflation port of the invention may also function as a fluid release mechanism to vent fluid from the bladder.

29 Claims, 38 Drawing Sheets

U.S. PATENT DOCUMENTS

| | | | |
|---|---|---|---|
| 2,498,596 | 2/1950 | Wallach | 222/3 |
| 2,533,685 | 12/1950 | Nurkiewicz | 169/31 |
| 2,574,028 | 11/1951 | Fields et al. | 222/5 |
| 2,575,908 | 11/1951 | Clifford | 152/415 |
| 2,717,100 | 9/1955 | Engelder | 222/5 |
| 2,860,634 | 11/1958 | Duncan et al. | 128/206 |
| 2,878,683 | 3/1959 | Huthsing, Sr. et al. | 74/101 |
| 3,080,094 | 3/1963 | Modderno | 222/82 |
| 3,548,869 | 12/1970 | Weise et al. | 137/516.29 |
| 3,658,208 | 4/1972 | Hansen | 222/3 |
| 3,685,176 | 8/1972 | Rudy | 36/71 |
| 3,776,227 | 12/1973 | Pitesky et al. | 128/203 |
| 3,834,433 | 9/1974 | Thompson | 141/392 |
| 4,054,163 | 10/1977 | Brown, Jr. et al. | 141/291 |
| 4,168,015 | 9/1979 | Robinette | 222/3 |
| 4,180,960 | 1/1980 | Wasserman et al. | 141/329 |
| 4,370,997 | 2/1983 | Braithwaite et al. | 137/116.3 |
| 4,489,855 | 12/1984 | Boetger | 222/5 |
| 4,616,622 | 10/1986 | Milliman | 124/73 |
| 4,658,869 | 4/1987 | Soon-Fu | 141/98 |
| 4,662,412 | 5/1987 | Swallert | 141/284 |
| 4,694,850 | 9/1987 | Fumino | 137/318 |
| 4,709,686 | 12/1987 | Taylor et al. | 124/67 |
| 4,773,454 | 9/1988 | Kroh et al. | 141/330 |
| 4,778,595 | 10/1988 | Sable et al. | 210/119 |
| 4,865,009 | 9/1989 | Ford et al. | 124/76 |
| 4,934,543 | 6/1990 | Schmidt | 215/228 |
| 4,969,493 | 11/1990 | Lee | 141/38 |
| 5,012,954 | 5/1991 | Will | 222/5 |
| 5,020,395 | 6/1991 | Mackey | 141/19 |
| 5,022,565 | 6/1991 | Sturman et al. | 222/396 |
| 5,290,319 | 3/1994 | Phillips | 623/56 |
| 5,329,975 | 7/1994 | Heitel | 141/19 |

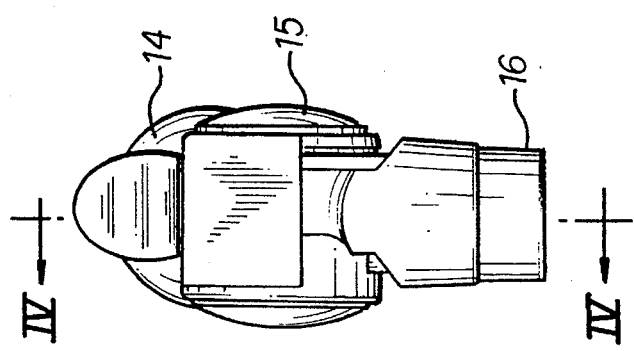
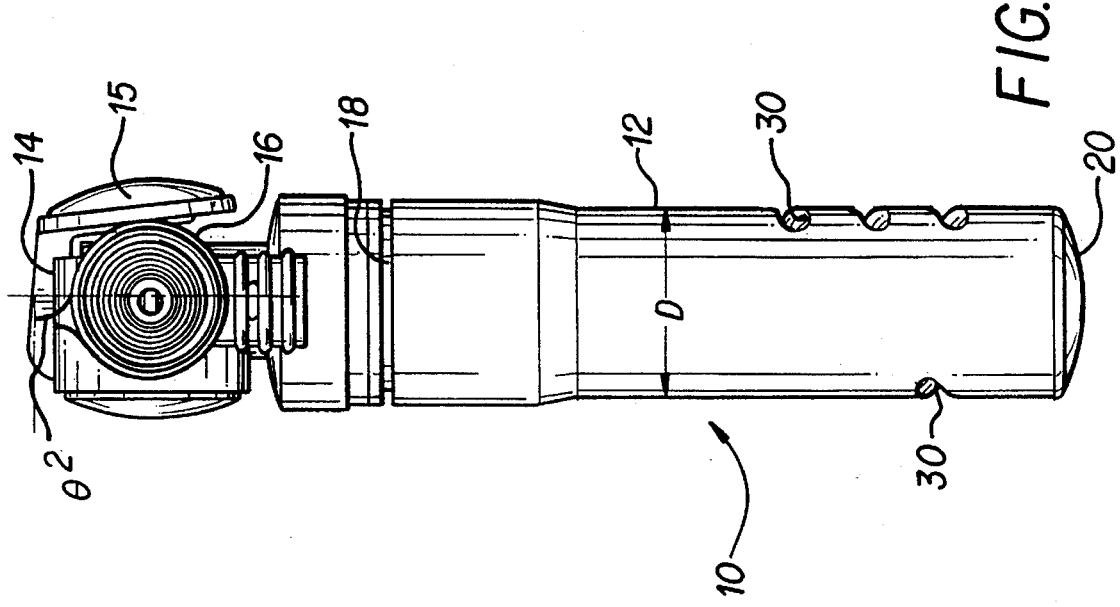
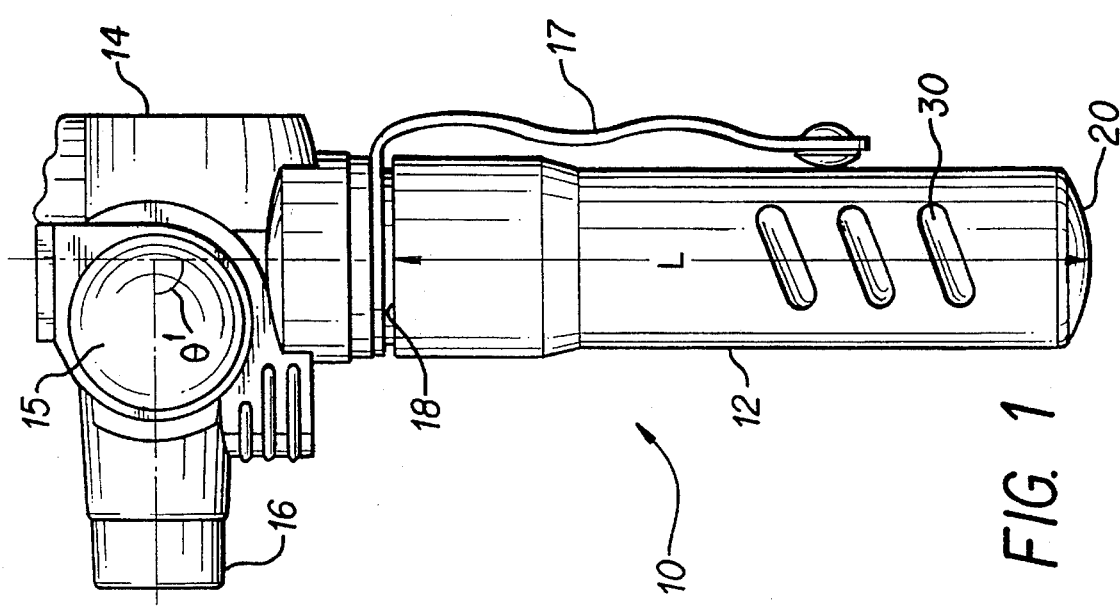

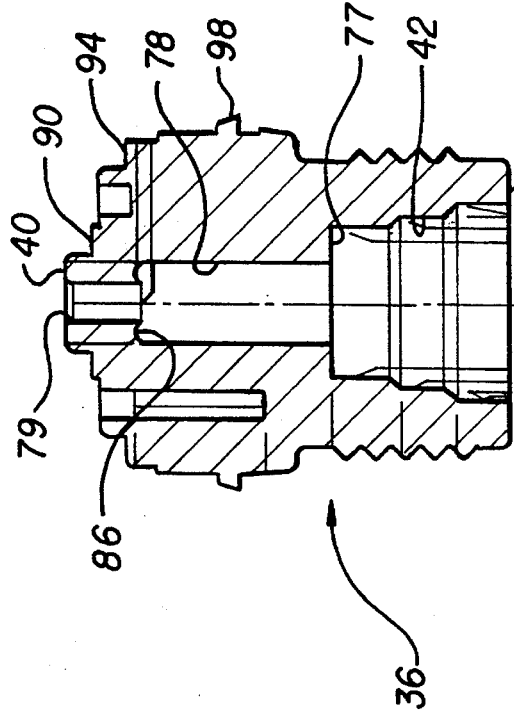
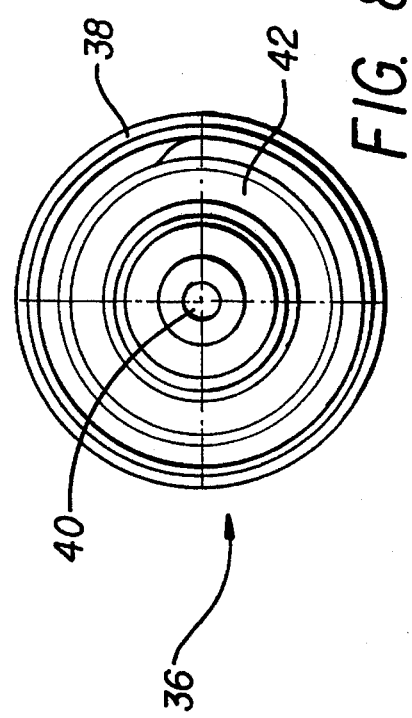
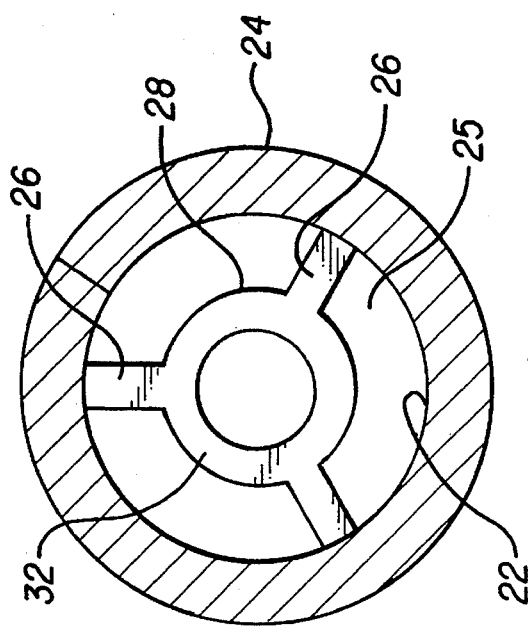

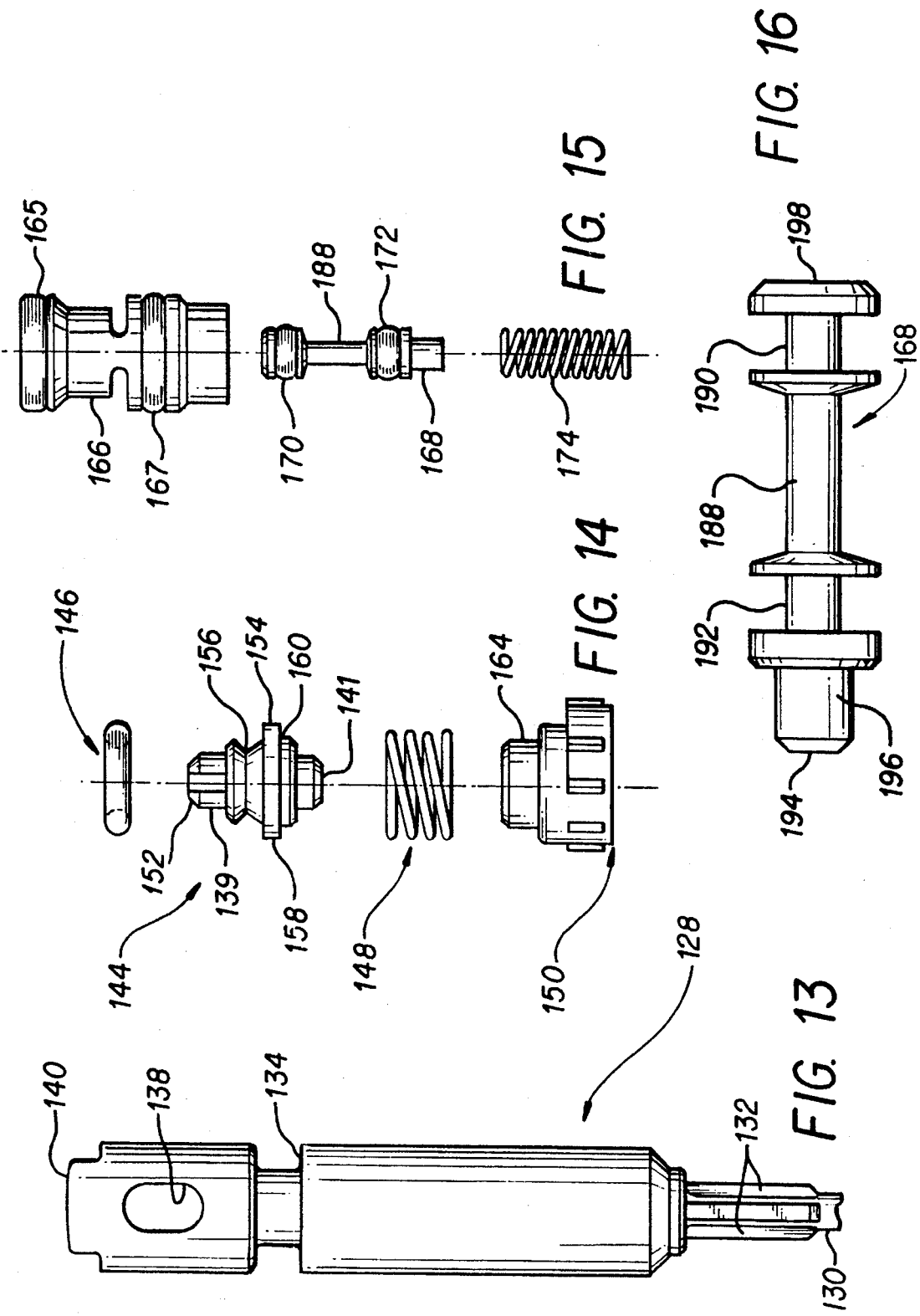

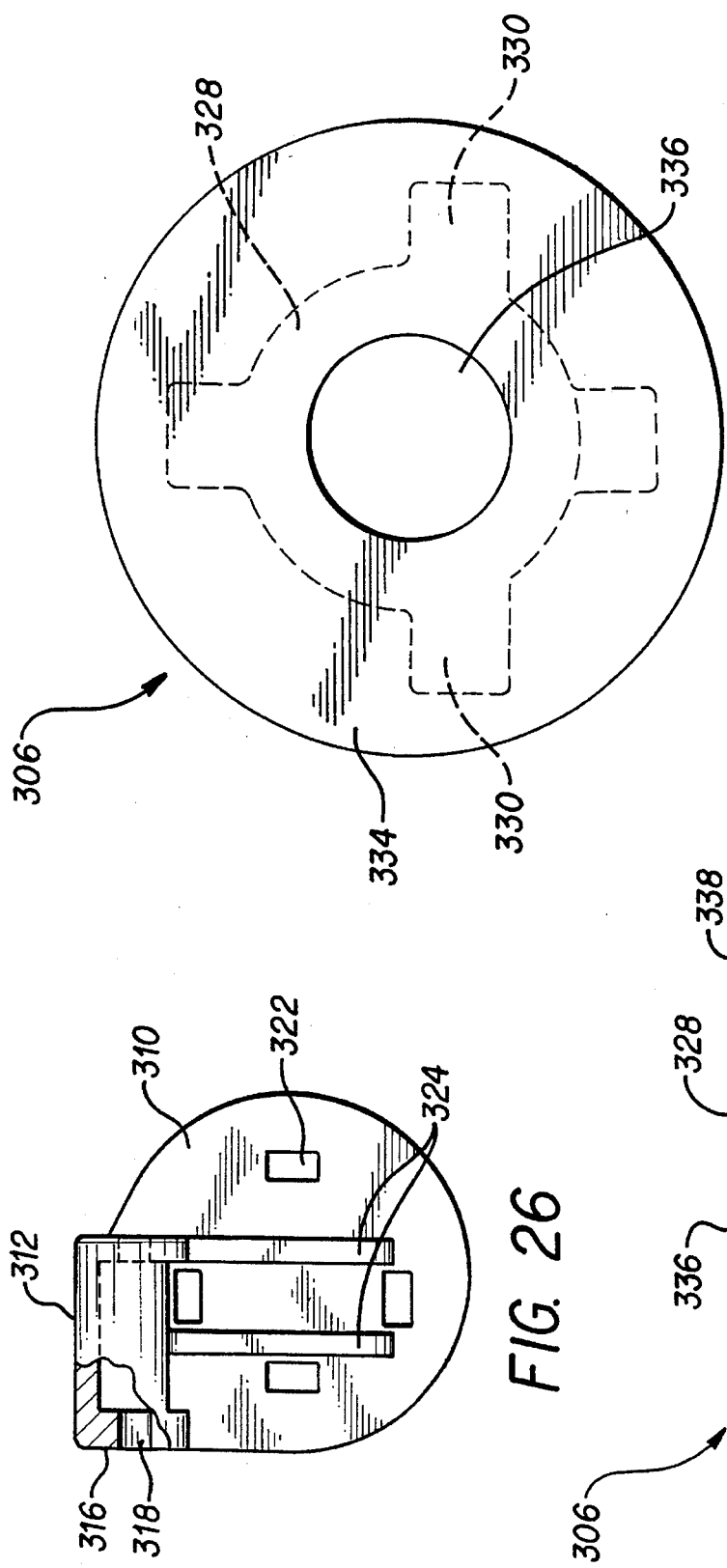

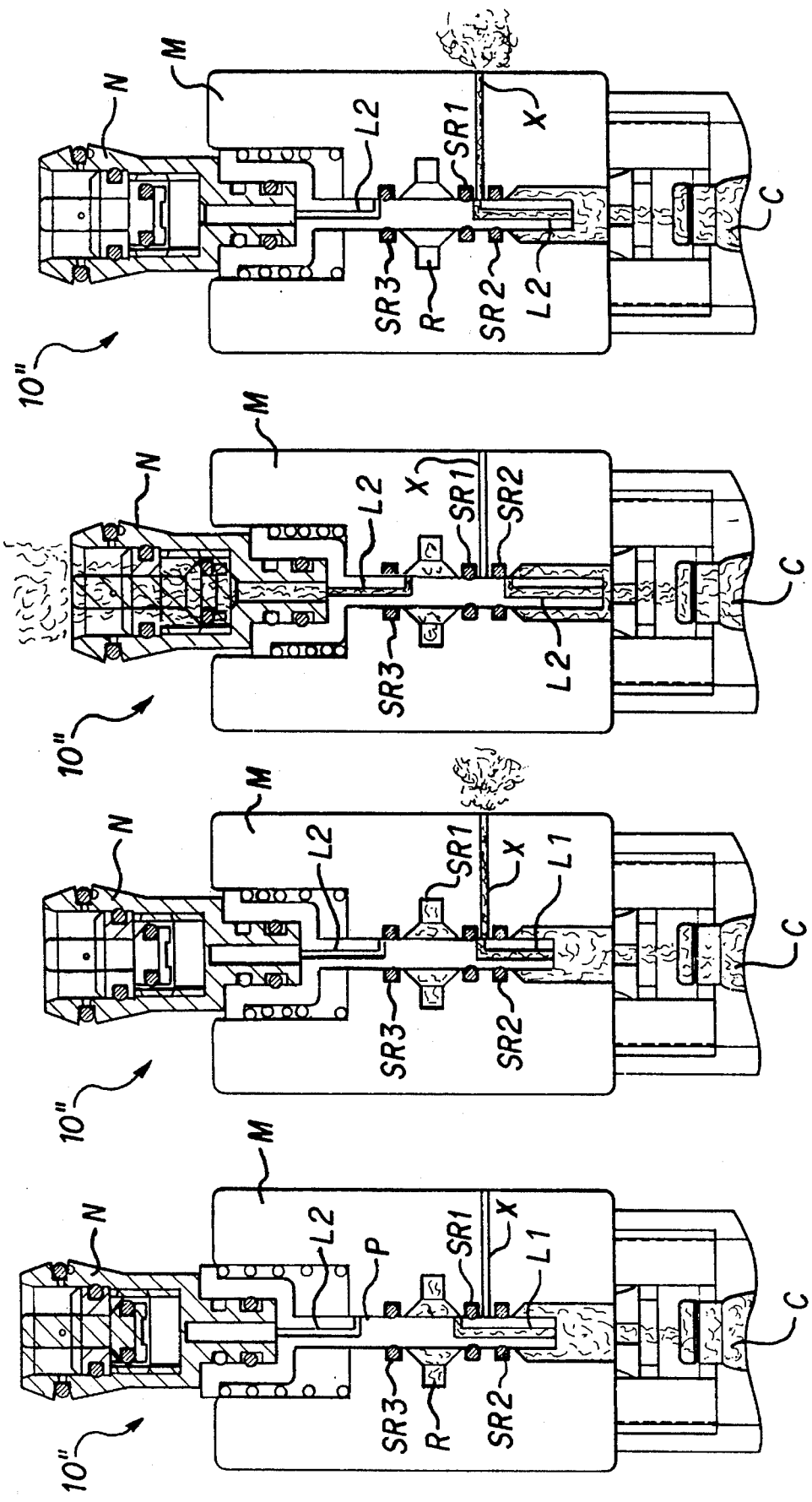

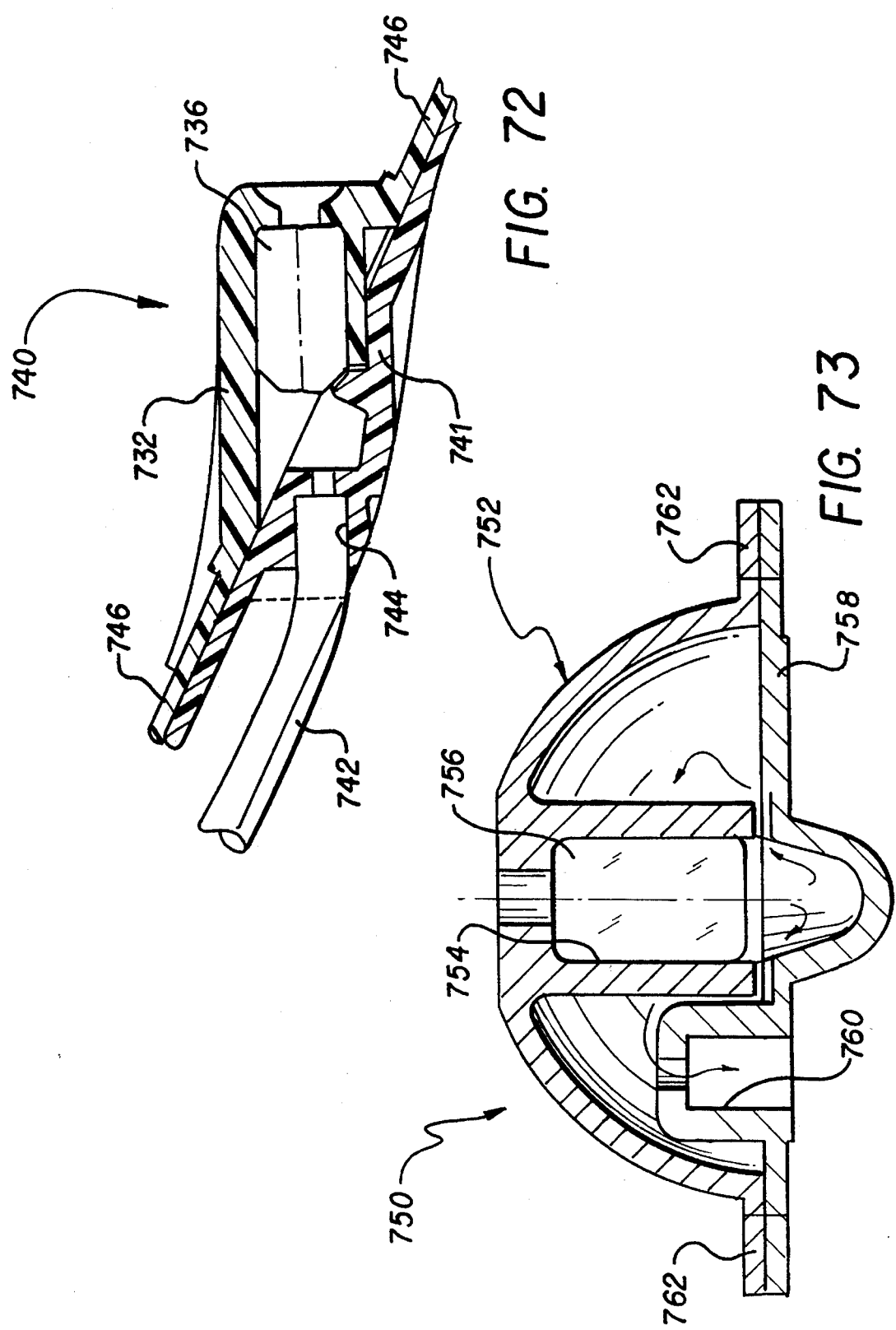

5,590,696

INFLATION SYSTEM UTILIZING A PRESSURIZED GAS INFLATION DEVICE AND ADAPTOR THEREFOR

BACKGROUND OF THE INVENTION

1. Field of the Invention

The present invention relates to an inflation system which utilizes a pressurized gas inflation device and an adaptor therefor. More particularly, the invention relates to an inflation device which includes a means for delivering a metered bolus of gas to an inflatable article of manufacture.

2. Related Art

Over the years, the use of inflatable bladders within consumer products as a means for providing cushioning or support to the user has increased. For example, inflatable bladders are now incorporated into athletic shoes, protective athletic equipment (such as shin guards, shoulder pads and helmets), weight belts, mattresses and casts for setting broken bones. Concurrent with this increase, further development of devices for inflating these products has occurred. Numerous inflation devices or pumps are known in the art. Bulb-type pumps or syringes have been used for many years to inject air into various articles of manufacture, including inflatable air mattresses, blood-pressure cuffs and atomizers. U.S Pat. No. 451,643 to Schoettl discloses such a bulb-type pump for use with a perfume or medicinal atomizer.

More recently, bulb-type pumps have been applied to inflatable athletic shoes for inflation purposes. U.S. Pat. No. 5,158,767 to Cohen discloses such a pump for use with an athletic shoe. The pump of the Cohen patent includes a preshaped top layer attached to a substantially flat bottom layer. The top and bottom layers are formed from urethane sheets which may be easily welded to the exterior surface of an inflatable bladder. One end of the pump is in fluid communication with the atmosphere, while the other end is fluidicly connected to the bladder of the athletic shoe. The bladder of the athletic shoe is inflated by depressing the top surface of the pump to force ambient air into the bladder. The pump is generally lightweight and is located on the upper of the shoe so that it may be easily accessed by the user.

A similar bulb-type pump for inflating an inflatable bladder is disclosed in U.S. Pat. No. 5,074,765 to Pekar. The device of the Pekar patent utilizes a pump which includes an open-sided dome member heat-sealed about an aperture provided in the top layer of the bladder. The pump includes a flapper-type inlet valve in fluid communication with the atmosphere, and a duck bill-type outlet valve which is fluidly connected to the bladder. Fluid is introduced into the bladder by depressing and releasing the top of the dome.

In an effort to obtain rapid inflation of an inflatable bladder, other inflation mechanisms utilizing a source of pressurized gas (specifically $CO_2$ gas) have been developed. U.S. Pat. No. 4,773,545 to Kroh discloses such a device for inflating a tire. The device of the Kroh patent includes (among other things) a cartridge of pressurized gas and an inflating head. The inlet of the inflating head is connected to the cartridge of pressurized gas via a cartridge housing. The outlet of the inflating head is threaded so that it may be connected to the valve of a tire, particularly a bicycle tire. Although the device of the Kroh patent is capable of rapid inflation at high pressures, the internal valve assembly of the Kroh device is complex in nature and, therefore, expensive to manufacture.

Still another inflation device which utilizes a self-contained source of pressurized gas is disclosed in U.S. Pat. No. 5,012,954 to Will. The inflation system of the Will patent is specifically structured for use with bicycle tires incorporating SCHRADER™ or PRESTA™ type valves. Unfortunately, the device of the Will patent is not capable of regulating the flow of gas passing through the device to prevent overinflation of the associated bladder. Therefore, the volume of the cartridge to be used with the Will device must match the capacity of the bladder to be inflated.

Although pressurized gas inflation devices are capable of rapid inflation, in some instances, these devices may be easily modified for unintended purposes. For example, it has been discovered that the nozzles of certain inflation devices may be removed with minimal effort to restructure the device as an air gun, for example.

Still other devices are inefficient in that successful inflation of a bladder is dependent on the technique of the user or the interconnection between the nozzle and an inflation port.

It was with these and other concerns in mind that the present invention was developed. Accordingly, it is an object of the present invention to provide a pressurized gas inflation device with a variety of safety features which prevent the user from modifying the structure of the device or discharging gas from the device in an otherwise dangerous manner.

It is another object of the present invention to provide a pressurized gas inflation device with a means for creating and delivering a metered bolus of gas to an inflatable bladder per a single actuation of the device. Such a delivery concept enhances the efficiency of the device by reducing the amount of gas wasted by the user due to improper inflation techniques or overinflation of the associated bladder.

It is an another object of the present invention to provide a pressurized gas inflation device with a connecting means for creating an air-tight seal between the nozzle of the device and an inflation port. It is a further object that this air-tight seal be easily accomplished and tactually perceived by the user.

Still another object of the present invention is to provide a pressurized gas inflation device with a pressure relief function to guard against overinflation of an inflatable bladder.

Yet another object of the present invention is to provide a pressurized gas inflation device which accommodates either a right or left handed user. Further, the device must be ergonomically designed to optimize ease of use for difficult to reach areas or while the user is sitting, standing, or kneeling.

Another object of the present invention is to provide an inflation device with a means for audibly indicating to the user that a bolus of gas has been successfully delivered to the inflatable bladder.

Yet another object of the present invention is to provide an inflation port for an inflatable bladder having a low profile.

Another object of the present invention is to provide a combined inflation port and fluid release mechanism which occupies a minimal area of an inflatable bladder.

Still another object of the present invention is to provide a combined inflation port and fluid mechanism which is relatively easy (and thus inexpensive) to manufacture.

SUMMARY OF THE INVENTION

In accordance with the objectives of the present invention as described above, the present invention is a inflation device comprising a source of pressurized gas, a head unit, a nozzle, and a housing for maintaining the source of pressurized gas in fluid communication with the head unit of the device. The head unit includes an inlet, an outlet and a passageway extending therebetween. A means for creating and delivering a metered bolus of gas to the nozzle of the device is positioned within the passageway of the head unit. The inflation device may also include a means for relieving a build-up of excess pressure within the device. The pressure relieving means may include a poppet, a spring and a plug. The inflation device may also be provided with a means for indicating to the user that a bolus of gas has been successfully delivered to the bladder. The means for creating and delivering a bolus of gas to the nozzle may include a sleeve, a piston housed within the sleeve, a spring positioned in contact with the piston, and a fluid reservoir which accommodates a metered volume of gas. The components of the inflation device may be attached by application of ultrasonic energy. The components may be injection molded from glass-filled plastic. The inflation device may also include a lever which is in direct contact with an actuation piston. The device may include a valve assembly which controls the flow of fluid from the source of pressurized gas to the head unit. The valve assembly may include a sealing ring, a valve ball and a spring. The inflation device may also include a safety pin which prevents the release of gas from the device when the nozzle of the device is not coupled to an inflation valve of an inflatable bladder. The nozzle of the device may be provided with an elastomeric collar which engages in a fluid-tight manner with an inflation valve of an inflatable bladder. The nozzle may be fitted with a hollow inflating needle assembly.

In another aspect, the present invention is an inflation system including a bladder, an inflation port attached to the exterior layer of the bladder and an inflation device. The inflation port includes an exterior housing, a seat and a valve assembly for controlling fluid flow into and out of the port. The inflation device includes a canister of pressurized gas, a head unit, a housing for maintaining said canister of pressurized gas in fluid communication with the head unit, and a nozzle. The head unit includes a means for creating and delivering a metered volume of gas to the nozzle of the device.

The inflation device may include a means for relieving a build-up of excess pressure within the device. The bladder may be incorporated into a shoe.

In another aspect, the present invention is an inflation device including a source of pressurized gas, a head unit, a nozzle, and a housing for maintaining the source of pressurized gas in fluid communication with the head unit of the device. The head unit further includes a first valve assembly for controlling the flow of fluid from the canister to the head unit and a second valve assembly for controlling the flow of fluid from the head unit to the nozzle.

In still another aspect of the invention, an inflation port is provided. The inflation port includes an exterior housing, a valve assembly and a seat. The exterior housing includes an annular groove which receives the nozzle of an inflation device and a concentric side wall.

In yet another aspect of the invention, an inflation port which includes a gland, an elastomeric valve and a stop member is provided. The valve is positioned within the gland and includes a conforming means which conforms about an inflating needle of an inflation device.

BRIEF DESCRIPTION OF THE FIGURES

Various objects, features and attendant advantages of the present invention will be more fully understood from the following description of the present invention when considered in connection with the accompanying drawings, in which:

FIG. 1 is a left side elevational view of the inflation device of the present invention;

FIG. 2 is a front elevation view thereof;

FIG. 3 is a top plan view thereof;

FIG. 5 is a top plan view of the canister housing;

FIG. 6 is a cross-sectional view of the lower manifold of the device taken along line VI—VI of FIG. 7;

FIG. 7 is a top plan view of the lower manifold;

FIG. 8 is a bottom plan view thereof;

FIG. 13 is a side view of the actuation piston of the device;

FIG. 14 is an exploded view of the pressure relief assembly of the device;

FIG. 15 is an exploded view of the shuttle piston assembly of the device;

FIG. 16 is a side view of the shuttle piston;

FIG. 26 is a rear elevation view thereof;

FIG. 27 is a cross-sectional view of the lever pad of the lever assembly;

FIG. 28 is a top plan view thereof;

FIGS. 43a–43d are schematic drawings of a second alternative embodiment of the present invention;

FIG. 68b illustrates a housing for the fluid release mechanism of FIG. 68a;

FIG. 72 is a cross-sectional view of another inflation gland; and

FIG. 73 is a cross-sectional view of another inflation gland.

DETAILED DESCRIPTION OF THE PREFERRED EMBODIMENT

Inflation Device

Figure 4:
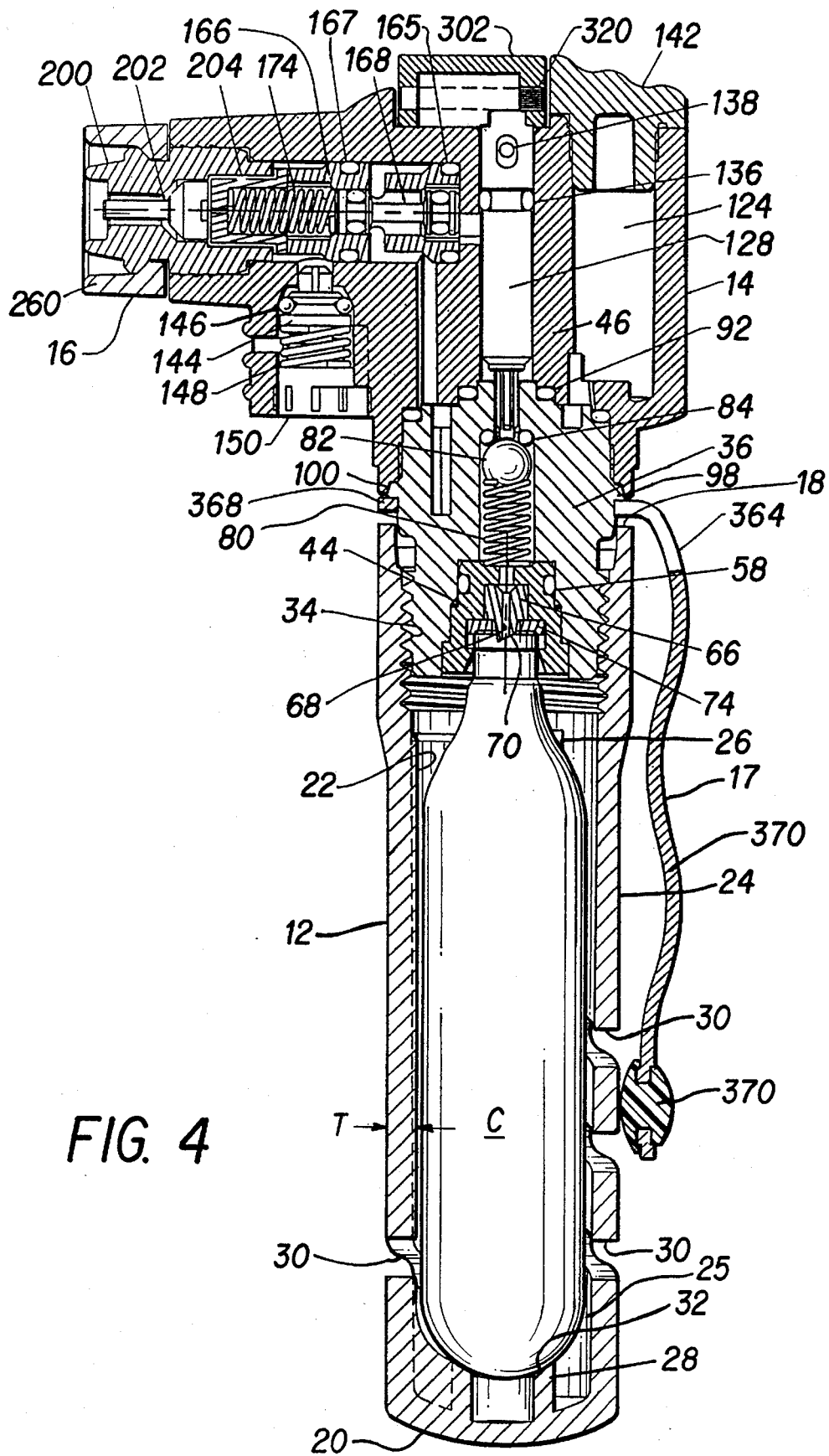
FIG. 4 is a cross-sectional view of the device taken along line IV—IV of FIG. 3.

Reference will be made in detail below to the preferred embodiment of the invention as illustrated in the accompanying drawings. Throughout the following description, similar or identical structure is identified using similar reference numerals.

The inflation device of the present invention is capable of delivering a metered bolus of gas to an inflatable bladder per a single actuation of the device. This delivery technique renders the inflation device of the present invention safe and efficient in that the user releases gas from the device in a metered manner. The inflation device of the present invention makes use of (among other things) a reservoir and non-continuous fluid circuit to create and deliver a "package" or "bolus" of gas to an inflatable bladder in a timed manner. Thus, inflation of the bladder may be monitored by the user as it occurs so that overinflation of the bladder (and waste of gas) may be avoided. In addition, the inflation device of the present invention provides a measure of safety because at no time in the operation of the inflation device is there a direct fluidic circuit between the source of pressurized gas and the nozzle of the inflation device. In other words, the item being inflated never directly "sees" the gas source.

Although the inflation device of the present invention is intended to be used with a canister consisting essentially of $CO_2$ gas, other pressurized gases may by used.

With reference now to FIG. 1, a side elevational view of inflation device 10 is shown. Inflation device 10 is constructed from a number of component parts including a canister housing 12, a head unit 14, a nozzle 16, a lever 15 and a clip 17. Canister housing 12 is structured to receive and maintain a canister of pressurized gas in fluid communication with head unit 14. Head unit 14 contains the various valve assemblies of the device which work together to create and deliver a bolus of gas to the nozzle of the invention. Nozzle 16, attached to the outlet of head unit 14, is structured to safely deliver a bolus of gas to an inflation port of an inflatable bladder. Lever 15 is attached to the upper portion of the head unit and enables either a left or right-handed user to easily activate the device. Clip 17 is attached to the device just above canister housing 12 and provides a means for carrying the device during periods of activity. The component parts of the device will now be separately described in detail below.

I. Canister Housing (FIGS. 1, 2, 4, and 5)

Canister housing 12 of inflation device 10 accomplishes two functions in that it serves as 1) a handle to be gripped by the user and 2) a housing for receiving a pressurized canister of gas. Canister housing 12 is preferably molded in the shape of a cylinder having an open upper end 18 and a closed lower end 20. Housing 12 has an outer diameter D of approximately 1.04 inches (FIG. 2), a length L of approximately 3.98 inches (FIG. 1) and a thickness T of approximately 0.125 inches (FIG. 4) which defines an interior wall 22 and an exterior wall 24.

As shown in FIG. 5, molded along the length of interior wall 22 are three equi-angularly spaced projections 26 which create three equally sized areas 25 which span between a canister C of pressurized gas and interior wall 24. Areas 25 are provided so that gas may pass down the length of housing 12 and out a plurality of vents 30, the function of which will be described in more detail below.

Projections 26 extend vertically from below the threaded portion of upper end 18 to a ring-like hub 28 located at lower end 20. The canister contacting surface of each projection is curved across its transverse axis to conform to the rounded side wall of canister C. Although three projections are illustrated, it should be realized that any number of projections may be provided so long as they do not impede the flow of gas out of vents 30.

Hub 28 has an outer diameter of 0.46 inches and an inner diameter of 0.28 inches which forms a seat 32 for the rounded lower portion of canister C. In addition, the upper end of seat 32 is angled at approximately 30° so that the rounded bottom portion of canister C may sit securely within the hollow interior of hub 28.

Extending through the wall of canister housing 12 are a plurality of vents 30 (see FIGS. 1 and 4). Vents 30 allow gas to escape from within the canister housing in the event that housing member 12 is unscrewed or otherwise separated from head unit 14 while a charged canister of gas is within the device. Vents 30 are approximately 0.60 inches long and 0.16 inches wide and are located near the bottom of housing 12 so that user's hand does not impede the escape of gas to the atmosphere. Although vents 30 are illustrated as oblong-shaped (FIG. 1), it should be realized that vents 30 may take any shape which allows gas to escape from within the interior of the housing. For safety reasons, however, at least two vents should be provided to decrease the pressure of the gas flowing out of any single vent. In addition the size and shape of the vents may be generally selected to minimize the chances that they can be accidentally or purposefully blocked.

Canister housing 12 is preferably injection molded from a lightweight, hard plastic such as 20% glass filled Polycarbonate/Polyethylene Terephthalate. Naturally, other lightweight, rigid plastics capable of being injection molded and ultrasonically welded are equally suitable for forming canister housing 12.

At upper end 18, interior wall 22 of canister housing 12 is threaded (as at 34, FIG. 4) to receive a correspondingly threaded portion of head unit 14.

II. Head Unit

As mentioned above the head unit of the device houses the various valve assemblies of the device which work together to create and deliver a bolus of gas to the nozzle of the device. Head unit 14 comprises a lower manifold 36 and an upper manifold 46. The component parts of the upper and lower manifold will now be discussed.

A. Lower Manifold and its Components (FIGS. 4, 6–11)

Figure 9:
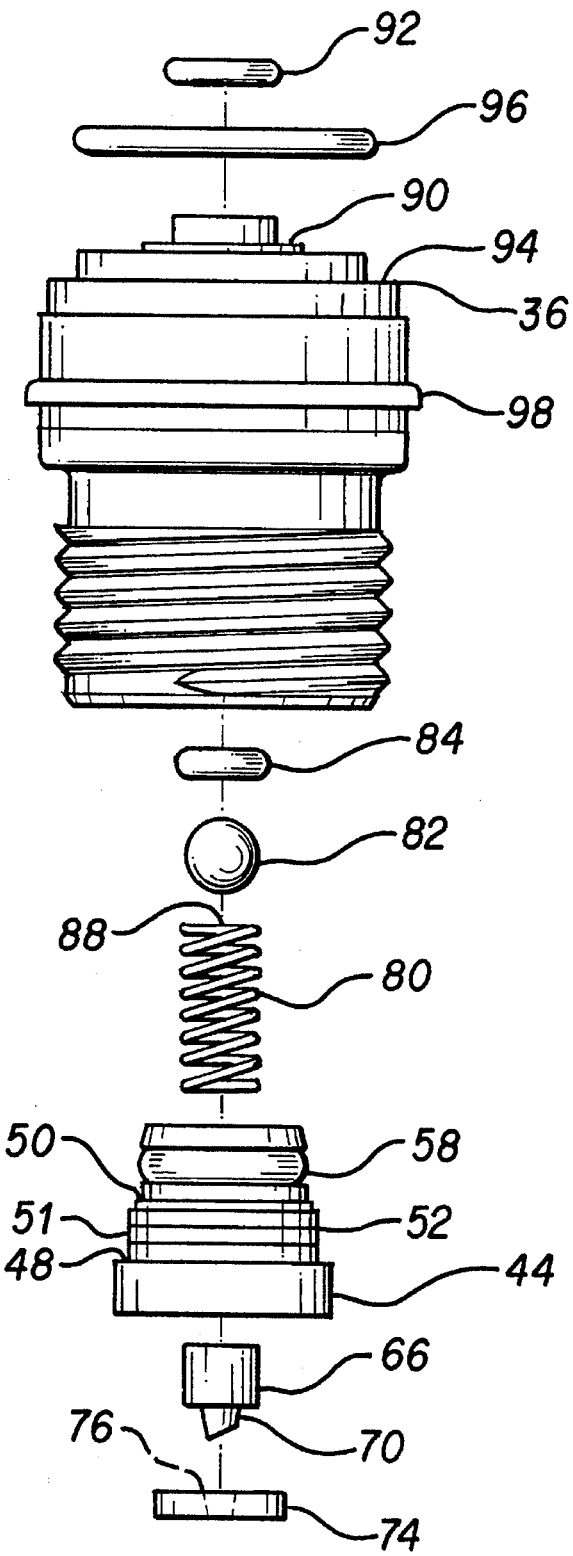
FIG. 9 is an exploded view of the components of the lower manifold.
Figure 10:
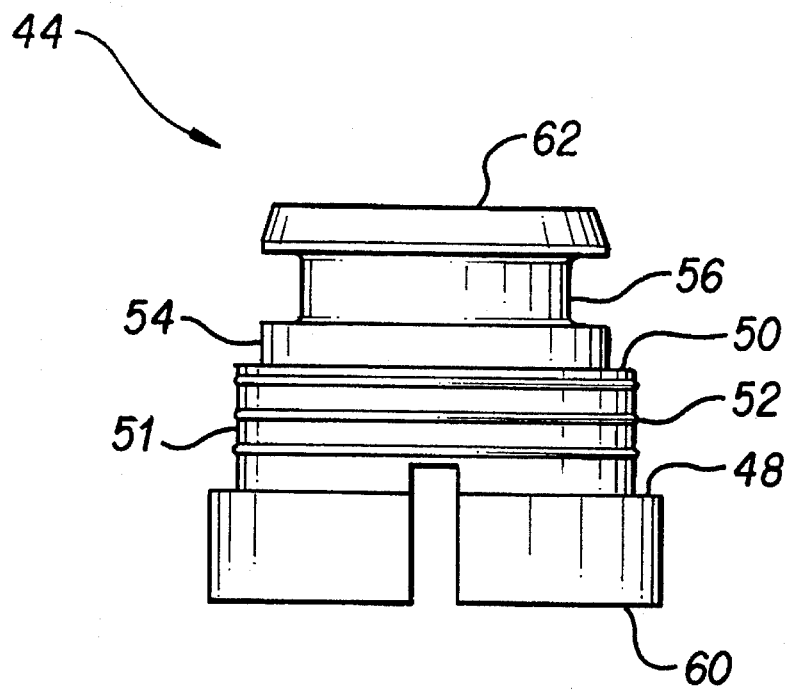
FIG. 10 is a side view of the gas seat of the lower manifold.
Figure 11:
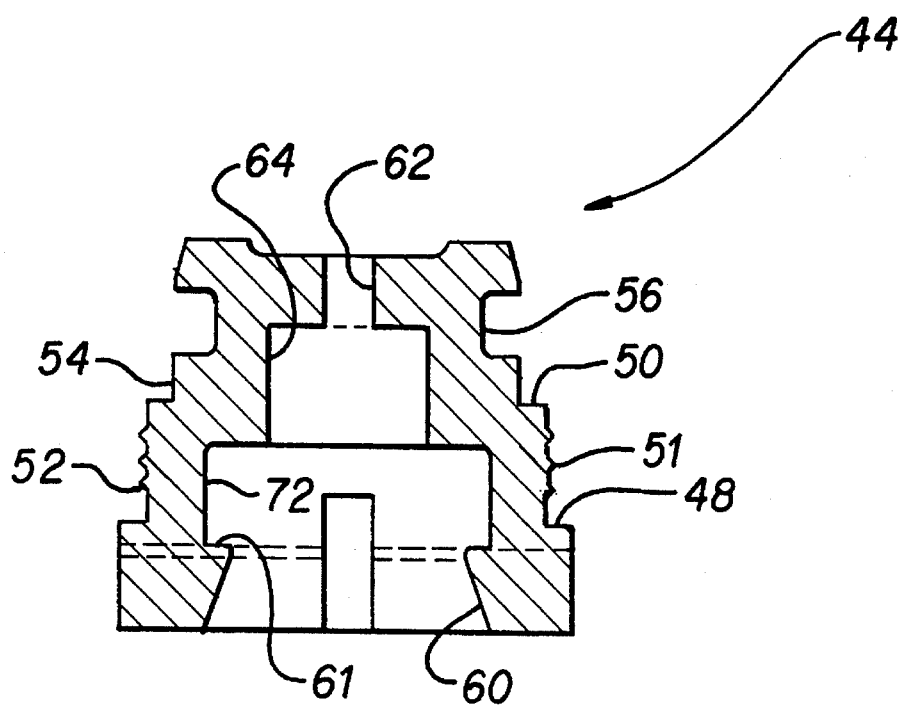
FIG. 11 is a cross-sectional view thereof.

Reference will now be made to the cross-section of lower manifold 36 illustrated in FIG. 6. Lower manifold 36 is preferably injection molded from the same glass-filled plastic used to mold canister housing 12. It includes an inlet 38 in fluid communication with canister housing 12 and an outlet 40 in fluid communication with upper manifold 46. Extending from inlet 38 is a three-diametered main bore 42 which receives a correspondingly dimensioned gas seat 44 formed from brass. Gas seat 44 serves as a housing for the puncturing pin and gasket of inflation device 10. As seen in FIGS. 9 and 11, the exterior surface of gas seat 44 is stepped (as at 48 and 50) to mate with a correspondingly stepped interior surface of main bore 42. On the exterior of middle vertical surface 51, gas seat 44 is provided with several barbs 52 which are captured by plastic when the mating components are ultrasonically welded to the interior surface of lower manifold 36. On its uppermost vertical surface 54, gas seat 44 is provided with an annular groove 56 which receives a sealing ring 58 for sealing gas seat 44 within lower manifold 36 in a fluid-tight manner. Gas seat sealing ring 58 is preferably a 011 Buna N-70A ring.

Bored within gas seat 44 is a centrally-located passageway 61 (FIG. 11) which extends from an inlet 60 to an outlet 62. Press fit within mid-portion 64 of gas seat 44 is a hollow puncturing pin 66 which punctures the sealed neck of canister C when the same is brought into contact with the puncturing pin. Referring to FIG. 9, puncturing pin 66 is preferably formed from a rigid material such as hardened cold-rolled steel or any other material capable of puncturing the sealed neck of canister C. Pin 66 includes a central lumen 68 (FIG. 4) having a diameter of approximately 0.031 inches which allows gas to pass from the canister to the main valve assembly of the lower manifold. Tip 70 of puncturing pin 66 is obliquely cut at 25° to facilitate puncturing of the sealed canister C.

Press-fit into lower portion 72 of gas seat 44 (below puncturing pin 66) is a gasket 74 which conforms about the neck of canister C to prevent leakage of gas about the point of puncture (FIGS. 4 and 9). Gasket 74 is preferably extruded and cut from a conformable urethane. Gasket 74 includes a centrally located aperture 76 which decreases in diameter from its upper surface to its lower surface to receive the tip of puncturing pin 66 in a fluid-tight manner. Inlet 60 of gas seat 44 is angled at approximately 20° to assist in guiding the neck of canister C against gasket 74.

As illustrated in FIG. 6 extending upwardly from main bore 42 of lower manifold 36 is a two-diametered channel 78 which receives the main valve assembly of the inflation device. Channel 78 includes a first end 77 having a first diameter of approximately 0.243 inches and a second end 79 having a second, smaller diameter of approximately 0.108 inches. Second end 79 of channel 78 defines an aperture which allows gas to pass from the lower manifold to the upper manifold when the main valve assembly has been opened.

With reference now to FIGS. 4 and 9, the main valve assembly for controlling the flow of fluid to the remainder of the device is shown. The valve assembly includes a spring 80, a valve ball 82, and a sealing ring 84. The valve assembly is incorporated into the lower manifold (prior to inserting gas seat 44) by first pushing sealing ring 84 against a sealing ring seat 86 formed by the wall of channel 78 (FIG.

6). Seat 86 is rounded to conform in a fluid-tight manner to the curved exterior surface of sealing ring 84 to prevent unintended passage of gas into the upper manifold when the valve assembly is closed. Sealing ring 86 is preferably an 005 TEFLON™ ring. Following insertion of sealing ring 86, valve ball 82 is inserted into channel 78 and positioned beneath the central portion of the sealing ring. The leading end coil 88 of spring 80 is then positioned about the circumference of valve ball 82 and is compressed within channel 78 by inserting gas seat 44. When gas seat 44 is inserted within main bore 42, valve spring 80 biases valve ball 82 against sealing ring 86 to close the valve assembly as shown in FIG. 4.

Valve ball 82 has a diameter of approximately 0.219 inches and is preferably formed from 202 stainless steel. Spring 80 is a stainless steel spring, such as spring #LC-022BC-02-S manufactured by Lee Spring Co.

With reference again to FIG. 6, the exterior surface of lower manifold 36 is dimensioned so that it may be snugly fit within and ultrasonically shear welded to upper manifold 46 of head unit 14. The uppermost surface of lower manifold 36 is provided with a first seat 90 which receives a first lower manifold sealing ring 92. Sealing ring 92 is provided to prevent leakage of gas between the juncture of upper manifold 46 and lower manifold 36. Provided below first seat 90 is a second seat 94 which receives a second lower manifold sealing ring 96 which also prevents gas from leaking out between the lower and upper manifolds when the two are joined together. The sealing rings of the lower manifold are illustrated in an exploded fashion in FIG. 9.

Molded integral with the side wall of lower manifold 36 (below second seat 94) is a beveled extension 98 which extends around the outer periphery of lower manifold 36. Extension 98 sits within a similarly configured groove 100 provided within the interior surface of upper manifold 46 when the lower manifold is inserted into the upper manifold.

Located between first sealing ring seat 90 and second sealing ring seat 94 is a recessed annular ring 104 (FIG. 7) which carries fluid from the central passageway of upper manifold 46 to a fluid reservoir which will be discussed in more detail below. Extending down from annular ring 104 is a plurality of spokes 102 which are provided to reinforce and strengthen the upper portion of the lower manifold.

B. Upper Manifold and its Components (FIGS. 4 and 12–18)

Figure 12A:
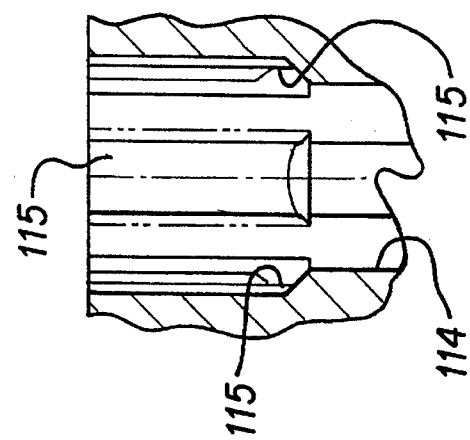
FIG. 12a is an enlarged cross-sectional view of the upper portion of the actuation piston chamber.

With specific reference now to FIGS. 4 and 12, the upper manifold of the device will be described. Upper manifold 46 defines a plurality of passageways which extend either horizontally or vertically within head unit 14 of the device. In the preferred embodiment, upper manifold 46 is injection molded from the same glass-filled plastic used to mold canister housing 12 and lower manifold 36. At its lowermost point, the upper manifold housing defines an inlet 106 which expands into a chamber 108 for receiving the uppermost portion of lower manifold 36. When the lower manifold is inserted into chamber 108, sealing ring 92 of lower manifold 36 abuts against a first surface 110 of upper manifold 46, while sealing ring 96 abuts against a second surface 112. Extending vertically above chamber 108 is a second chamber 114 which receives an actuation piston of the device. The upper portion of chamber 114 (above line X) has an increased diameter to allow residual gas within the chamber to flow out of the top of the device. As can be seen in the enlarged cross-sectional view of FIG. 12a, the wall of chamber 114 is provided with a series of grooves 115 through which gas passes to escape to the atmosphere. This escape of gas out of the top of the device is provided to indicate to the user that a bolus of gas has been successfully delivered to the associated bladder. (This escape of gas to the atmosphere will be addressed again in more detail below.)

With reference again to FIG. 12, branching off in a horizontal manner from piston chamber 114 is a passageway 116 which leads to a main channel 118. The outlet 120 of main channel 118 is dimensioned to receive nozzle 16 of the present invention.

Extending down vertically from main channel 118 is a third chamber 122 which receives the pressure relieving means of the invention. Branching off horizontally from chamber 122 is a blow-off channel 121 which allows gas to escape from the device when the pressure relieving means is activated. Also extending vertically downward from main channel 118 (proximate the piston chamber 114 is a conduit 123. Conduit 123 carries fluid from passageway 116 down to annular ring 104 of lower manifold 36 where it then expands into a fluid reservoir 124 via a second passageway 126. Having described the internal passageways of upper manifold 46, its component parts will now be described in their order of assembly into the manifold.

Figure 12:
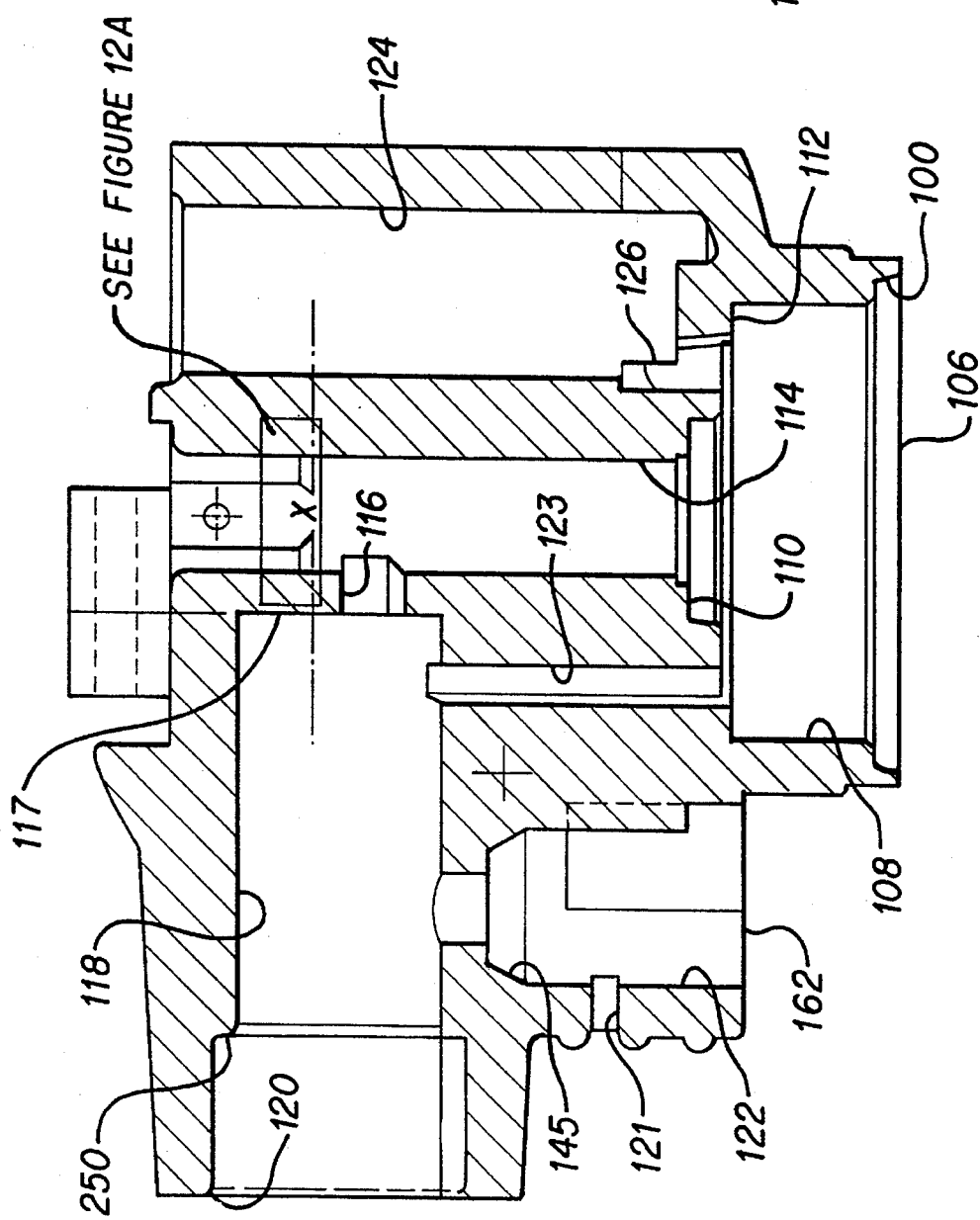
FIG. 12 is a cross-sectional view of the upper manifold of the device.

Turning now to FIGS. 4, 12 and 13, inserted within second chamber 114 is an actuation piston 128 which actuates the device of the invention by opening the main valve assembly housed within lower manifold 36. Piston 128 is preferably injection molded from a plastic such as glass-filled DELRIN™. At its lower end, piston 128 is provided with a stem 130 which comes into contact with valve ball 82 when the piston is depressed by the actuation lever of the device. Integrally molded on the exterior of the stem are several fins 132 which provide a fluid passageway from the lower manifold of the device to passageway 116 via piston chamber 114. At its upper end, piston 128 is provided with an annular groove 134 which receives a piston sealing ring 136 for preventing direct commun of pres gas source to atmosphere. Piston sealing ring 136 is preferably molded from an elastomeric material such as 006 EDPM -80A. Above annular groove 134, piston 128 is provided with a hole 138 which receives a pin (not shown) for maintaining piston 128 in a proper position within the chamber. Upper surface 140 of piston 128 is rounded at a radius of curvature of approximately 0.500 for engagement with the lever of the device when the user's finger or thumb pinches the same.

With continuing reference to FIG. 4, ultrasonically shear welded within the opening of reservoir 124 is a plug 142 for sealing the fluid reservoir of the device. Reservoir plug 142 is preferably injection molded from the same glass-filled plastic used to mold lower manifold 36, for example. It should be realized by those skilled in the art that the volume of fluid reservoir 124 may be modified to some extent by varying the length of the reservoir plug (or filling in the hollow portion of the reservoir).

Fitted within chamber 122 of upper manifold 46 is the pressure relief assembly of the inflation device. As shown in FIGS. 4 and 14, the pressure relief assembly consists of a pressure relief popper 144, a pressure relief sealing ring 146, a spring 148, and a plug 150. Popper 144 is preferably injection molded from a plastic such as Acrylonitrile-Butadiene-Styrene. Poppet 144 includes a flattened stem portion 152 which defines a plurality of airway flats 139 for directing gas to the remaining structure of the popper. Stem portion 152 flairs at the mid-portion of piston 144 to converge with a head portion 154. Head portion 154 is generally circular in plan and includes a planar surface which is perpendicular to stem portion 152. Head portion 154 also includes a groove 156 and a flange 158 which partially forms a spring seat 160. Groove 156 is dimensioned to receive a sealing ring 146 which seals off the pressure relieving mechanism when the same has not been activated by a build-up of excess pressure. Spring seat 160 of piston 144 is dimensioned to receive an end coil of spring 148 so that the spring may be properly positioned beneath the poppet.

Popper 144 is positioned within chamber 122 (FIG. 12) by inserting anterior end 141 of the poppet through outlet 162 of chamber 122. Chamber 122 is dimensioned slightly smaller than that of poppet 144 so that the same may be snugly received within chamber 122. Stem 152 of poppet 144 extends into chamber 122 until sealing ring 146 engages with angled interior portion 145 of chamber 122. When the popper has been properly positioned within the chamber, spring 148 of the pressure relief mechanism is inserted into chamber 122 through outlet 162. The end coil of spring 148 is positioned on spring seat 160 of poppet 144 to properly maintain the spring beneath popper 144.

Following insertion of spring 148, plug 150 is ultrasonically welded into chamber 122 to complete assembly of the pressure relieving mechanism. Plug 150 is provided with a post 164 which fits within the coils of spring 148 to maintain the spring in the proper position. When plug 150 has been properly secured within chamber 122, spring 148 biases piston 144 in the closed position shown in FIG. 4. Plug 150 is preferably injection molded from the same glass-filled plastic used to mold lower manifold 36.

Should the pressure within the device or the associated bladder exceed a predetermined threshold value, the pressure relief mechanism of the device is automatically activated. Activation of the pressure relief assembly will described in more detail below.

Referring now to FIGS. 4, 15, 16, 17, and 17a, the shuttle piston assembly of the present invention will now be described. The shuttle piston assembly consists generally of a shuttle sleeve 166, a shuttle piston 168, and a spring 174 (FIG. 15).

Figure 17:
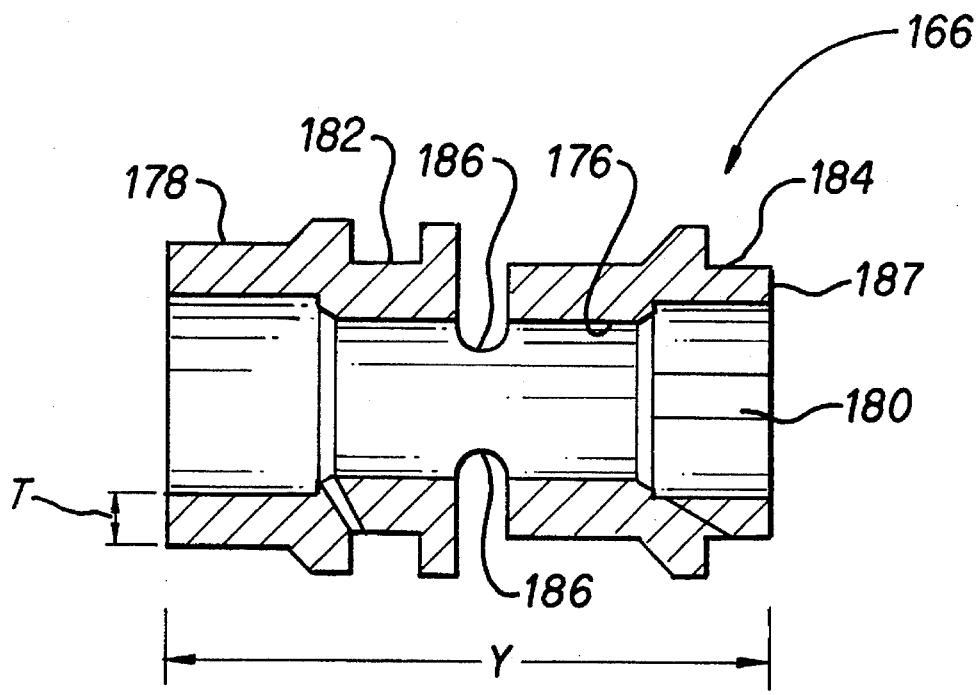
FIG. 17 is a cross-sectional view of the shuttle sleeve.
Figure 17A:
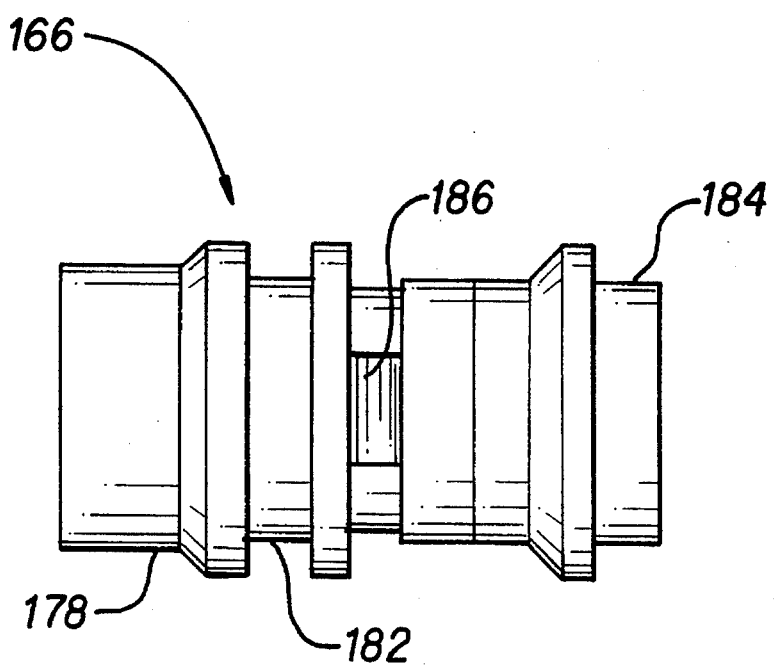
FIG. 17A is a top plan view of the shuttle sleeve.

Shuttle sleeve 166 is preferably injection molded from a TEFLON™-filled plastic such as DELRIN™. Shuttle sleeve 166 is generally cylindrical in shape and has a thickness which defines an interior surface 176 and an exterior surface 178 (FIGS. 17 and 17a). The diameter of the shuttle sleeve is slightly smaller than that of main channel 118 so that the sleeve may be snugly fitted within the channel.

Exterior surface 178 of shuttle sleeve 166 is provided with first and second sealing ring seats 182, 184 which receive corresponding first and second shuttle sleeve sealing rings 165, 167 respectively (FIGS. 15 and 17). Sealing rings 165 and 167 prevent gas from leaking out around shuttle sleeve 166 when the same is inserted into main channel 118.

Throughout its length Y, shuttle sleeve 166 is provided with a central lumen 180 which receives shuttle piston 168 of the assembly. At its mid-section, shuttle sleeve 166 is provided with two opposingly spaced openings 186 which allow gas to flow out of the shuttle sleeve to fill reservoir 124 via conduit 123.

Shuttle sleeve 166 is positioned within upper manifold 46 by pushing the sleeve through the main channel (via outlet 120) until proximal end 187 of sleeve 166 abuts against rear wall 117 channel 118. When the sleeve is positioned within channel 118, central lumen 180 creates a passageway for the flow of gas to the remainder of the device.

Inserted within shuttle sleeve 166 is a shuttle piston 168 (FIGS. 15 and 16). Shuttle piston 168 is screw machined from 303 stainless steel. The main shaft 188 of piston 168 has a diameter of approximately 0.076 inches which allows gas to pass around the piston and out openings 186 of sleeve 166. At both ends, shaft 188 is machined to define two seats 190 and 192 which receive two corresponding sealing rings 170 and 172 (FIG. 15). Sealing rings 170 and 172 function to seal off the various passageways of the upper manifold as the piston moves within the shuttle sleeve during firing of the device. At its distal end 194, piston 168 is provided with a post 196 about which an end coil of shuttle spring 174 is positioned. After positioning sealing rings 170 and 172 within their respective seats, proximal end 198 of piston 168 is inserted into shuttle sleeve 166 (through outlet 120) and pushed against rear wall 117 of main channel 118.

Shuttle spring 174 is then inserted into shuttle sleeve 166 by positioning an end coil of spring 174 about post 196. When the spring is properly inserted within the sleeve, approximately half of spring 174 extends outside of the shuttle sleeve. This half of the spring is housed within a plug of nozzle 16 which is described in more detail below. Shuttle spring 174 is preferably a plated, music wire spring such as spring no. A15–18 from Century Spring Co.

The shuttle assembly of the head unit is maintained within the upper manifold by the nozzle assembly of the device. The components of the nozzle assembly will now be described in detail.

III. The Nozzle (FIGS. 1, 2, 4 and 18–35)

Figure 18:
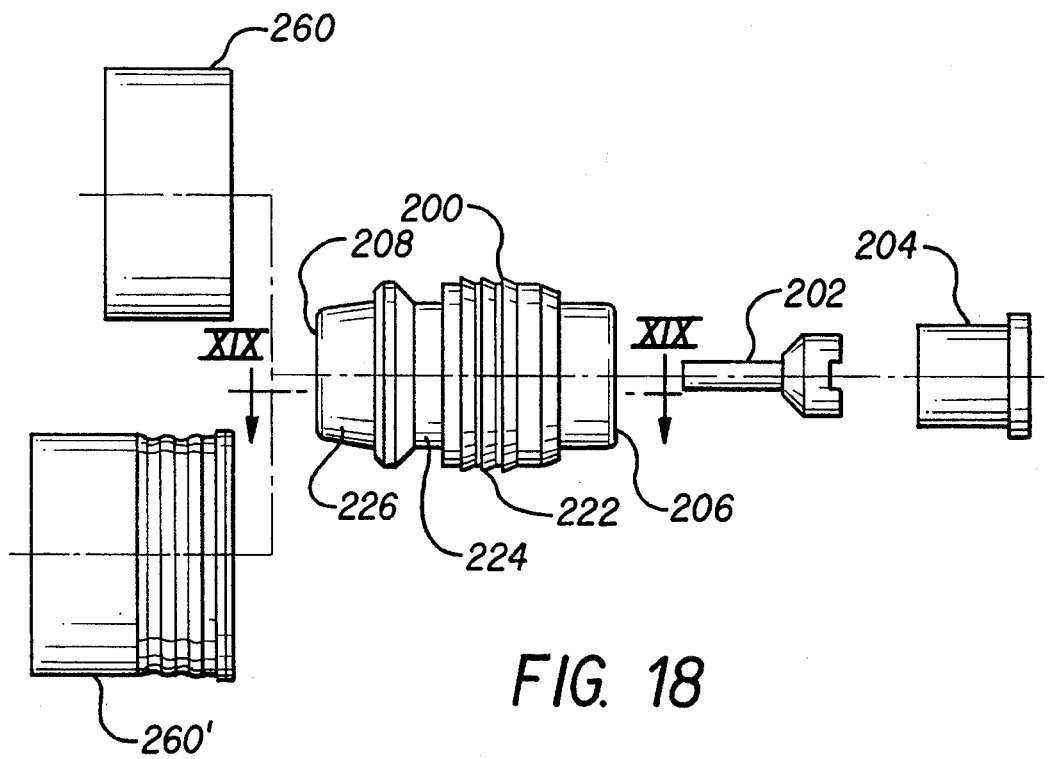
FIG. 18 is an exploded view of the nozzle assembly.

With specific reference now to FIGS. 4 and 18, the nozzle assembly of inflation device 10 is shown comprising a nozzle fitting 200, a safety pin 202 and a safety pin plug 204.

Figure 19:
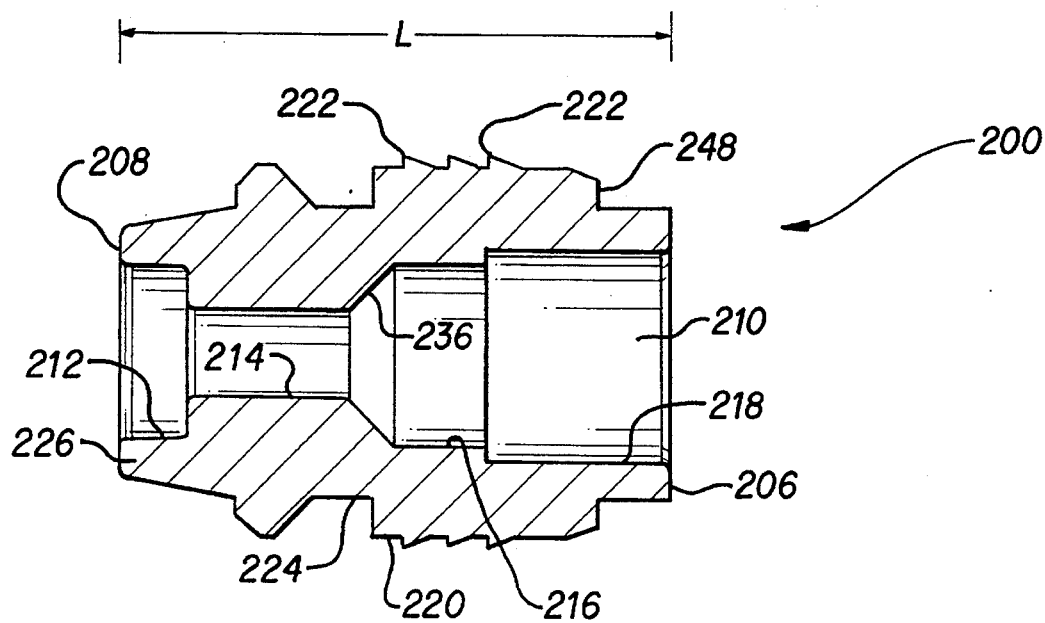
FIG. 19 is a cross-sectional view of the nozzle fitting shown in FIG. 18 taken along line XIX—XIX.

In the preferred embodiment, nozzle fitting 200 is screw machined from aluminum or other non-deformable material capable of being machined to a particular specification. Nozzle fitting 200 has a length L of approximately 0.850 inches which defines a first end 206 and a second end 208 (FIG. 19). Bored through the center of nozzle fitting 200 is a central lumen 210 having four sections of varying diameters. First section 212 is dimensioned to receive an inflation port of an inflatable bladder, while second section 214 receives the shaft portion of safety pin 202. Third section 216 is dimensioned to receive the crown portion of safety pin 202, while fourth section 218 receives safety pin plug 204.

The exterior surface 220 of nozzle fitting 200 is provided with a plurality of barbs 222 which extend about the circumference of the fitting to maintain the same within main channel 118 of upper manifold 46. Exterior surface 220 also defines a groove 224 into which a correspondingly structured nozzle boot (to be discussed in more detail below) is snap fitted.

At second end 208, fitting 200 is machined to define a ring-like extension 226 which is received within an annular groove of an inflation port. Extensions 226 are provided to ensure that the nozzle of the device is positioned on the port of the bladder in a fluid-tight manner.

Figure 20:
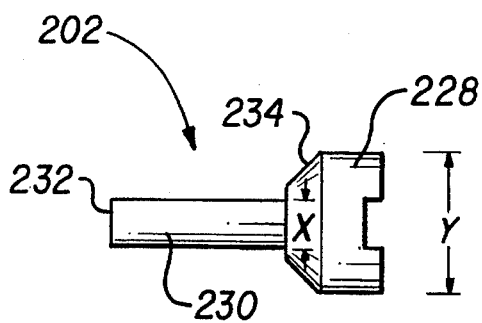
FIG. 20 is a side elevational view of the safety pin of shown in FIG. 18.

Inserted within end 206 of nozzle fitting 200 is a safety pin 202 which is provided to prevent the release of gas from the nozzle when the nozzle is not connected to an inflation port of a bladder. As seen in FIGS. 4, 15 and 20, safety pin 202 includes a crown 228, a shaft 230, and a valve engaging tip 232. Safety pin 202 is preferably injection molded from glass-filled DELRIN™ or any other rigid material capable of being molded to a particular specification. Crown 228 generally takes the shape of a truncated cone having a first diameter X and a second diameter Y (see FIG. 20). Crown 228 tapers to a shaft 230 which is generally rod-like in shape. Tip 232 of shaft 230 engages with an inflation port (or valve) of an inflatable bladder to open the nozzle assembly of the device when the nozzle is properly fitted over the cover.

Safety pin 202 is inserted within fitting 200 prior to inserting the fitting within the main channel. To position the pin within fitting 200, tip 232 of pin 202 is inserted into end 206 and pushed through the lumen of the fitting until angled surface 234 of crown 228 abuts against a correspondingly angled interior shoulder 236 (FIG. 19). Shoulder 236 and surface 234 are correspondingly angled so that when safety pin 202 is pushed rearward (away from the tip of the nozzle) gas may pass around the crown portion of the pin and out of the device.

Figure 21:
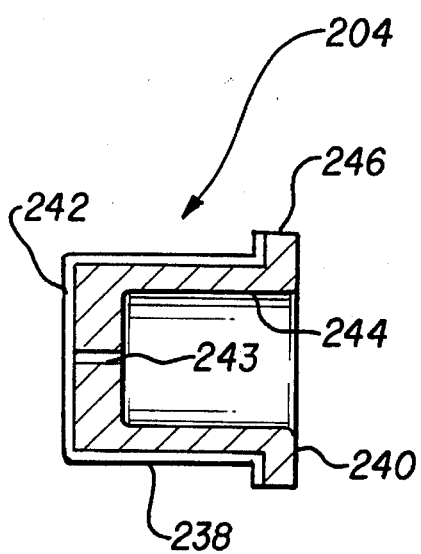
FIG. 21 is a cross-sectional view of the safety pin plug shown in FIG. 18.

After positioning safety pin 202 into fitting 200, safety pin plug 204 is inserted into fitting 200 to complete assembly of the nozzle (FIGS. 18 and 21). Plug 204 is preferably injection molded from the same plastic used to mold safety pin 202. The plug includes a first end 240 which opens into a hollow interior 244 and a substantially closed second end 242 which comes into contact with the crown portion of the safety pin when the plug is inserted into fitting 200. The diameter of plug 204 is slightly larger than that of spring 174 so that the forward half of the spring may be received therein. At its second end 242, plug 204 is provided with a small passageway 243 of approximately 0.020 inches which restricts the flow of gas flowing through the head unit to a controlled and useful rate. The diameter of second end 242 is slightly smaller than that of fourth section 218 of fitting 200 so that the plug may be securely fitted within fitting 200 of the nozzle assembly. Plug 204 is inserted within fourth section 218 until rim 246 of plug 204 abuts against the first end surface 206 of fitting 200.

After properly positioning safety pin 202 and plug 204, fitting 200 is pushed into outlet 120 of main channel 118 and ultrasonically welded within the upper manifold of the device. When the fitting is properly positioned within the main channel, shoulder 248 of fitting 200 abuts against a shelf 250 formed by the interior wall of main channel 118.

To complete assembly of the nozzle, an elastomeric boot (formed preferably from injection molded urethane) is snap fit within a groove 224 of nozzle fitting 200. FIG. 22 illustrates the preferred nozzle boot of the invention. As shown in this figure, nozzle boot 260 is generally cylindrical in shape to form a collar about extension 226 of fitting 200. This collar, when properly positioned about an inflation port of an inflatable bladder, prevents gas from leaking out between the nozzle and the port. Provided at the distal end of the boot is an annular lip 262 which snap fits into groove 224 to secure the boot on the nozzle fitting of the device.

Figure 22A:
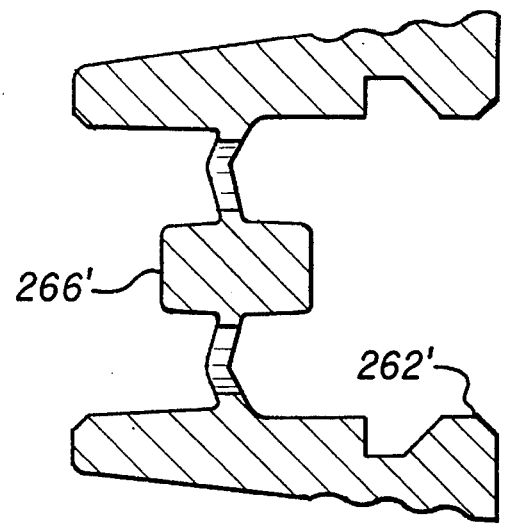
FIG. 22a is a cross-sectional view of an alternate embodiment of the nozzle boot shown in FIG. 22.
Figure 22B:
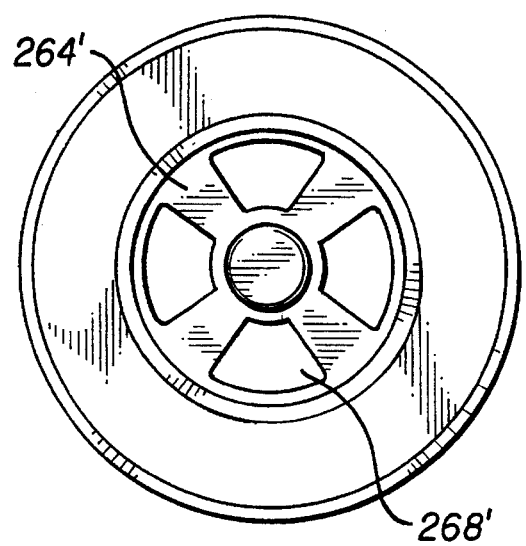
FIG. 22b is a top plan view thereof.
Figure 22:
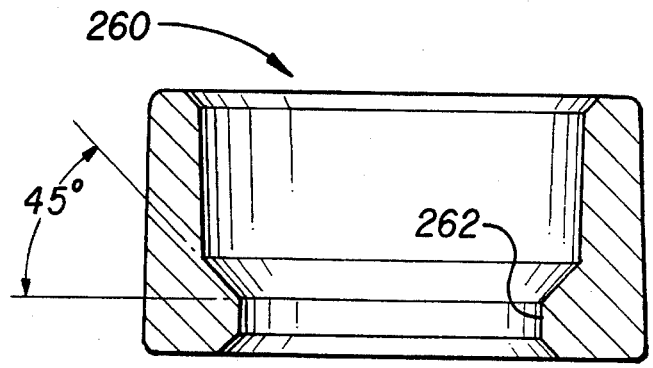
FIG. 22 is a cross-sectional view of the nozzle boot of the device.
Figure 45:
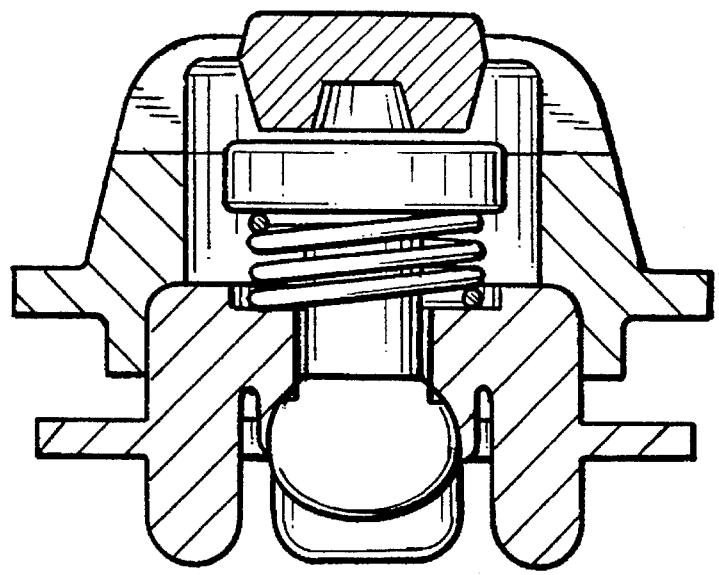
FIG. 45 is a cross-sectional view of an inflation port and valve assembly for an inflatable bladder.

An alternative nozzle boot is illustrated in FIG. 22 and 22a as 260'. Boot 260' is similar to boot 260 in that it too includes an annular lip 262' which allows the boot to be snap fitted within the nozzle fitting. The nozzle boot of FIG. 22, however, is specifically configured for use with the inflation port of FIG. 45. Thus, suspended within the mid-section of the boot by a plurality of wings 264' is a button 266' which opens the valve of the port when the two structures are brought into intimate contact. Four equiangularly-spaced apertures 268' are positioned between wings 264' to allow gas to pass from the inflation device to the opened valve of the port. Like nozzle boot 260, the collar portion of boot 260' prevents gas from leaking out between the nozzle and the exterior surface of the inflation port.

IV. The Lever (FIGS. 1, 2, and 23–35)

Attention will now be given to the lever assembly of the inflation device. The configuration of the lever 17 is significant in that the lever structure and placement thereof allows the device to be comfortably operated by either a left or right-handed user. Activation of the present inflation device is unlike that currently known in the art in that the lever of the device is put into motion by "pinching" the lever between the thumb and index finger. This motion is ergonomically efficient in light of the fact that the lever assembly works together with the natural mechanics of the user's digits. Further, the user need not pronate the hand (i.e., hyperflex the muscles of the wrist so that the hand is perpendicular to the longitudinal axis of the device) in order for actuation of the device to be accomplished. The lever assembly of the present device is specifically oriented at an angle $\theta^1$ of 80° (FIG. 1) with respect to the longitudinal axis of the device and at an angle $\theta^2$ of 90° (FIG. 2) with respect to the transverse axis of the device so that the user may easily activate the lever of the device regardless of the accessibility of the inflation port or the handedness of the user.

Figure 24:
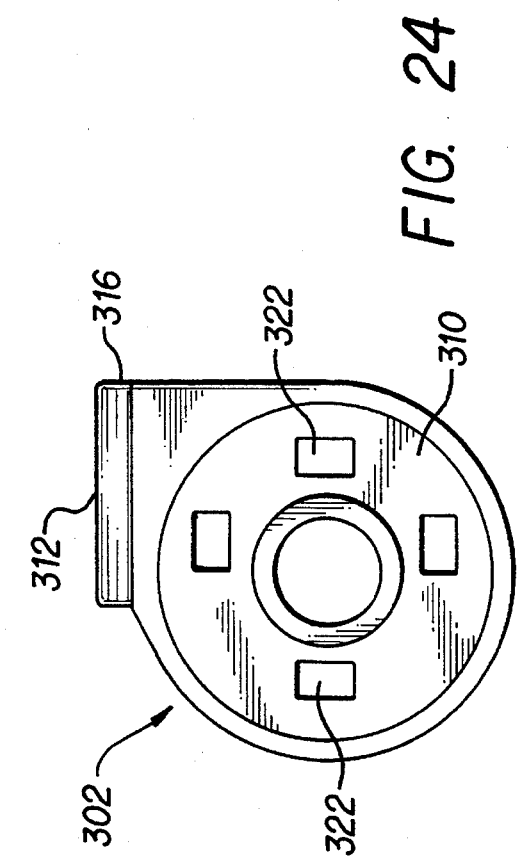
FIG. 24 is a front elevational view of the actuation lever of the device.
Figure 25:
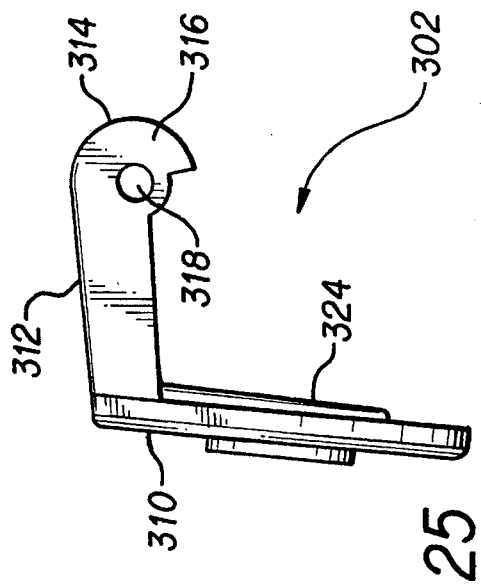
FIG. 25 is a left side elevational view thereof.
Figure 23:
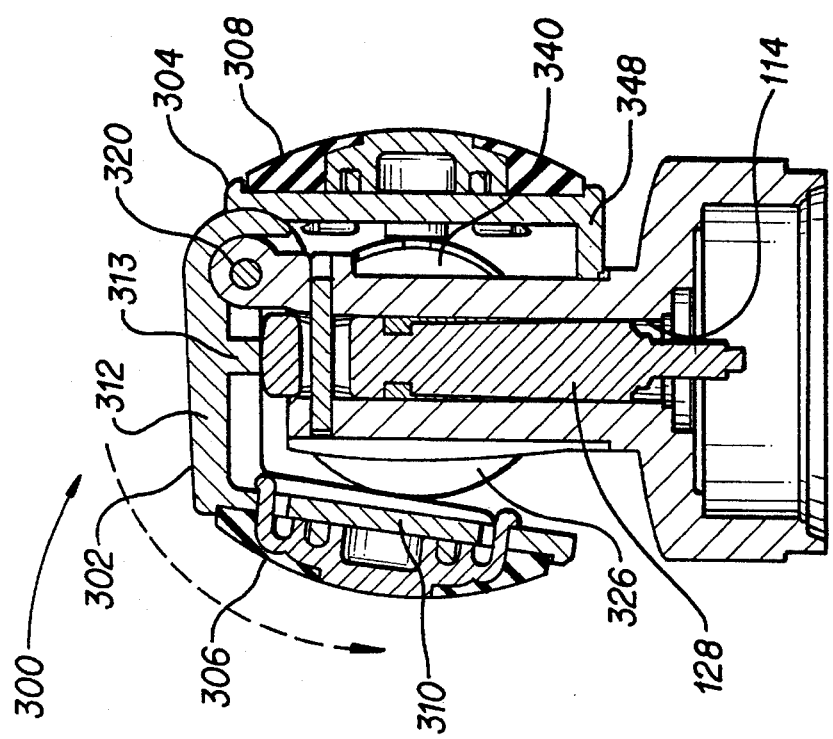
FIG. 23 is a cross-sectional view of the lever assembly.
Figure 29:
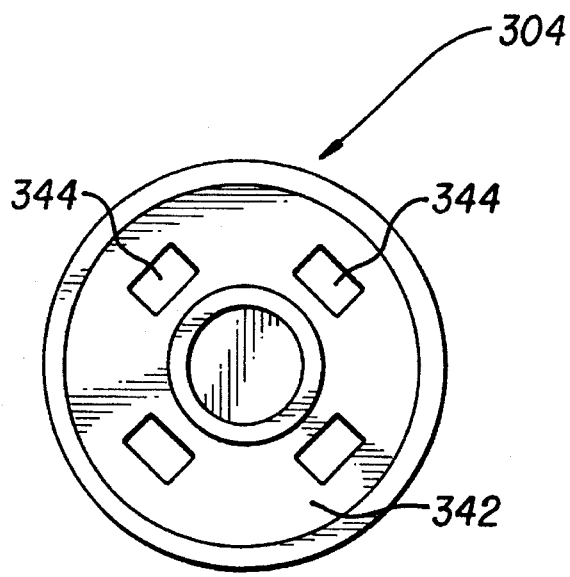
FIG. 29 is a front elevational view of the lever shroud of the lever assembly.
Figure 30:
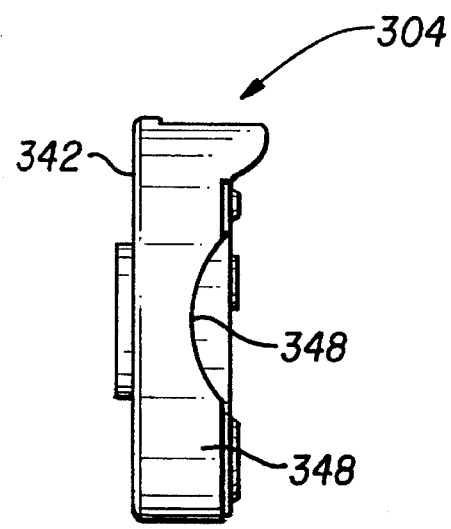
FIG. 30 is a left side elevational view thereof.
Figure 31:
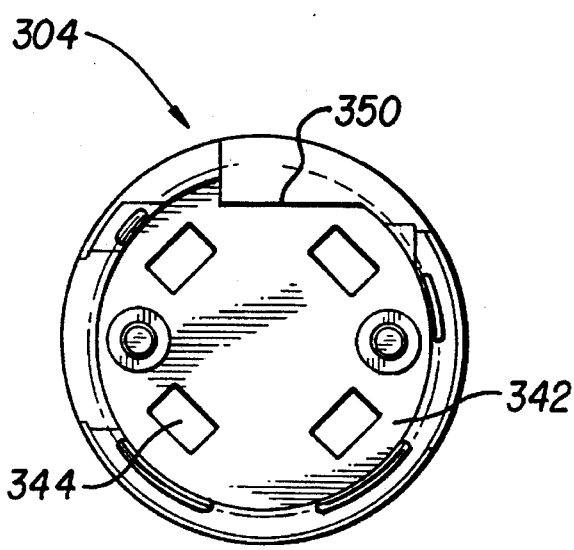
FIG. 31 is a rear elevational view thereof.
Figure 32:
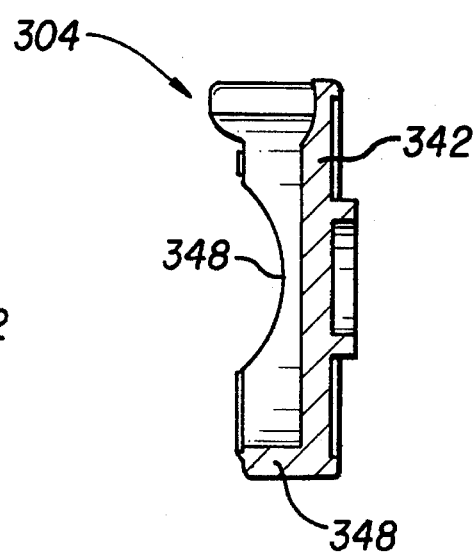
FIG. 32 is cross-sectional view of the right side thereof.

Turning now to FIG. 23, a cross-sectional view of the lever assembly of the present invention is shown. Lever assembly 300 consists generally of an actuation lever 302, a lever shroud 304, a lever pad 306, and a shroud pad 308. FIGS. 24 and 25 illustrate lever 300 having a circular-shaped body portion 310 and a cross-bar 312 which is positioned at an angle with respect to body portion 310. Cross-bar 312 has a length of approximately 0.724 inches which terminates at a rounded edge portion 314. Provided on each end of edge portion 314 is an ear 316 having a hole 318 which receives a pin 320 (FIG. 23) for attaching the lever assembly of the device to head unit 14. On the lower surface of cross bar 312, a post 313 is provided which depresses the actuation piston of the device when the actuation lever is pinched between the user's index finger and thumb.

Body portion 310 of lever 302 also includes four rectangularly-shaped slots 322 which are provided to receive the attachment tabs of lever pad 306. Molded on the rear side of the lever 302 (FIG. 26), are two vertically extending ribs 324 which rest against a hollow, rounded protrusion 326 of head unit 14 when the lever is actuated. The actuation lever of the device is preferably injection molded from the same glass-filled plastic used to mold upper manifold 46, for example.

Insert molded to the front side of lever 302 is a pad 306 (FIGS. 27 and 28). Pad 306 includes a base member 328 which is generally circular in shape. Extending from the circumference of base 328 are four attachment tabs 330. Attachment tabs 330 correspond in placement to slots 322 of lever 302 and are provided to attach the lever pad to the actuation lever. Extensions 332 of lever pad 306 rest against the circular body portion of lever 302 to support the lever pad above the planar surface of body portion 310. Attached to the exterior surface of lever pad 306 is a jacket 334. Jacket 334 is ring-like in shape and includes a thickness which defines an arcuate exterior surface 338. Jacket 334 is insert molded about a central hub 336 of base member 328 to secure the jacket to the base member of the pad. The components of lever pad 306 (including jacket 334) are preferably injection molded from an ABS/polyvinyl chloride elastomer.

Provided on the opposite side of head unit 14 is a lever shroud 304. With reference now to FIGS. 29–32, the components of shroud 304 are shown. Shroud 304 rests against a second rounded protrusion 340 (FIG. 23) of head unit 14 to provide a force-applying surface for the user's index finger or thumb (depending on the handedness of the user). Similar to lever 302, shroud 304 includes a circular body portion 342 having four equi-angularly spaced slots 344 which receive four attachment tabs 346 of shroud pad 308. Extending in a perpendicular manner about the perimeter of shroud 304 is an apron 348 (FIG. 30) having two rounded edges 348 which engage with the rounded exterior surface of protrusion 340. As shown in the rear view of shroud 304 (FIG. 31), apron 348 is cut away at 350 to provide a clearance for cross bar 312 of lever 302. Shroud 304 is preferably injection molded from the same glass-filled plastic used to mold lever 302. The lever shroud is ultrasonically welded to the head unit of the device to permanently attach the lever shroud thereto.

Figure 33:
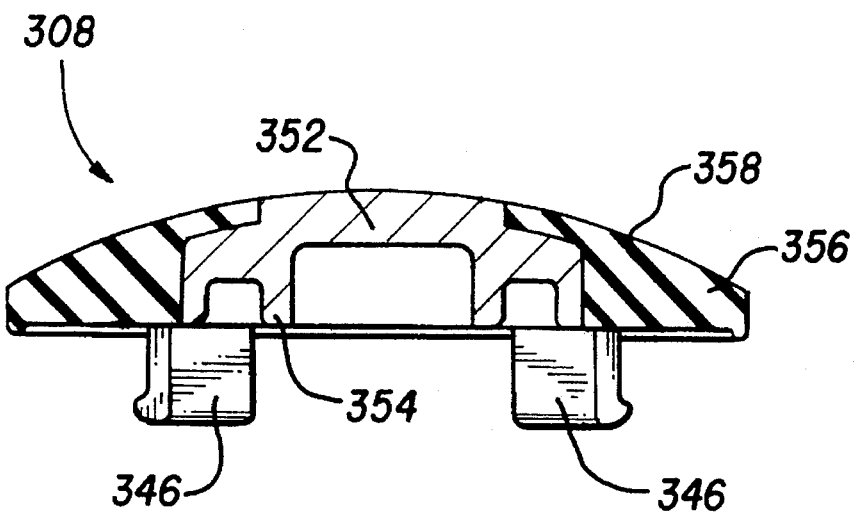
FIG. 33 is a cross-sectional view of the shroud pad of the device.
Figure 34:
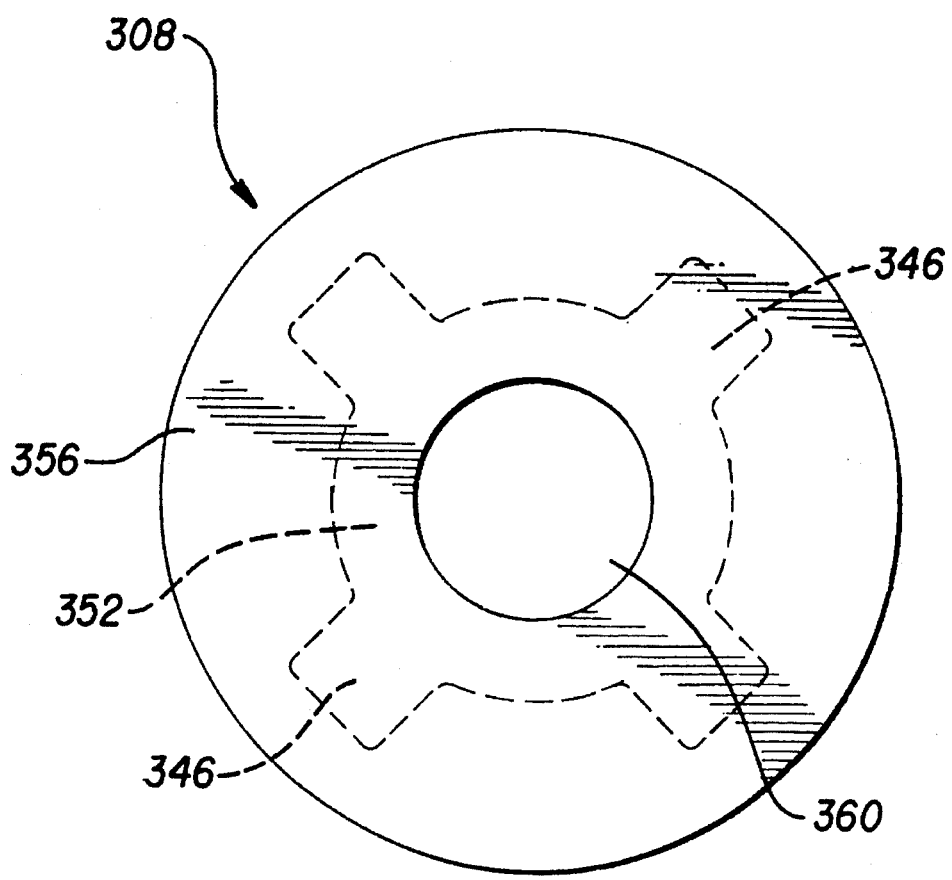
FIG. 34 is a top plan view thereof.
Figure 35:
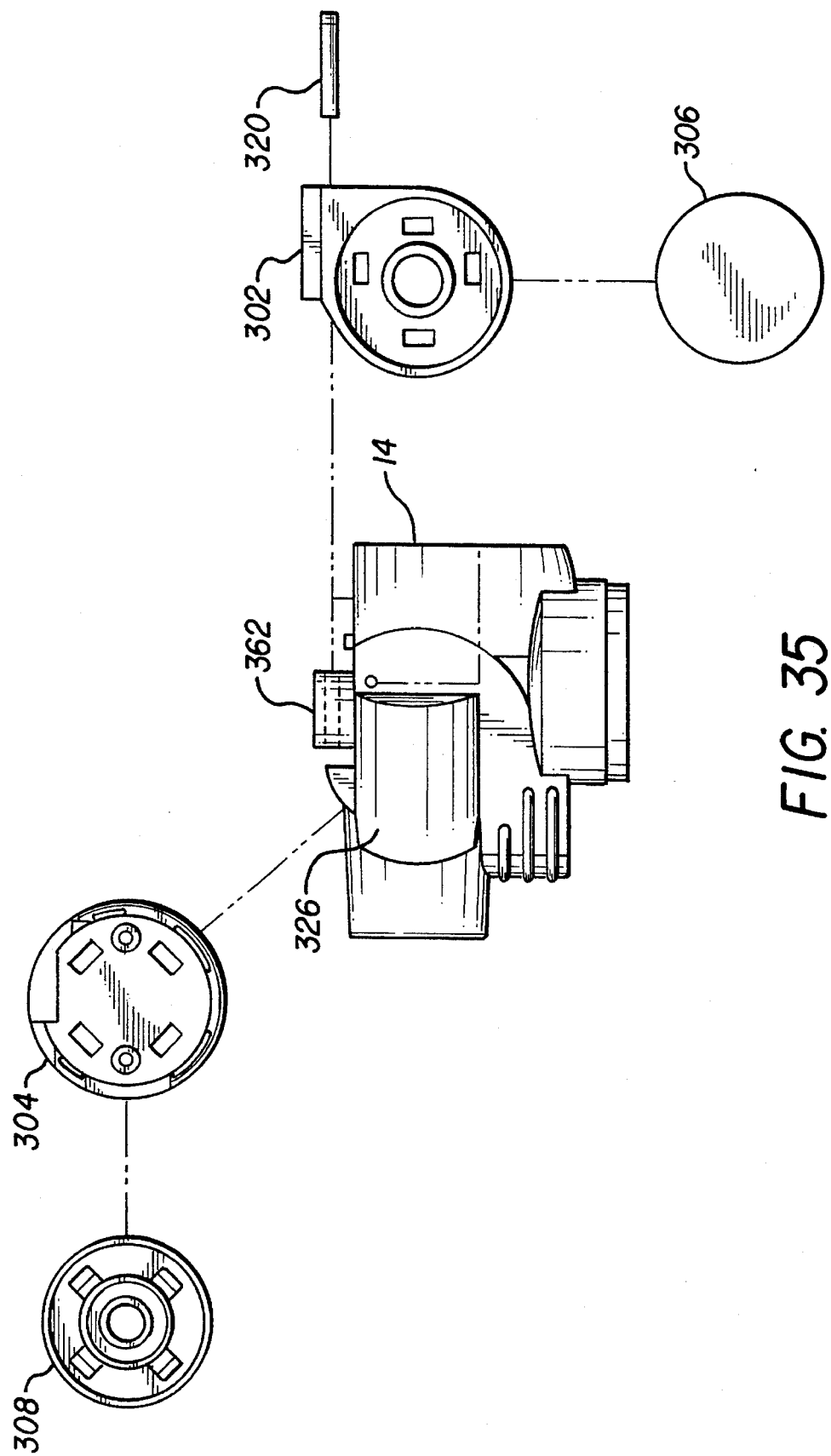
FIG. 35 is an exploded side elevational view of the lever assembly of the device.

Insert molded to the exterior of shroud 304 is a shroud pad 308 (FIGS. 33 and 34). Like lever pad 306, shroud pad 308 also includes a base member 352, four attachment tabs 346, and a plurality of extensions 354. Attachment tabs 346 correspond in placement to slots 344 of shroud 304 and are provided to attach the shroud pad to the lever shroud. Extensions 354 of shroud pad 308 rest against the circular body portion of shroud 304 to support the shroud pad above the planar surface of body portion 342. Attached to the exterior surface of shroud pad 306 is a second jacket 356. Jacket 356 is also ring-like in shape and includes a thickness which defines an arcuate exterior surface 358. Jacket 356 is insert molded about a central hub 360 of base member 352 to secure the jacket to the pad. The components of shroud pad 308 are preferably injection molded from the same elastomer user to mold lever pad 306. FIG. 35 illustrates assembly of the component parts of the lever assembly. As shown in this figure, after attaching shroud pad 308 to the exterior surface of shroud 304, the combined shroud and shroud pad component is ultrasonically welded to the left side of the head unit. After molding lever pad 306 to lever 302, the lever/lever pad component is attached to the right side of head unit 14 by inserting pin 320 through ears 316 of lever 302 and through a pivot bar 362 provided on the top surface of head unit 14. When the lever is attached to the head unit of the device, the rounded top portion of actuation piston 128 lifts lever 17 off of rounded protrusion 326 so that a clearance between the lever and protrusion may be established.

V. The Clip (FIGS. 1 and 4)

Finally, a stainless steel clip 364 having an annular ring 368 is snap fit about lower manifold 36 of the device. As shown in FIG. 4, clip 368 is undulated along its length (as at 370) to accommodate the user's palm or fingers when the device is gripped in the user's hand. At its lower end, clip 368 is provided with a plastic bead 370 which facilitates use of the clip by the user.

Figure 36:
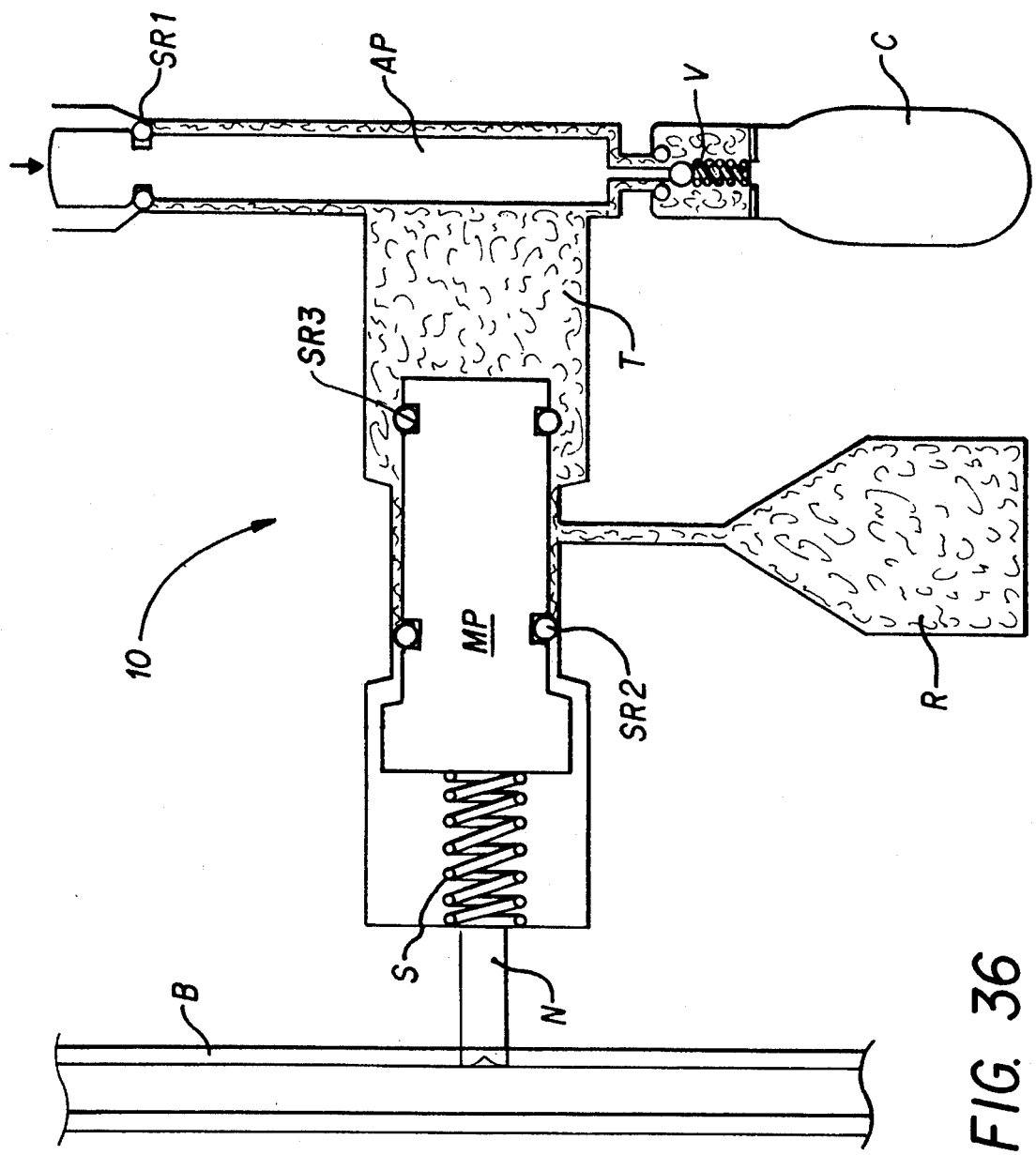
FIG. 36 is a simplified schematic of one implementation of the inflation device of the present invention illustrating actuation of the device.
Figure 37:
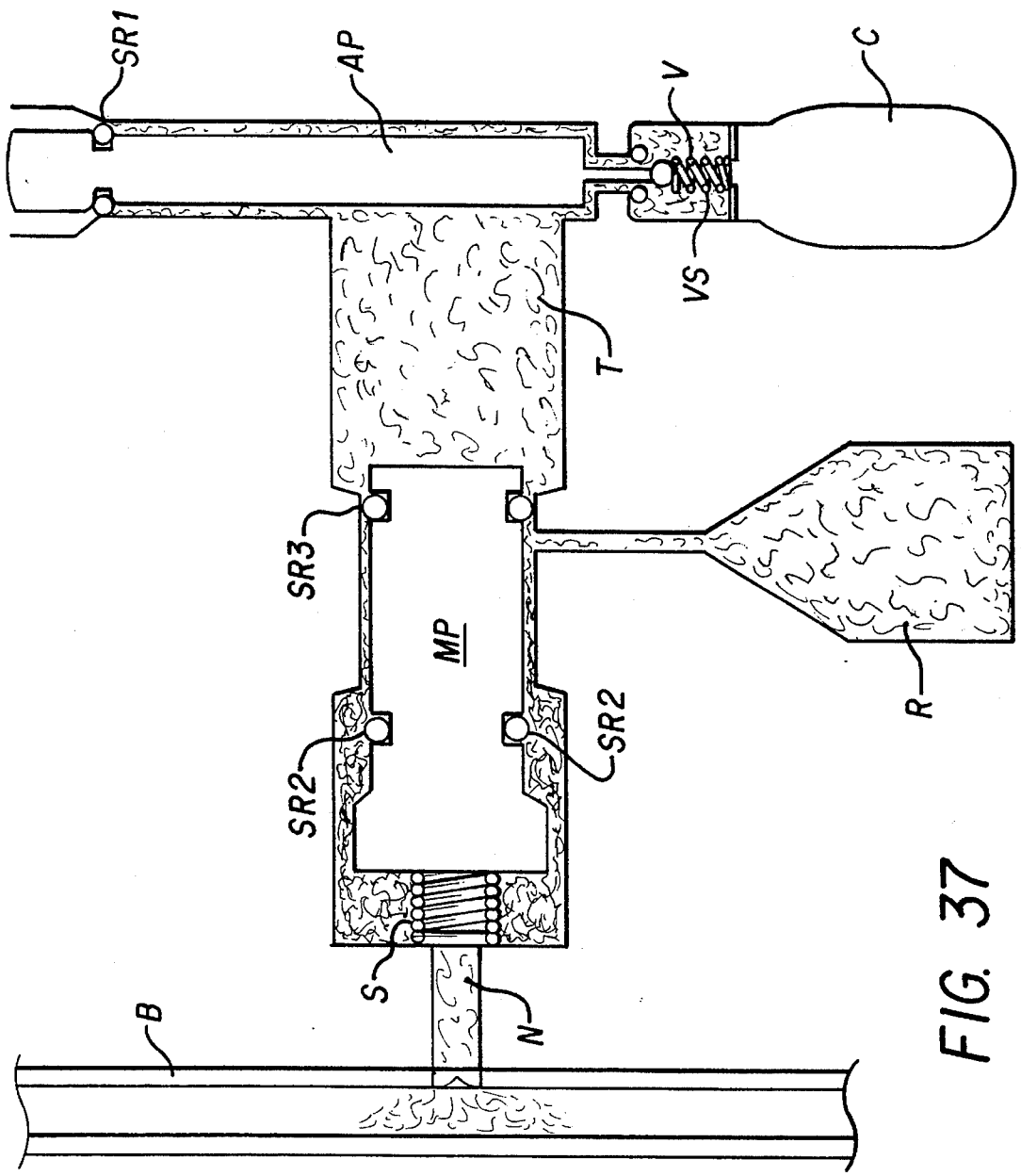
FIG. 37 is a simplified schematic of the inflation device of FIG. 36 illustrating delivery of a bolus of gas to an inflatable bladder.
Figure 38:
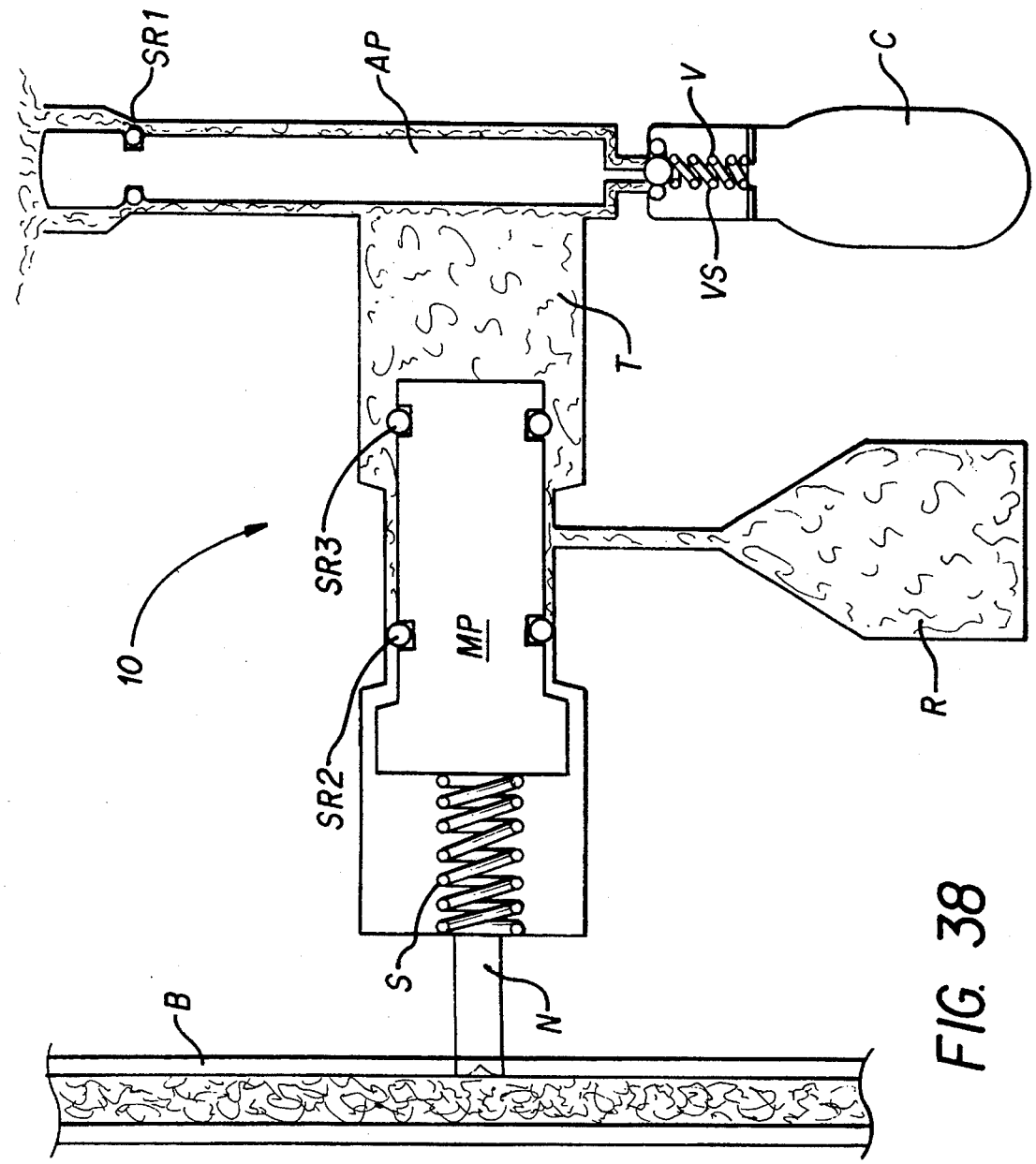
FIG. 38 is a simplified schematic of the inflation device of FIG. 36 illustrating delivery of residual gas to the atmosphere.

Having described all of the component parts of the inflation device of the present invention, use of the same will now be described. Prior to describing operation of the embodiment of FIG. 4, an illustration of the general concept of the invention will be provided. With reference to FIGS. 36–38, the creation and delivery of a metered bolus of gas to an inflatable bladder will be described. Starting with FIG. 36, the basic components of inflation device 10 are illustrated. To initiate operation of the device, actuation piston AP of the device is depressed. As the actuation piston is depressed, piston AP moves down the length of the piston chamber and the tip thereof makes contact with the ball of valve assembly V. As the ball of the valve moves away from its sealing ring, gas from canister C flows up into the piston chamber and into a transverse chamber T. From transverse chamber T, gas flows around a main piston MP and expands into a reservoir R. At this point, gas is prevented from flowing out of the top of the piston chamber by a sealing ring SR1 (positioned about the neck of the actuation piston AP) which comes into contact with the cylindrical wall of the piston chamber. Gas is also prevented from flowing to the nozzle N of the device due to the abutment of a second sealing ring SR2 against the wall of transverse chamber T. As the pressure of the gas within reservoir R overcomes the force of spring S, main piston MP moves forward within the transverse chamber T (FIG. 37). As main piston MP moves forward, second sealing ring SR2 moves away from the wall of transverse chamber T to allow gas from reservoir R (the bolus of gas) to flow to nozzle N. As the gas exits the nozzle, it flows into bladder B via a suitable inflation valve or port. As the gas within the reservoir flows through the nozzle, additional gas is prevented from flowing into the reservoir via a third sealing ring SR3 which is now in intimate contact with the interior wall of transverse chamber T. As the actuation piston is released, pressure behind main piston MP decreases and spring S pushes main piston MP back into transverse chamber T so that second sealing ring SR2 is again in contact with the wall of the transverse chamber T. As sealing ring SR2 comes back into contact with the wall of transverse chamber T, gas is prevented from flowing to nozzle N. As the actuation piston AP is relieved, piston AP moves up through the piston chamber and valve spring VS pushes the valve ball against the sealing ring to close off the passageway extending vertically above canister C (FIG. 38). As the actuation piston continues to move up through the chamber, first sealing ring SR1 moves away from the wall of the piston chamber to allow residual gas within the chamber to escape to the atmosphere. As this residual gas escapes to the atmosphere, an audible "hiss" may be heard to indicate to the user that a bolus of gas has been successfully delivered to the inflatable bladder.

The concept illustrated in FIGS. 36–38 is similarly applied to the embodiment shown in FIG. 4. To operate inflation device 10, a canister C of pressurized (preferably $CO_2$) gas is inserted into head unit 14. The canister is positioned in the housing so that the rounded bottom portion of the canister comes to rest on hub 28. When the canister is in its proper position, head unit 14 of the device is screwed into canister housing 12 by introducing the threaded portion of lower manifold 36 to the threaded portion of housing 12. As housing 12 and lower manifold 36 are screwed together, the neck of canister C is guided into gas seat 44 (via angled inlet 60) and against the lower surface of gasket 74. As the neck of canister C engages gasket 74, the tip 70 of puncturing pin 66 pierces the seal of canister C open the same. As gas is released from the canister, it enters two-diametered channel 78 where it flows around the coils of spring 80 and against the lower and side surfaces of valve ball 82. The force of the gas against valve ball 82 pushes the top portion thereof against sealing ring 84 to prevent gas from flowing to the upper manifold 46 of the device.

Figure 39:
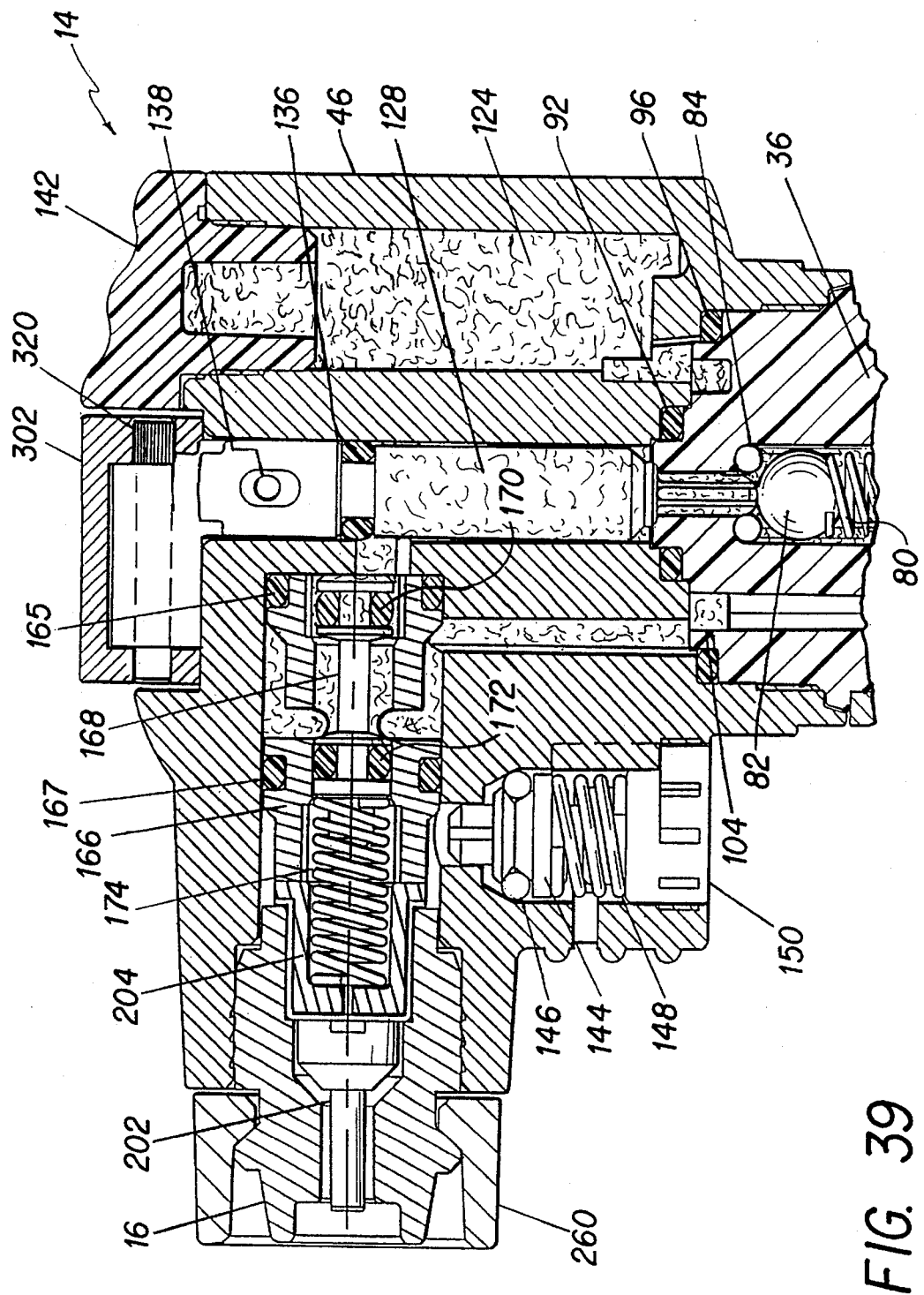
FIG. 39 is a cross-sectional view of the head unit of the device of the present invention illustrating actuation of the device.
Figure 40:
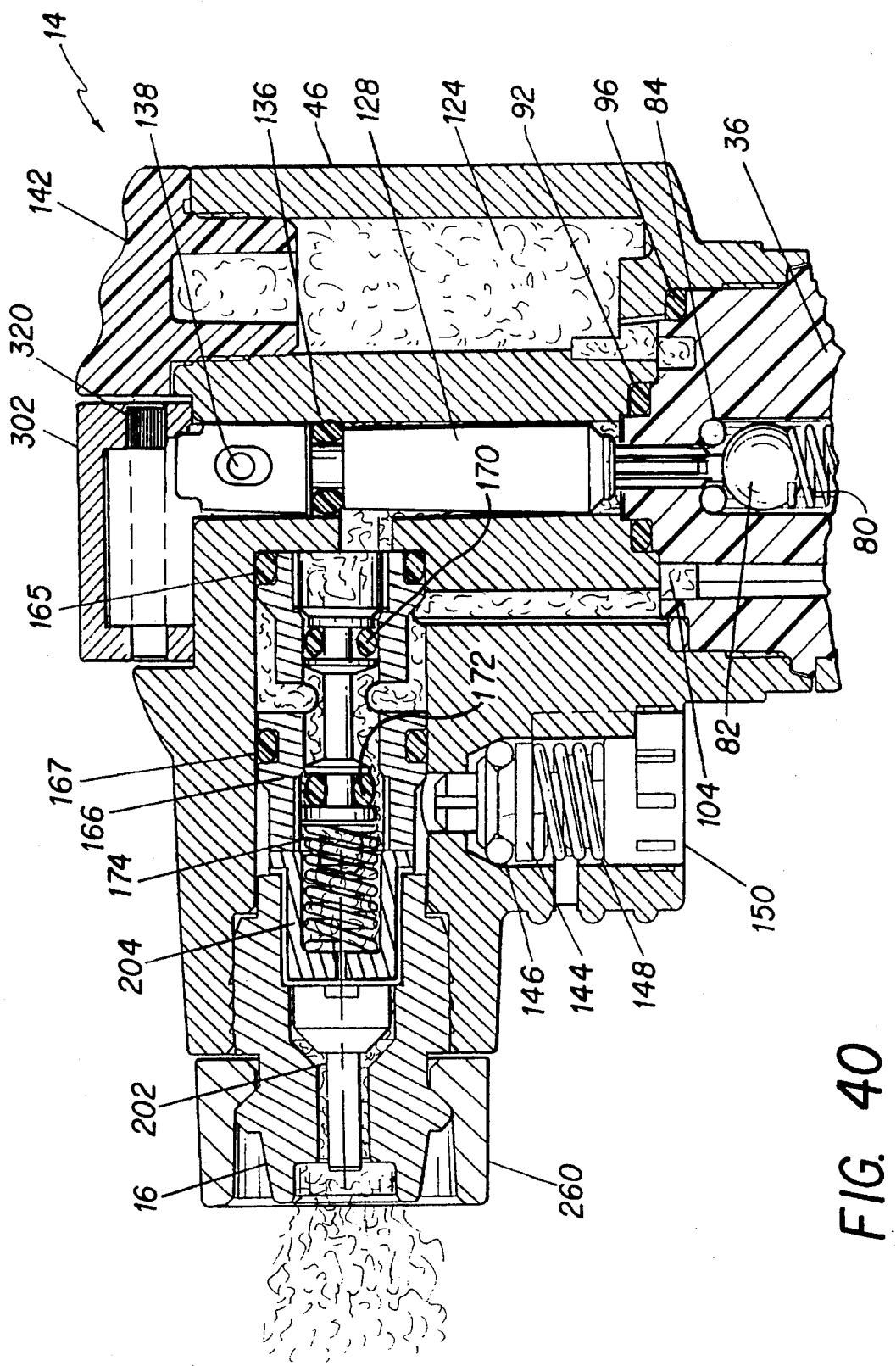
FIG. 40 is a cross-sectional view of the head unit of the device illustrating delivery of a bolus of gas to the nozzle.

To release a bolus of gas from the device, a right-handed user places the thumb on actuation lever 302 and the index finger on lever shroud 304. (If the user is left-handed, the thumb would be placed on the lever shroud and the index finger would be placed on the actuation lever. In any event, the lever of the present invention provides equal utility to either a left or right-handed user.) The device is activated by pinching lever 302 against the head unit of the device. As lever 302 is pinched, post 313 depresses actuation piston 128 into chamber 114 (FIG. 23) and main body portion 310 of lever 302 rotates downwardly about a transverse axis of the device to come into contact with protrusion 326 of head unit 14. As piston 128 moves down through channel 114, stem 130 of piston 128 comes into contact with valve ball 82 to open the main valve assembly of the device. As valve ball 82 moves away from sealing ring 84, gas flows into piston chamber 114, around the exterior of piston 128 and into passageway 116 (see FIG. 39). As gas is released into piston chamber 114 and passageway 116, it is prevented from flowing out of the top of the device to the atmosphere via piston sealing ring 136. As gas enters passageway 116, it flows around shuttle piston 168, out openings 186 of shuttle sleeve 166, and into conduit 123. It should be noted that gas is prevented from passing to nozzle 16 due to the abutment of sealing ring 172 against the narrowed interior wall of shuttle sleeve 168. From conduit 123, gas flows into annular ring 104 of lower manifold 36 and around to second passageway 126 of upper manifold 46 where it then flows into reservoir 124 of the device. When the pressure of the gas within the reservoir overcomes the resistance of shuttle spring 174 (FIG. 40), shuttle piston 168 is pushed forward (by the force of the gas) towards nozzle 16. As the shuttle piston moves forward, additional gas from the canister is prevented from entering the reservoir due to the abutment of shuttle sealing ring 170 against the narrowed portion of the shuttle sleeve (upstream of openings 186). Further, second shuttle sealing ring 172 of piston 168 is pushed away from the first narrowed section of shuttle sleeve 168 to allow gas to pass to the nozzle through the small passageway of safety pin plug 204. It should be noted that in FIG. 40, safety pin 202 is shown in the open position. In use, however, safety pin 202 would need to be in proper contact with an inflation port in order for gas to flow around the safety pin to the nozzle. (This feature prevents the release of gas from the device when the nozzle is not coupled to an inflation port of an inflatable bladder. Thus, a user cannot release gas from the device for an unintended purpose which could prove harmful to the user or those in the immediate vicinity.) As the pressure on lever 302 is relieved (and the reservoir is emptied), spring 174 pushes shuttle piston 168 rearward to bring sealing ring 172 back into contact with the narrowed interior wall of the shuttle sleeve. As lever 302 is released (FIG. 41), actuation piston 128 moves up through chamber 114 and away from valve ball 82. As stem 130 moves away from ball 82, spring 80 (and the pressure of the gas from within the canister) pushes valve ball 82 back into contact with sealing ring 84 to seal the head unit from the canister. As actuation piston moves upward, sealing ring 136 enters the expanded portion of chamber 114 (above line X) and residual gas from within the piston chamber is allowed to flow around ring 136 and out of the top of the device beneath lever 302 via grooves 115. As this residual gas escapes to the atmosphere, an audible "hiss" may be heard. This hiss indicates to the user, that a bolus of gas has been successfully delivered to the user. It should be realized by those skilled in the art that the audible indicator (hiss) may be eliminated or put at a different phase of the firing cycle.

It should be noted that only one bolus of gas may be delivered to the nozzle (and thus the inflatable bladder) regardless of the length of time that the user depresses the lever. This delivery technique prevents over inflation of the bladder or incentive to restructure the device for an unintended purpose.

Figure 41:
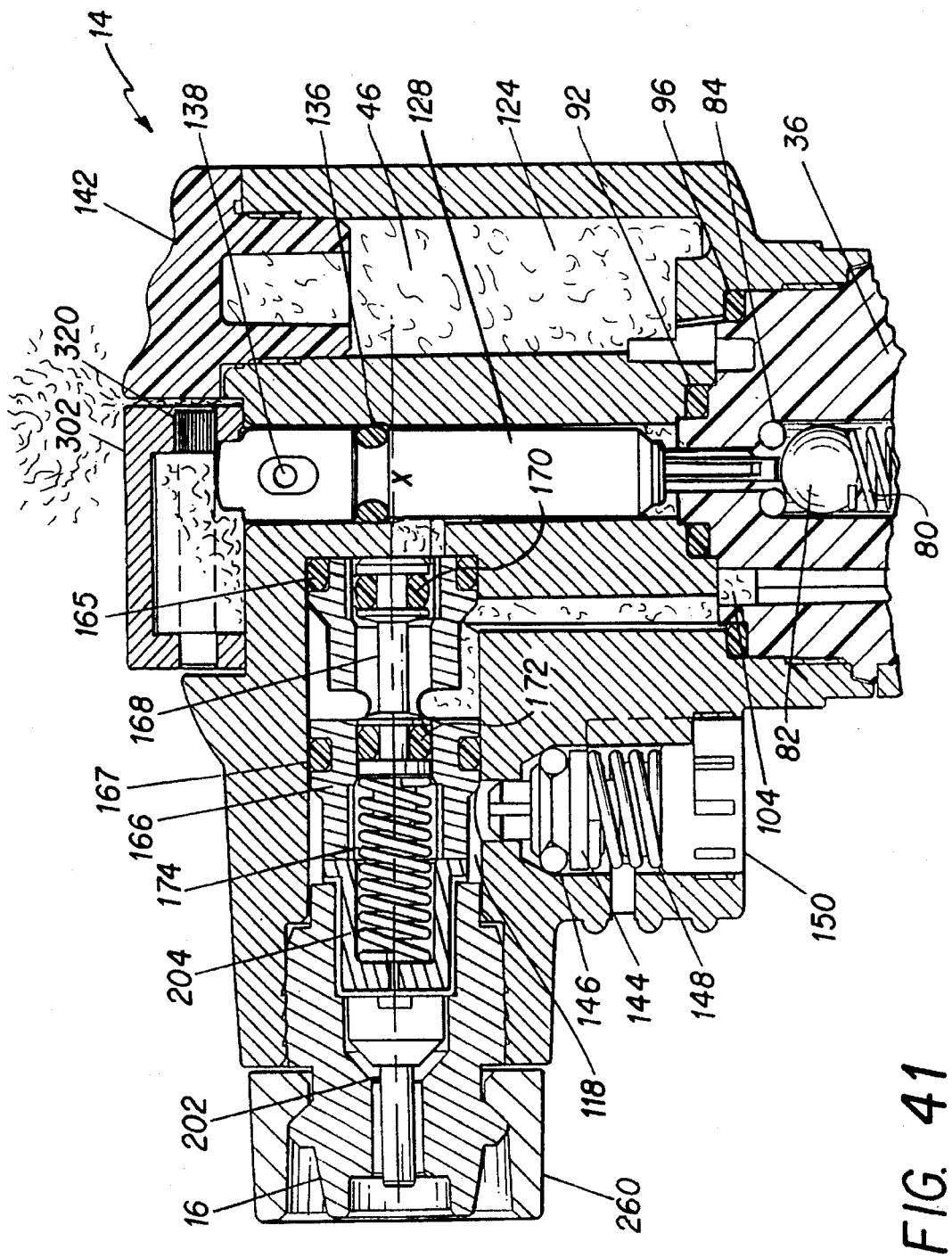
FIG. 41 is a cross-sectional view of the head unit of the device illustrating the release of residual gas to the atmosphere.

Should the pressure within the inflatable bladder reach a predetermined threshold pressure (that is, when the bladder is inflated to capacity), the pressure relieving mechanism of the device is automatically activated. The pressure relieving means of the present invention is similar to that disclosed in U.S. patent application Ser. No. 08/167,007, filed Dec. 15, 1993, the entire disclosure of which is incorporated herein by reference. With reference to FIG. 41, for example, the pressure relieving mechanism of the invention is shown extending from passageway 118. When the bladder has been inflated to capacity, the bolus of gas from reservoir 124 is not capable entering the bladder and is therefore directed into third chamber 122 of upper manifold 46. As the pressure of the gas overcomes the resistance of spring 148, pressure relieving popper 144 moves downward and sealing ring 146 moves away from the angled interior wall of chamber 122. As the sealing ring moves away from the wall, gas travels down the airway flats of the piston, around the sealing ring, and out of blow off channel 121. As the excess gas flows out the channel, it too creates an audible hiss which will signal to the user that the bladder has been inflated to capacity. When the excess gas has been expelled from the device, the pressure relieving means returns to its normally closed position.

Obviously, the bolus of gas may be "sized" or "metered" in accordance with the bladder to be inflated. The bolus size is a function of the compression rate of shuttle spring 114 and to some extent the volume of reservoir 124. To increase the bolus size, a tighter spring 174 would be used. To decrease the bolus size, a lower tensioned spring would be used.

Alternatively, it is possible to vary the size of the bolus by providing reservoir 124 with a threaded plug. To increase (or decrease) the bolus size, the user would loosen (or tighten) the plug within the reservoir to either expand or shrink the volume of the reservoir.

It should be further apparent to those skilled in the art that the pressure at which the pressure relieving mechanism is activated is also a function of the compression rate of spring 144.

Moreover, it should be understood that the components of the upper and lower manifold function to control the flow rate of the gas coming from canister C and therefore lower its pressure. When the device of the present invention is at rest, the pressure of the gas within the canister is approximately 600–850 psi. As the gas flows through the manifold and into reservoir 124, the pressure is substantially reduced to approximately 150 psi. Thus, the gas from canister C is never transferred to the nozzle of the device at a high pressure due to the provision of a non-continuous flow path. At no single moment in time is an open flow path established between the canister of the device and the nozzle.

Because the gas from canister C has already expanded upstream of nozzle 16, icing of the nozzle is practically eliminated. However, to eliminate any icing which may form within the manifold of the device, a frit (a filtering disk of sintered/powdered metal having a pore size in the micron range) may be provided to ensure that no ice reaches the nozzle of the device.

Finally, ultrasonic welding of the component parts inhibits disassembly and modification of the device for an unintended purpose.

Figure 42C:
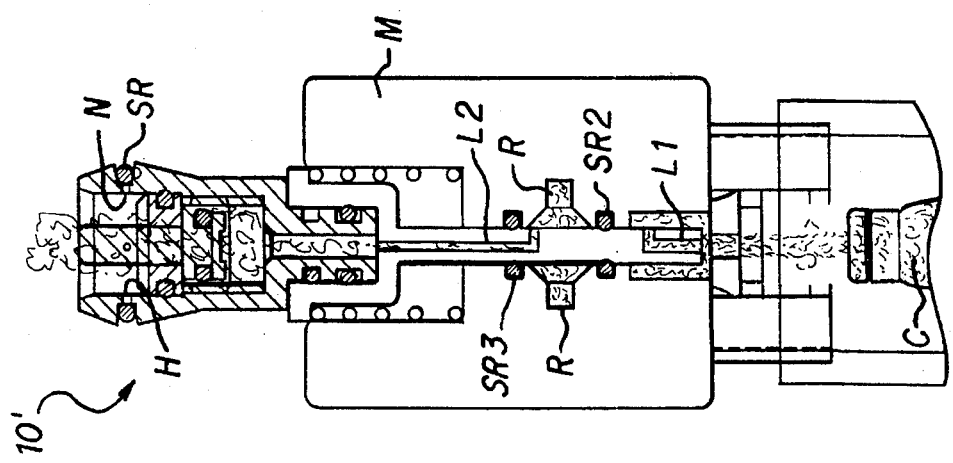
FIGS. 42a–42c are schematic drawings of an alternative embodiment of the inflation device of the present invention.
Figure 42B:
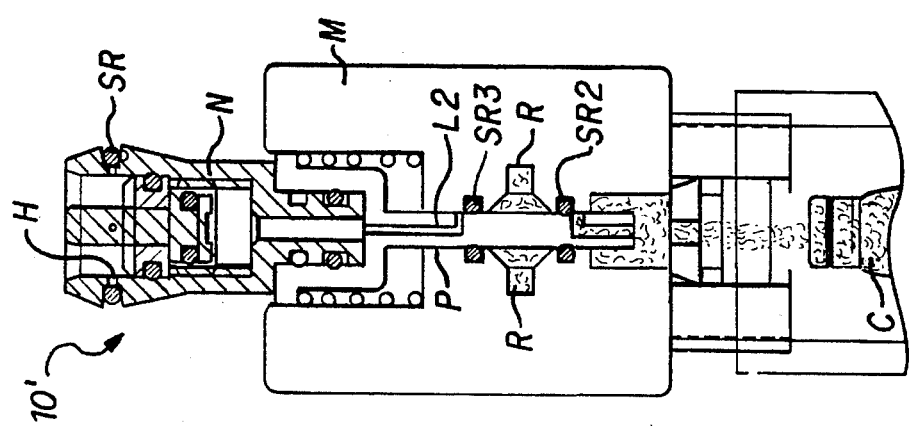
Figure 42A:
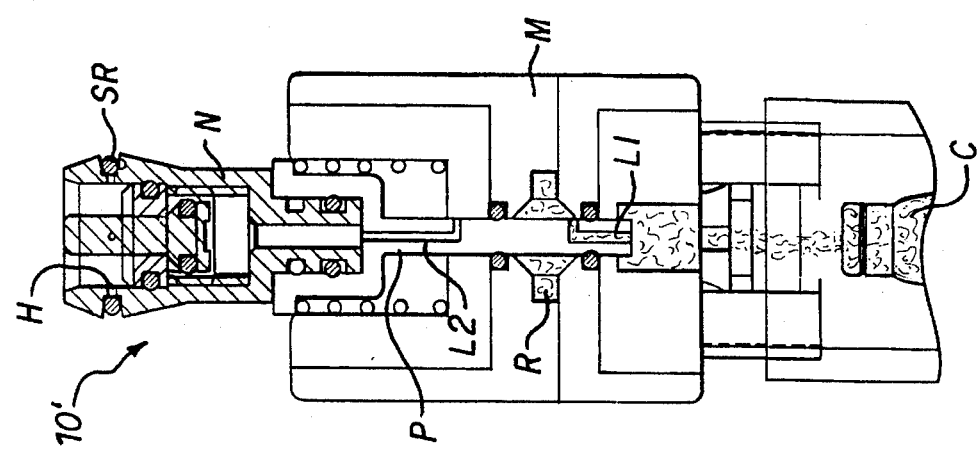

Naturally, the bolus delivery concept of the present invention may be applied to an inflation device having a configuration other than that of the preferred embodiment. One such alternative inflation device is illustrated in FIGS. 42a–42c as 10'. Inflation device 10' is similar to inflation device 10 in that it too includes a canister of pressurized gas C, a reservoir R, a piston P and a nozzle N. The nozzle of device 10' is different from that of device 10, in that the pressure relieving means of the invention consists of a sealing ring SR placed in an exterior annular groove. When the bladder has been inflated to capacity, the gas from canister C flows into several holes H provided in the wall of nozzle N. As the pressure of the excess gas overcomes the resistance of sealing ring SR, the sealing ring is pushed out of the annular groove to allow gas to escape to the atmosphere. Nozzle N of device 10' is also different from the preferred embodiment of the invention in that the nozzle unit is attached directly to the main piston of the device to actuate the same.

It should be noted that the device of FIGS. 42a–42c is not provided with a main valve assembly for controlling the flow of fluid from canister C. Thus, as soon as the canister is punctured, gas flows freely to manifold M of the device.

With reference now to FIG. 42a, operation of inflation device 10' will now be described. As canister C is punctured, gas flows up a lower L-shaped conduit L1 of piston P to reservoir R of the device. At this point, gas is prevented from flowing to nozzle N due to the presence of a second sealing ring SR2 which seals off reservoir R to an upper L-shaped conduit L2. To release the bolus of gas from the reservoir, nozzle N is connected to an inflation port and pressure is applied by the user to depress nozzle N into manifold M. As the nozzle moves rearward, piston P moves downwardly within the main channel of manifold M to reposition lower L-shaped conduit L1 below a second sealing ring SR2 (FIG. 42b). Gas from canister C is now prevented from flowing into reservoir R via lower L-shaped conduit L1. Simultaneously, upper L-shaped conduit L2 is moved below a third sealing ring SR3 and into fluid communication with reservoir R. As upper L-shaped conduit L2 reaches reservoir R, gas flows up the upper L-shaped conduit and out of the nozzle N. After delivering the bolus of gas to the nozzle (and thus the bladder), nozzle N is removed from the inflation port of the bladder. As the pressure applied to nozzle N is relieved, piston P moves back into the position shown in FIG. 42a and lower L-shaped conduit L1 is brought into fluid communication with reservoir R to fill the same with gas from canister C.

A structurally similar device is illustrated in FIG. series 43a–43d. Inflation device 10" is different from the device of FIG. 42 in that it includes a passageway for releasing gas to the atmosphere during the upstroke and downstroke of the piston. Like inflation device 10', gas is allowed to pass to reservoir R as soon as the pressurized canister of gas is punctured (se FIG. 43a). To actuate inflation device 10", nozzle N pushed rearward toward manifold M so that a bolus of gas may be released from the device. As piston P moves downward, lower L-shaped conduit L1 initially passes a first sealing ring SR1 to release gas to the atmosphere via a passageway X (see FIG. 43b). This release of gas to the atmosphere indicates to the user that device has been successfully activated. As the piston moves further downward, lower L-shaped conduit passes a second sealing ring SR2 to prevent additional gas from canister C from reaching reservoir R of the device. Simultaneously, upper L-shaped conduit L2 of piston P moves into fluid communication with reservoir R to allow gas to flow downstream to the nozzle of the device (see FIG. 43c). As the pressure applied to nozzle N is relieved (FIG. 43d), piston P moves upward within its chamber and lower L-shaped channel L1 passes by passageway X to allow an additional shot of gas to escape to the atmosphere. This second shot of gas to the atmosphere indicates to the user that a bolus of gas has been successfully delivered to the nozzle (and thus the bladder) of the device. After passing passageway X, the lower L-shaped conduit moves into fluid communication with reservoir R so that the same may be filled again with a predetermined volume of gas.

Figure 44B:
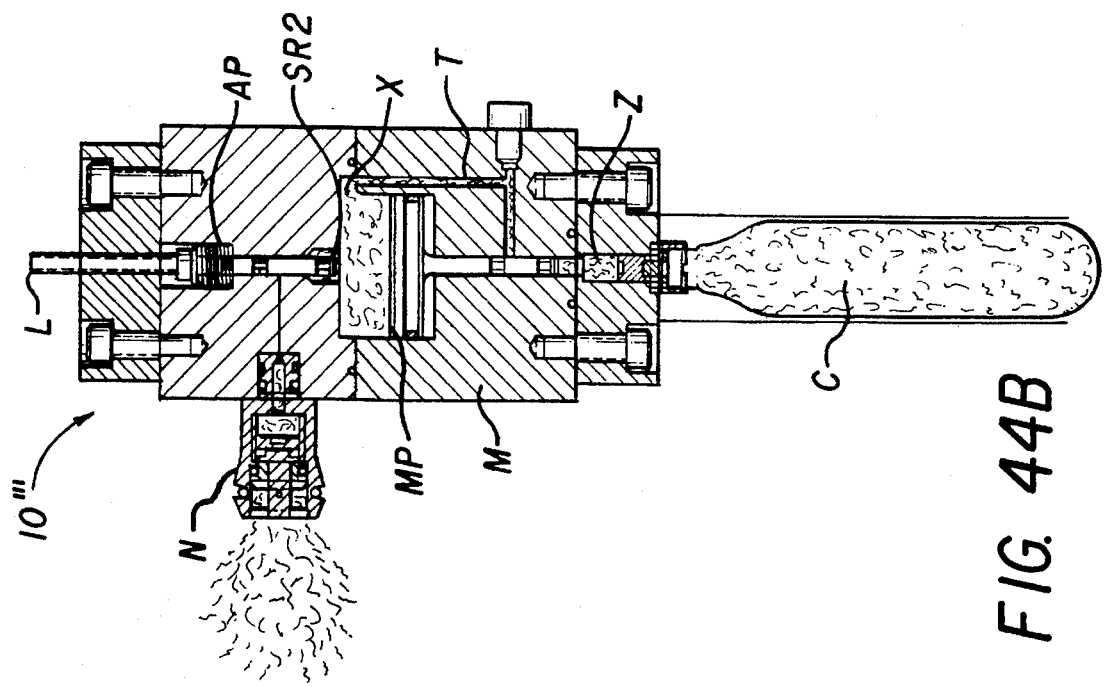
FIGS. 44a–44d are schematic drawings of a third alternative embodiment of the present invention.
Figure 44A:
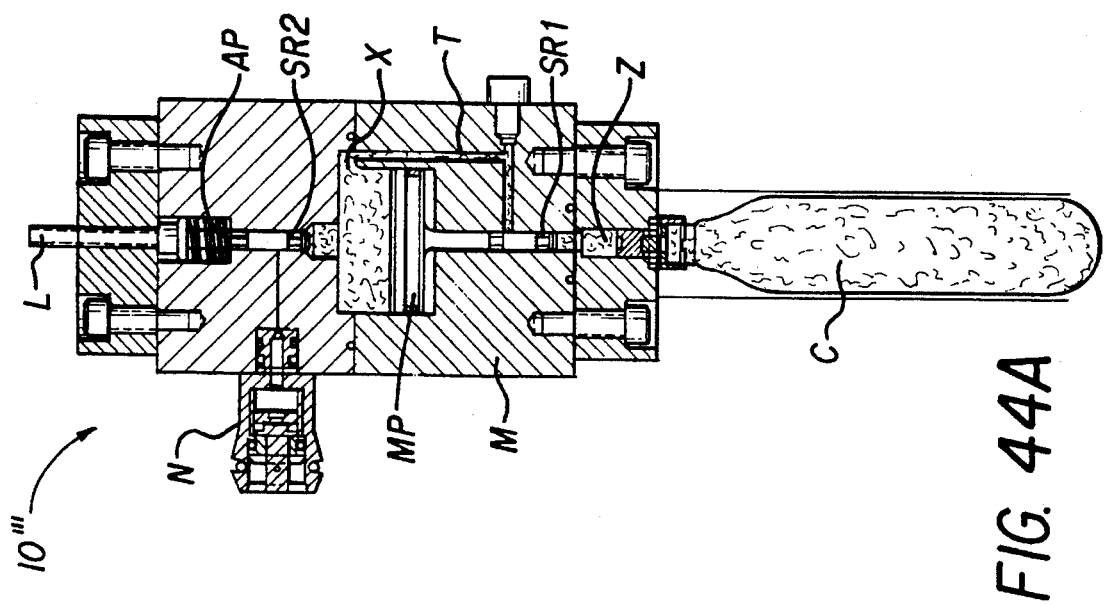
Figure 44D:
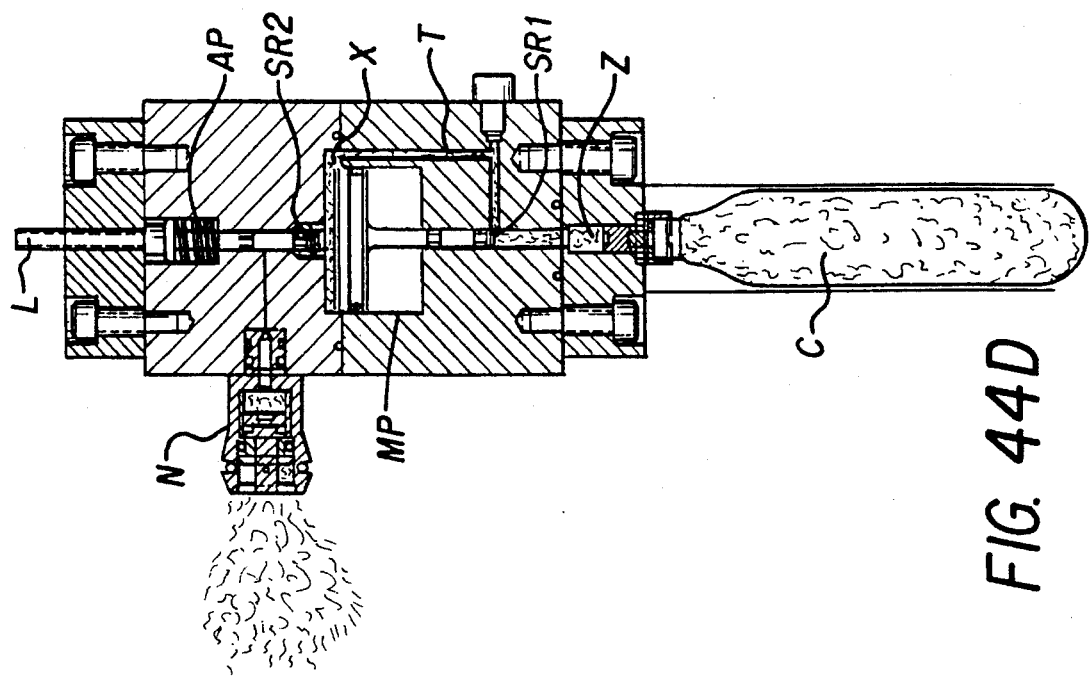
Figure 44C:
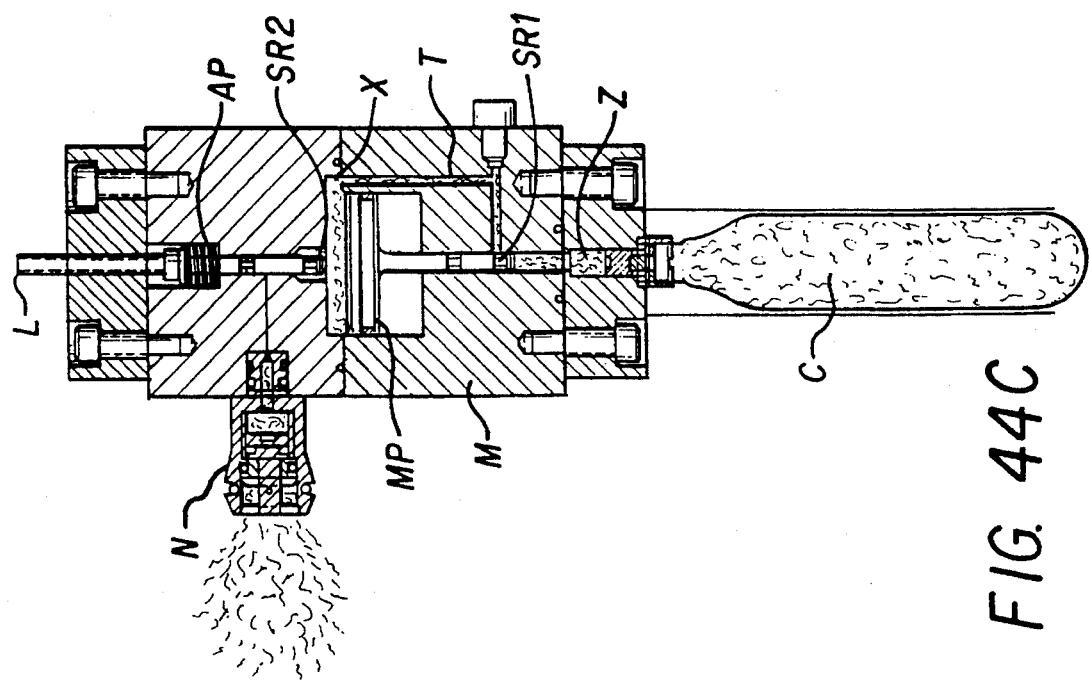

Like the embodiment of the invention shown in FIG. 4, for example, inflation devices 10' and 10" deliver a single metered bolus of gas to the nozzle per each actuation of the device. However, the inflation device of the present invention may be configured to repeatedly deliver a bolus of gas to the nozzle per a single depression of the actuation lever. Such a device is illustrated in FIGS. 44a-44d as inflation device 10'''. With reference now to FIG. 44a, inflation device 10''' includes a canister C, a main piston MP, a lever L, an actuation piston AP, a nozzle N, a chamber X, and a right angled passageway T. Inflation device 10''' does not include a main valve assembly to control the flow of fluid from the canister to the manifold M. Thus, when the canister is punctured, gas is allowed to flow freely to the manifold of the device. When a canister of gas is inserted into device 10''', the canister is punctured and gas flows up a central conduit Z where it then flows into right-angled passageway T. From passageway T, gas flows into chamber X where it proceeds to push main piston MP down. Gas continues to flow into chamber X until the pressure of the gas within the chamber reaches an equilibrium pressure. At this point, the stem of main piston MP is pushed down into the central conduit so that a sealing ring SR1 prevents additional gas from flowing into right-angled passageway T. This state of equilibrium is shown in FIG. 44a. It should be noted that at this stage the lever of the device is in the up position (thus, the device has not been activated by a user). With reference now to FIG. 44b, lever L of device 10''' is depressed. As the lever is depressed, a second set of sealing rings SR2 (positioned on the stem of actuation piston AP) moves down into the passageway above chamber X. As the sealing rings move, gas from within chamber X flows around the stem of the lever piston and to the nozzle N. Simultaneously, main piston MP moves up (FIG. 44c) as the bolus of gas is expelled from chamber X. When chamber X is empty, main piston MP is pushed upward by the pressure of the gas flowing out of canister C. As the pressurized gas pushes main piston MP up, sealing ring SR1 passes above right-angled passageway T to allow gas to flow into chamber X. Gas then expands into chamber X until the main piston is again pushed downward to seal off right-angled passageway L. As passageway T is sealed off, gas flows once again to the nozzle of the device. This bolus delivery cycle is automatically repeated until the force applied to actuation lever L is relieved. As the pressure applied to the lever is relieved (and as the spring about actuation piston AP pushes lever L back up), the pressure within chamber X returns to equilibrium until the next activation of the device.

Although devices 10', 10" and 10''' are not preferred embodiments of the present invention, they are nevertheless capable of creating and delivering a metered bolus of gas to an inflatable bladder, the primary objective of the present invention.

It also contemplated that the device of the present invention may be structured for use with a refillable canister of gas or with a source of pressurized which need not be contained within the confines of the device.

Inflation Port

In another aspect of the present invention, an inflation port for an inflatable bladder is provided. The inflation port of the present invention is permanently affixed to an upper layer of an inflatable bladder by solvent-bonding or radio-frequency (rf) welding. The preferred embodiment of the inflation port of the present invention will now be discussed.

Figure 46:
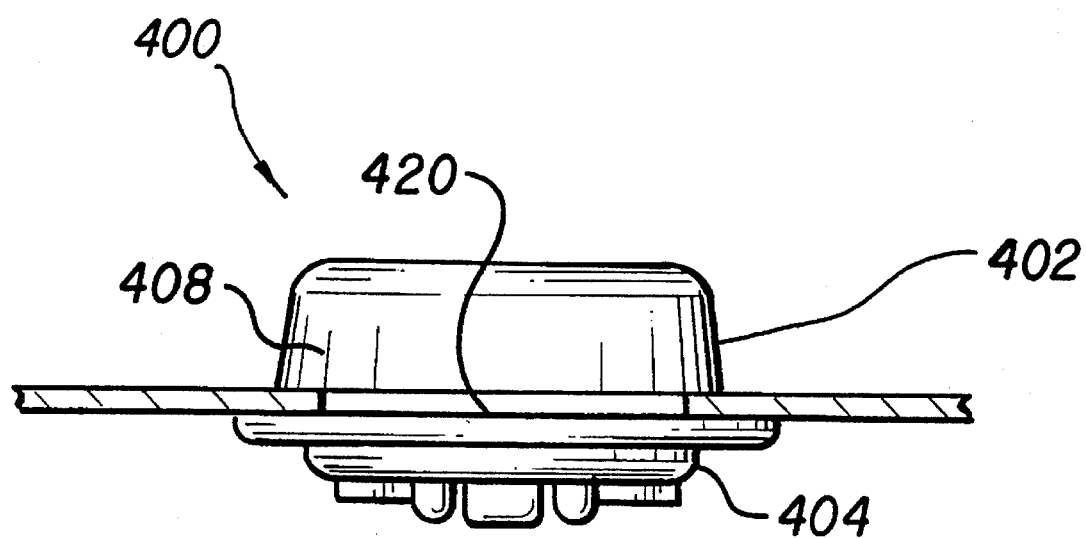
FIG. 46 is a side elevational view of a preferred embodiment of the inflation port of the present invention.
Figure 47:
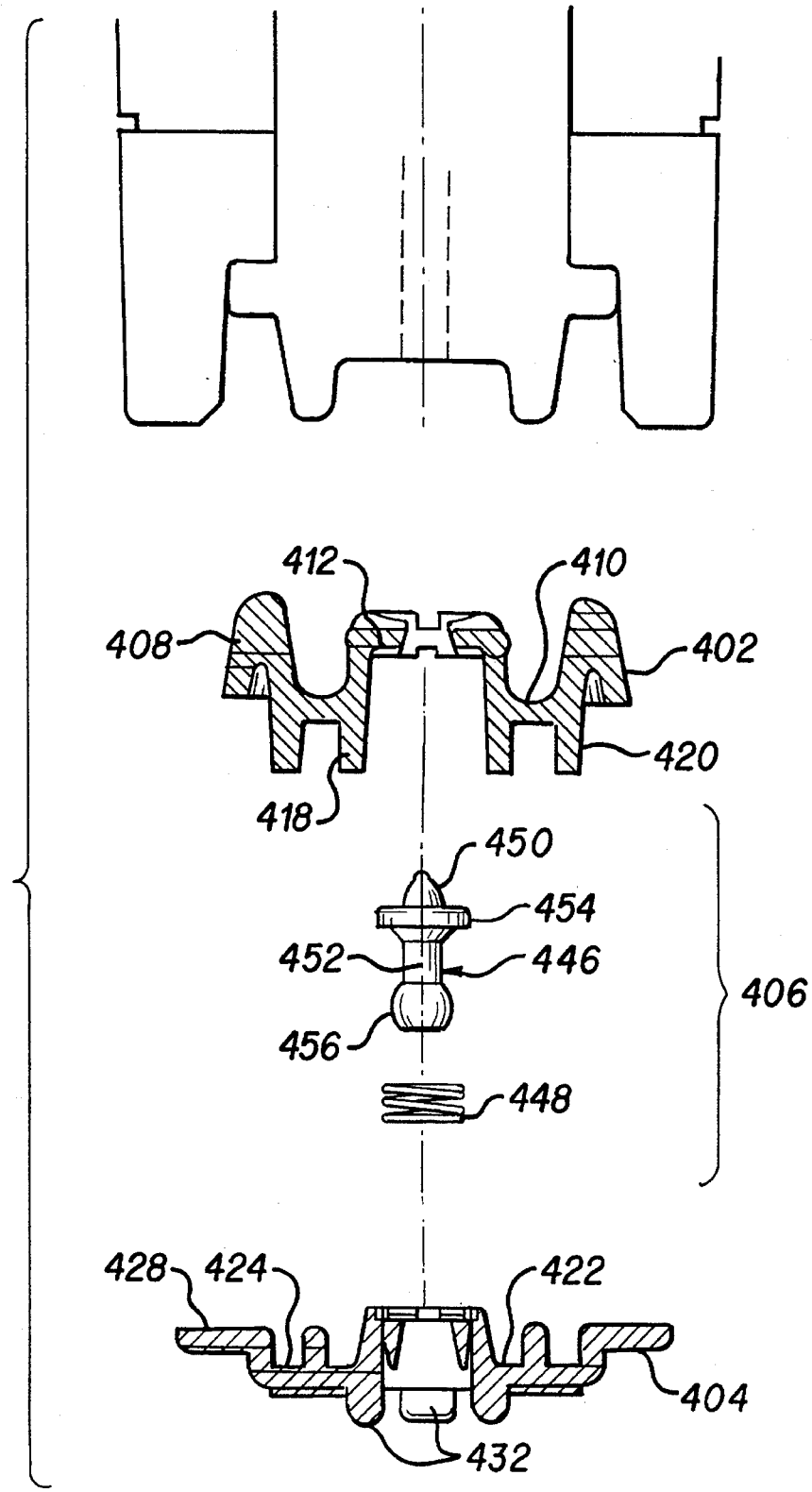
FIG. 47 is an exploded view of the components of the inflation port and internal valve assembly of FIG. 46.
Figure 48:
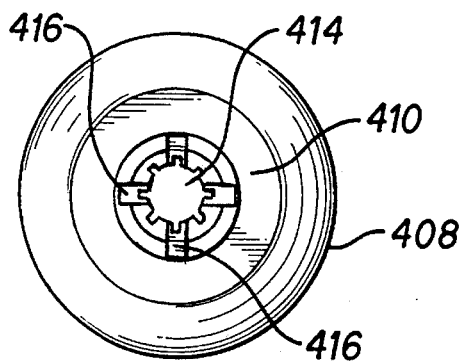
FIG. 48 is a top plan view of the exterior housing of the inflation port.
Figure 49:
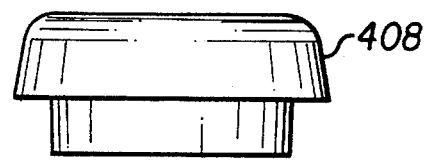
FIG. 49 is a side elevation view thereof.
Figure 50:
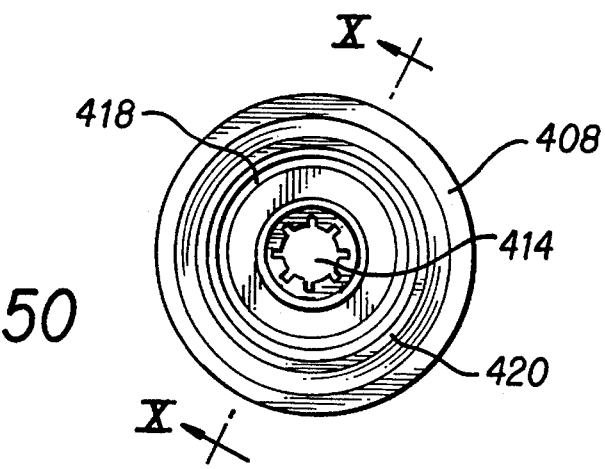
FIG. 50 is a bottom plan view thereof.
Figure 51:
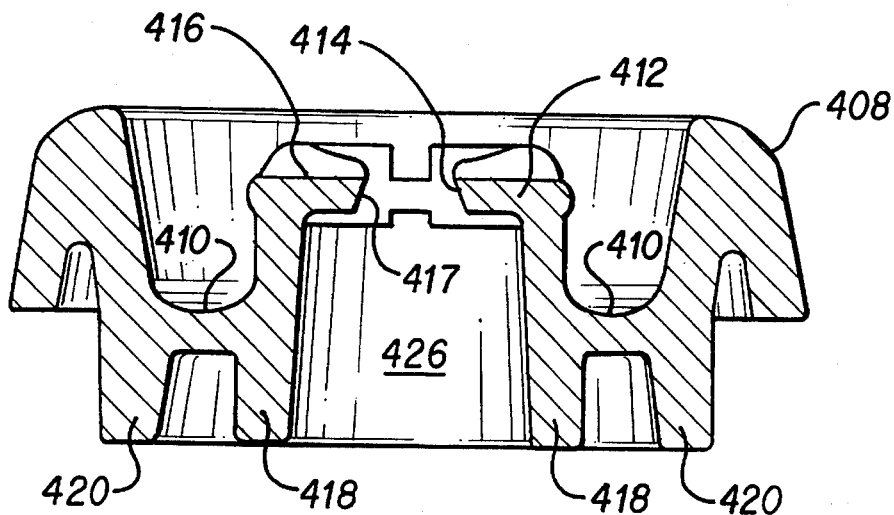
FIG. 51 is cross-sectional view thereof taken along line X—X of FIG. 50.
Figure 53:
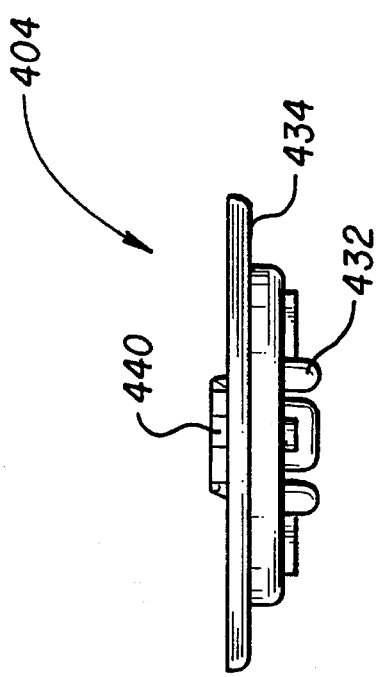
FIG. 53 is a side elevational view thereof.
Figure 54:
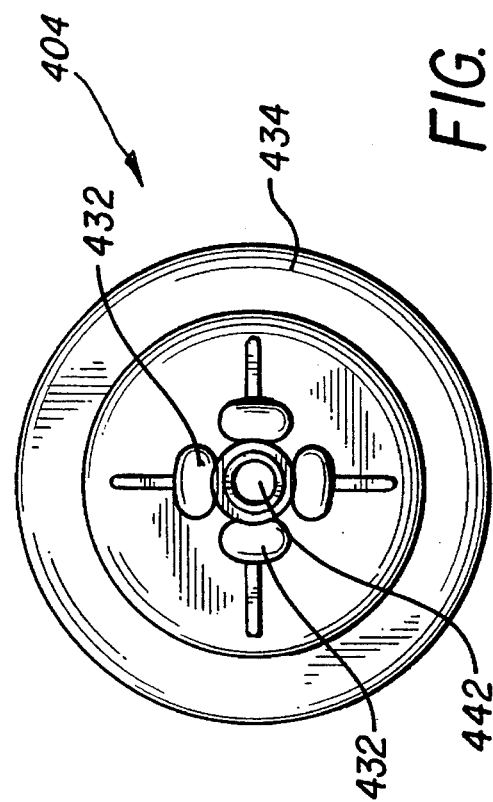
FIG. 54 is a bottom plan view thereof.
Figure 52:
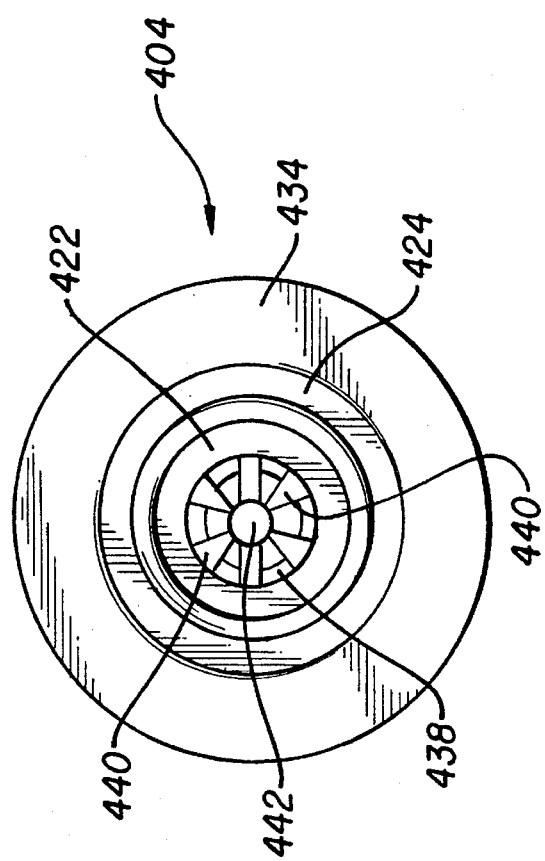
FIG. 52 is a top plan view of the seat of the inflation port of the invention.
Figure 55:
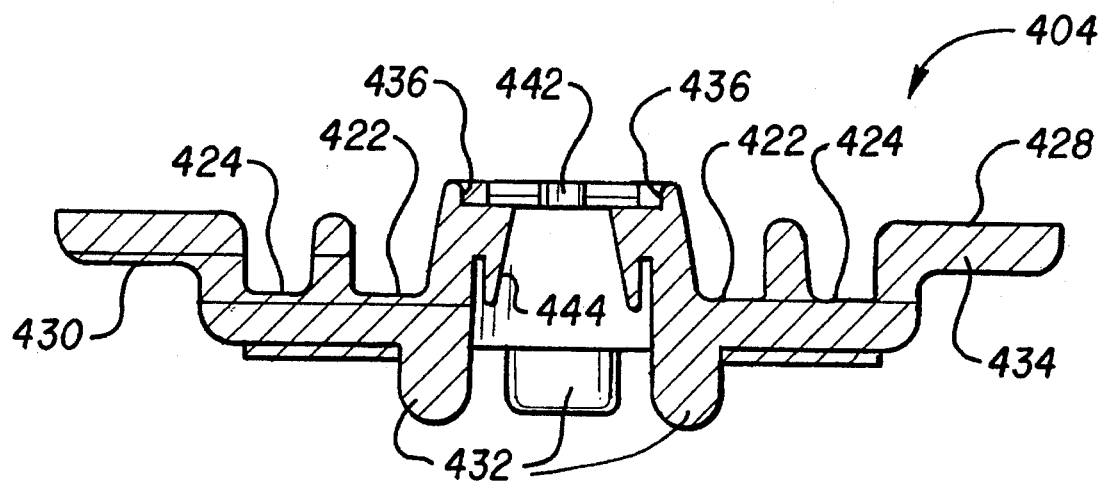
FIG. 55 is cross-sectional view thereof taken along line Y—Y of FIG. 52.

A side elevational view of the inflation port of the present invention is shown in FIG. 46 as element 400. Inflation port 400 functions as a connector for coupling inflation device 10 to an inflatable bladder. Further, inflation port 400 provides a housing for a valve assembly which controls the amount of fluid either entering and exiting the bladder. Inflation port 400 comprises an exterior housing 402, a seat 404 and a valve assembly 406 (FIG. 47). Housing 402 is preferably injection molded from a thermal polyurethane (TPU) such as that sold by Dow Chemical Corporation under the trademark PELLETHANE. With reference now to FIGS. 48–51, housing 402 includes an exterior side wall 408 which is cylindrical in plan. Side wall 408 extends downwardly into the center of housing 402 to define an annular groove 410 which receives extension 226 of nozzle 16 in a fluid tight manner. Within the center of housing 402, a hub 412 is provided. Hub 412 comes into contact with and is depressed by safety pin 202 to open the valve assembly of the inflation port. In addition, hub 412 maintains valve assembly 406 within the confines of the inflation port. Extending through hub 412 is a cog-shaped aperture 414 which allows gas from inflation device 10 to enter and exit the inflation port. The wall 417 of aperture 414 is angled so that it corresponds to the plunger of the valve assembly 406 received therein. Spanning towards aperture 414 are four channels 416 which direct fluid into the aperture of the hub. Although four channels are illustrated, any number of channels may be provided so long as gas is allowed to pass freely into and out of the port. Molded below annular groove 410 are two concentric rings 418 and 420 which mate with two corresponding recessions 422 and 424 of seat 404. The interior of ring 418 defines an open area 426 which receives the component parts of valve assembly 406.

Side wall 408 of housing 402 is angled to engage in a fluid tight manner with the nozzle boot of inflation device 10. Rings 418 and 420 each have a length which enables them to be adequately positioned within recessions 422 and 424 of seat 404. It should be realized by those skilled in the art that the dimensions of housing 402 are dictated by the outer profile of the valve assembly and the inner profile of the nozzle of an inflation device. Therefore, housing 402 may take various dimensions.

Joined to housing 402 (below an aperture provided in the exterior layer of the inflatable bladder) is a seat 404. Seat 404 is preferably injection molded from the same thermal polyurethane used to mold housing 402. With reference now to FIGS. 52–55, seat 404 includes an upper surface 428 and a lower surface 430. Seat 404 is circular in plan and has an outer diameter slightly larger than that of housing 402. Provided on lower surface 430 of seat 404 are four equi-angularly spaced T-shaped bosses 432. Bosses 432 prevent the second (lower) layer of the inflatable bladder from coming into contact with the lower surface of seat 404. Any contact between the lower surface of the seat and the lower layer of the bladder could impede the flow of gas into and out of the bladder.

As mentioned above, upper surface 428 of seat 404 is provided with two concentric recessions 422 and 424 which receive rings 418 and 420 of housing 402. Upper surface 428 also provides a ledge 436 which receives a spring of the valve assembly of the port. Ledge 436 includes six equi-angularly spaced clips 438 which maintain the spring of the valve assembly in the proper position. Located between each clip is a channel 440 which extends inwardly towards a centrally located aperture 442. Aperture 442 is provided so that gas may pass through the seat of the port to the interior of the bladder to inflate the same. Extending below seat 436 is an annular shoulder 444 which mates with the plunger of the valve assembly to close the same. Finally, the outer periphery 434 of seat 404 functions as a sealing rim for attaching seat 404 to the upper layer of the inflatable bladder.

The valve assembly of the inflation port comprises a plunger 446 and a spring 448. With reference now to FIG. 47, plunger 446 includes a cone-shaped head portion 450, a flange 454, a stem portion 452, and a spherical stop member 456. Spring 448 is preferably stainless steel. Plunger 446 may be formed from aluminum or any other rigid material capable of being molded to a particular specification.

The valve assembly is positioned within the inflation port by first placing spring 448 around stem portion 452 of plunger 446 so that the end coil of the spring abuts against flange 454 of the plunger. After positioning the spring about the plunger, the plunger and spring assembly is pushed down through aperture 442 of seat 404. When the spring and plunger are properly positioned, stop member 456 abuts against annular shoulder 444 of seat 404 and spring 448 sits on ledge 436 located inwardly of clips 438. After fitting the valve assembly within seat 404, housing 402 is attached to the seat. As mentioned previously, concentric rings 418 and 420 are placed within concentric recessions 422 and 424 of seat 404 to attach the exterior housing to the seat of the inflation port. The housing is then permanently solvent-bonded to the seat by applying an appropriate amount of solvent to concentric rings 418 and 420 prior to their placement within concentric recessions 422 and 424.

Figure 56:
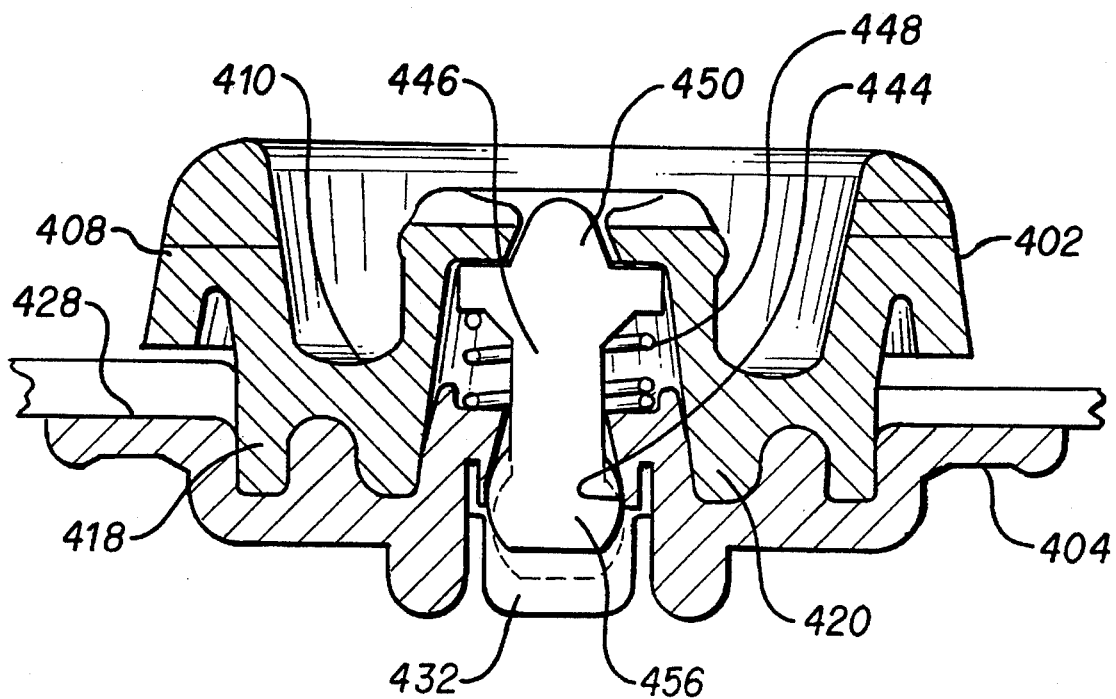
FIG. 56 is cross-sectional view of the inflation port of the present invention.

A cross-sectional view of the assembled inflation port is illustrated in FIG. 56. To inflate the bladder B with gas from the inflation device of the invention, nozzle 16 is coupled to exterior housing 402 of port 400 by guiding extension 226 of nozzle 16 into annular groove 410 (see FIG. 47). As the safety pin of the inflation device contacts the cone-shaped head portion of plunger 446, the plunger is pushed down into interior area 426. As the plunger is depressed into the interior area, stop member 456 of plunger 446 moves away from annular shoulder 444 of seat 404 to open the inflation port (shown in dotted line in FIG. 56). With the inflation port now opened, a bolus of gas from the inflation device enters the port and is guided to aperture 414 of housing 402 via channels 416. As the gas passes through aperture 414 it flows around the stem of the plunger and through aperture 442 of seat 404. From this point, the gas flows around the stop member of the plunger and through the spaces positioned between bosses 432 to inflate the bladder. It should be noted that when the nozzle boot of the inflation device is positioned on port 400, the collar of the nozzle boot engages in a fluid tight manner about side wall 408 of housing 402. This seal is unusually tight in light of the fact that both the nozzle boot and the housing of the inflation port are both formed from elastomeric materials.

When the bladder has been inflated to the desired pressure, the nozzle of the inflation device is removed from the port. As the nozzle is removed, the resistance of spring 448 moves stop member 456 of plunger 446 back into contact with annular shoulder 444 to bias the plunger in the closed position shown in FIG. 56.

The inflation port of the present invention is doubly efficient in that it also functions as a fluid release mechanism. If the user wishes to deflate the bladder, a force (applied by the user's finger, for example) is applied to the exposed head portion of plunger 446. As stop member 456 moves away from annular shoulder 444, gas flows out of the port via apertures 442 and 414. When the desired amount of fluid has been released from the bladder, the force applied to the head portion of the plunger is relieved. As the force is relived, spring 448 pushes the stop member of the plunger back into contact with annular shoulder 444 to bias the plunger in the closed position.

Figure 57:
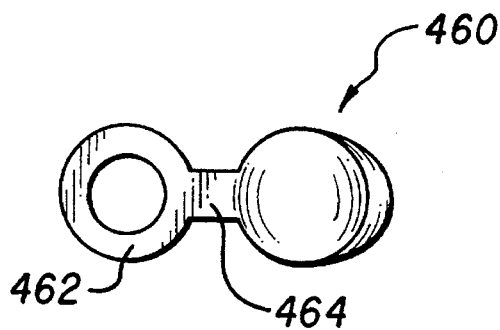
FIG. 57 is a top plan view of a cap for the inflation port.
Figure 58:
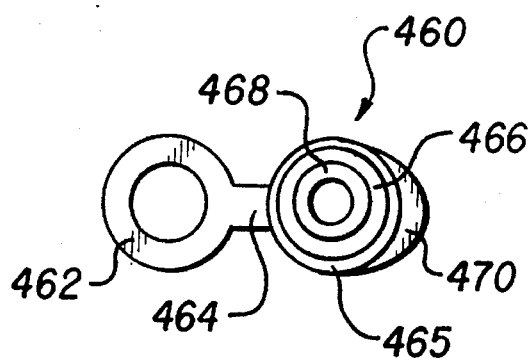
FIG. 58 is a bottom plan view thereof.
Figure 59:
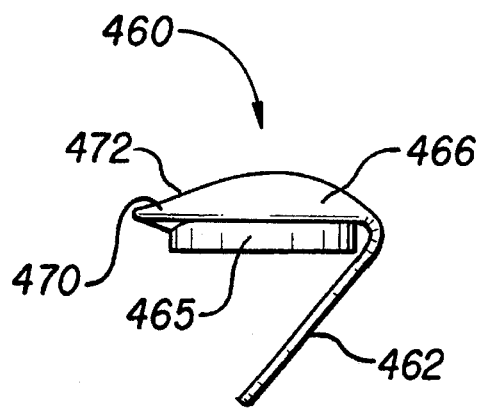
FIG. 59 is a side elevational view thereof.

In an alternative embodiment, the inflation port of the invention may be provided with a cap to 1) prevent dirt and water from interfering with operation of the valve, and 2) prevent unintended deflation of the bladder. With reference now to FIGS. 57, 58, and 59, the cap of the present invention is shown. Cap 460 is preferably injection molded from a thermal polyurethane similar to that used to form inflation port 400. Cap 460 includes an attachment ring 462 which is joined by a tether 464 to a capping body 466. Attachment ring 462 has an inner diameter which is slightly larger than that of ring 420 of exterior housing 402 so that the attachment ring of the cap may be positioned about ring 420. Obviously, the attachment ring of cap 460 is positioned about ring 420 prior to bonding the housing to the seat of the inflation port.

Tether 464 is of a length which allows the capping body to reach the upper surface of exterior housing 402. Further, tether 464 of cap 460 is relatively thin so that the tether is flexible in nature.

Capping body 466 includes an arcuate top surface 472 and an apron 465 which extends about the side wall of exterior housing 402 when the cap is positioned on the port. Along its forward edge, capping body 466 is provided with a lifting tab 470 which assists the user in removing the cap from the exterior housing of the port when removal of the cap is desired. On its undersurface, capping body 466 is provided with a circular extension 468 which is dimensioned to fit within annular groove 410 of exterior housing 402 to maintain the capping body on the inflation port.

Figure 60:
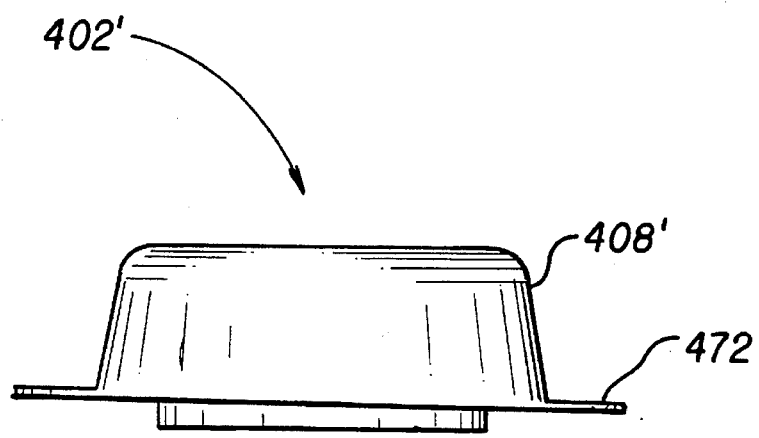
FIG. 60 illustrates an alternate embodiment of the exterior housing of the inflation port.
Figure 61:
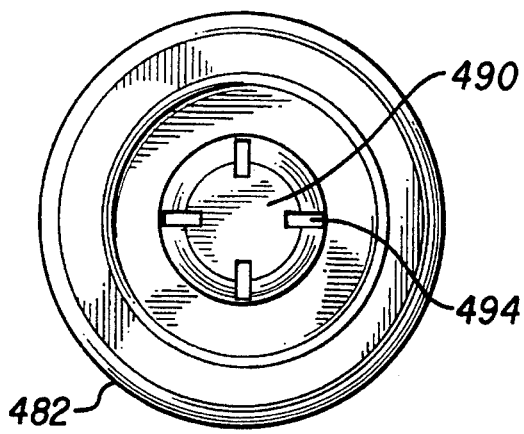
FIG. 61 is a top plan view of another embodiment of a housing element for an inflation port.

In yet another embodiment of the invention, the exterior housing of the port may be attached to the bladder via application of radio frequency (rf) energy. To rf weld the housing of the port to the bladder, however, a welding rim must be provided. FIG. 60 illustrates the rf weldable embodiment of the inflation port. As can be seen from the drawing, provided perpendicular to side wall 408' of housing 402' is a welding rim 472 which extends about the entire outer periphery of the housing. The remainder of housing 402' is structured identical to that of housing 402; thus, housing 402' is attached to the seat of the port in an identical manner. The entire inflation port (including the port and the seat) may then be welded to the bladder via a single application of rf energy. It should be noted that cap 460 is not suitable for use with the rf welded embodiment of the inflation port. This is not to say however, that a cap suitable for use with housing 402' may not be provided.

FIGS. 61–64 illustrate an alternate embodiment of an inflation port for use with the inflation device of the present invention. Similar to inflation port 400, inflation port 480 includes an exterior housing 482 and a seat 484. Both the housing and the seat of the port are preferably molded from the same elastomeric material used to form inflation port 400. Exterior housing 484 includes a side wall 486, an annular groove 488, a top surface 490 and a bottom surface. Unlike housing 402, however, the entire bottom surface of housing 482 sits flush against the upper layer of the inflatable bladder. The top surface of the housing is provided with four rectangular-shaped openings 494 which allow gas to flow into and out of the inflation port. The housing of this embodiment is preferably-solvent bonded to the exterior surface of the bladder.

The valve assembly of port 480 is identical to that of port 400 except that the head portion of the plunger is flat (as opposed to cone-shaped). The flattened head portion of the plunger comes into contact with the top surface of exterior housing 482 when the safety pin of the nozzle comes into contact with the housing.

Figure 62:
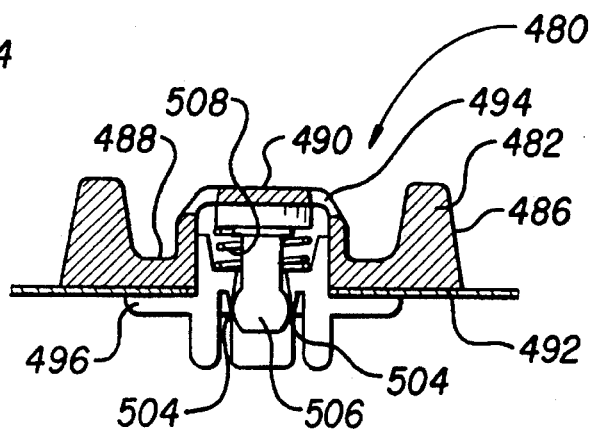
FIG. 62 is a cross-sectional view thereof positioned about the valve assembly of the inflation port.
Figure 63:
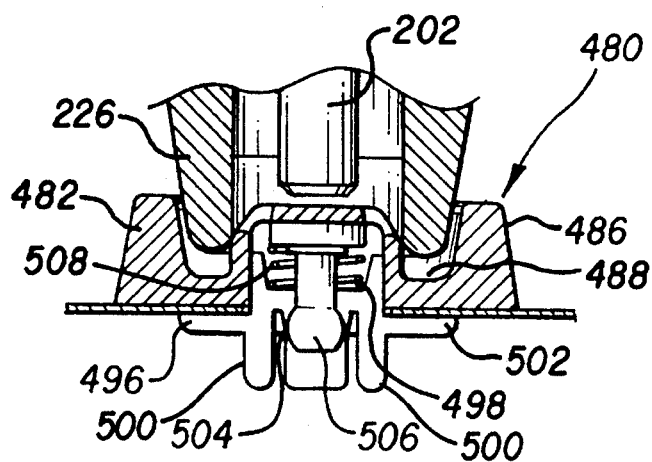
FIG. 63 is a cross-sectional view of the nozzle in contact with the housing element of FIG. 61.
Figure 64:
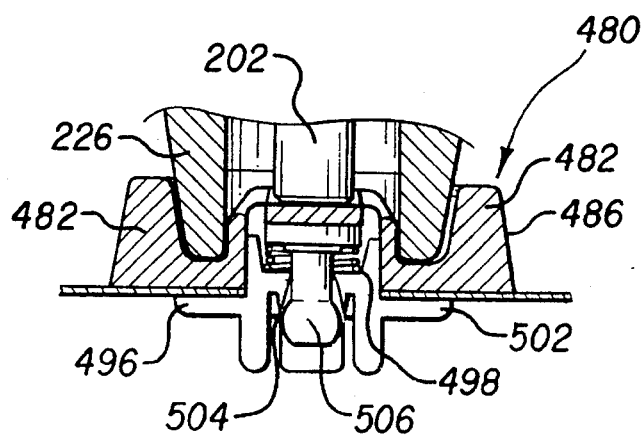
FIG. 64 illustrates the valve assembly of FIG. 62 in an open position.

A seat 496 is positioned beneath the exterior housing of the port to maintain the valve assembly in a proper position. Seat 496 includes a spring seat 498, four spaced bosses 500, an annular shoulder 504 and a welding rim 502 (FIGS. 62 and 63). Port 480 is opened by placing extension 226 of nozzle 16 within groove 488. As the safety pin comes into contact with top surface 490, the underside of top surface 490 pushes the stop member of plunger 506 away from annular shoulder 504. As the stop member is moved away from the shoulder, an open fluid path is created (see FIG. 64). As gas is released from the nozzle, it flows through openings 494 of housing 482 and into the bladder. Upon removing the nozzle from the port, spring 508 pushes plunger 506 back into contact with shoulder 504 to bias the plunger in the closed position. To release gas from the bladder, a force is simply applied by the user to the top surface of the housing to depress the plunger of the valve assembly and open the port.

Figure 65A:
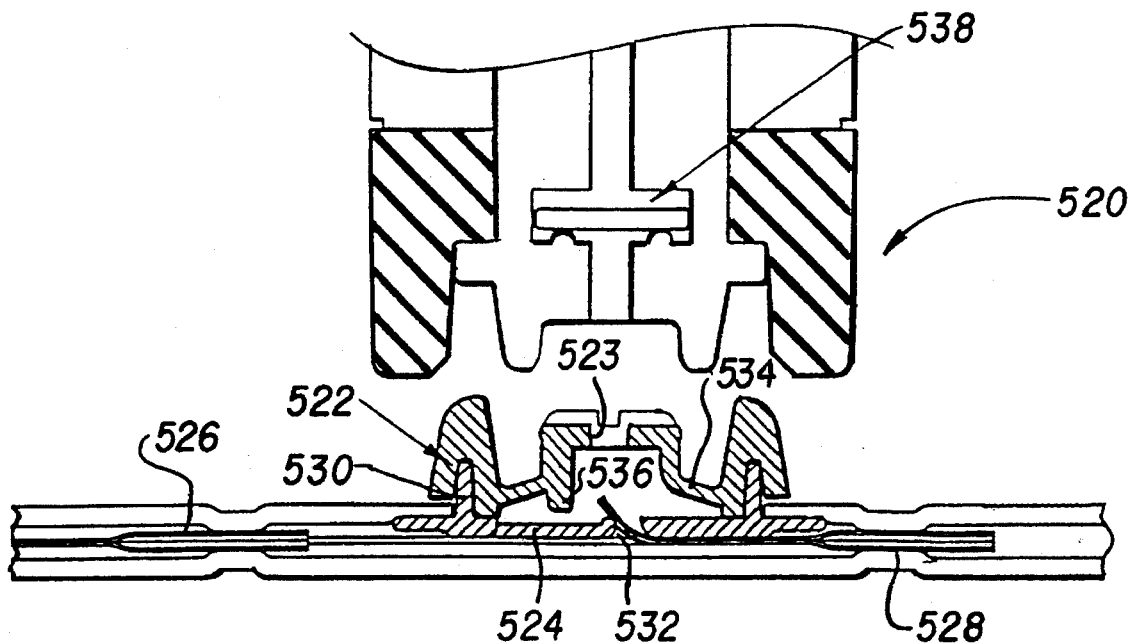
FIG. 65a is a cross-sectional view of the another embodiment of an inflation port.
Figure 65B:
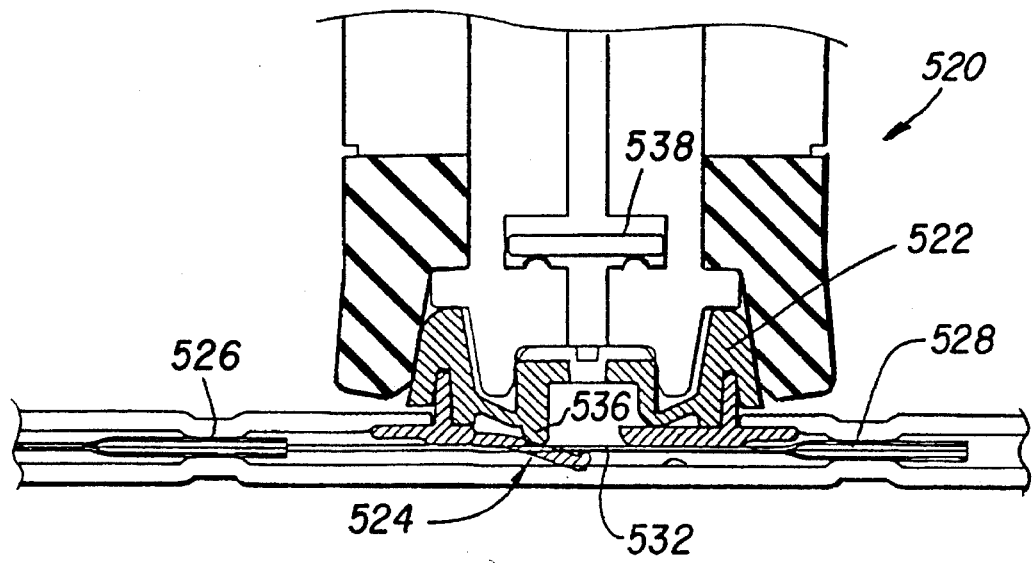
FIG. 65b is a cross-sectional view of the inflation port shown in FIG. 65a in an open position.

Yet another inflation port is illustrated in FIGS. 65a and 65b. This inflation port works in combination with two one-way check valves positioned within the interior of the bladder to control the amount of fluid entering and exiting the bladder. Like the inflation ports described above, inflation port 520 includes a exterior housing 522 and a seat 524. Inflation port 520 is attached to the bladder so that it is upstream of an ingress check valve 526 and downstream of an egress check valve 528. Exterior housing 522 is similar to that of FIG. 61 except that an aperture 523 is centrally located in the top portion thereof. Seat 524 is simplified in construction in that it only includes an extension ring 530 (which mates with housing 522) and a centrally located opening 532.

Unlike the other inflation ports discussed in this application, inflation port 520 does not include a valve assembly comprising a plunger and a spring. Instead, inflation port 520 is positioned within the bladder so that the tail end of exit check valve 528 curves up within opening 532 of seat 524. When the tail end of check valve 528 is curved up into opening 532, the check valve is closed (due to the fact that the fluid path within the valve is pinched).

To inflate a bladder incorporating inflation port 520, an appropriately configured nozzle (that is, one which corresponds to the configuration of exterior housing 522) is positioned about exterior housing 522. As the extension of the nozzle is pressed within groove 534 of housing 522, a post 536 pushes a portion of seat 524 down so that gas may pass therethrough to the ingress check valve 526 of the bladder. Simultaneously, the tail end of exit check valve 528 is straightened. Gas is prevented from flowing out of the port (via exit check valve 528) due to the provision of a third one-way check valve positioned in the nozzle of the device. When the user has inflated the bladder to the desired pressure, the nozzle is removed and post 536 moves away seat 524. As the seat returns to its normal position, the tail end of exit check valve 528 is bent to pinch the fluid pathway of valve 528 and seal the inflating fluid within the bladder.

If the user wishes to deflate the bladder, the user simply applies a force to the top surface of the exterior housing. As the top surface is depressed, post 536 is brought into contact with seat 524 to allow the tail end of exit check valve 528 to straighten and release gas to the atmosphere. When the desired amount of fluid has been released, the force applied by the user is relieved and seat 524 returns to its normal position. As seat 524 moves upward, the tail end of the exit check valve is bent to seal any remaining fluid within the bladder. It should be noted that fluid release via an exit check valve is quite effective, in that fluid may be released from the bladder in somewhat of a metered fashion.

Although fluid may be released from the bladder via the inflation port of the invention, this is not to say that a separate fluid release mechanism may not be provided in combination with any of the inflation ports described above.

Figure 66A:
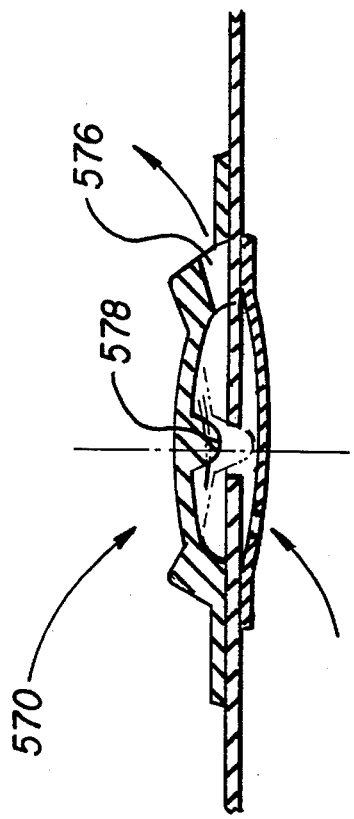
FIG. 66a is a cross-sectional view of a fluid release mechanism of the invention.
Figure 66B:
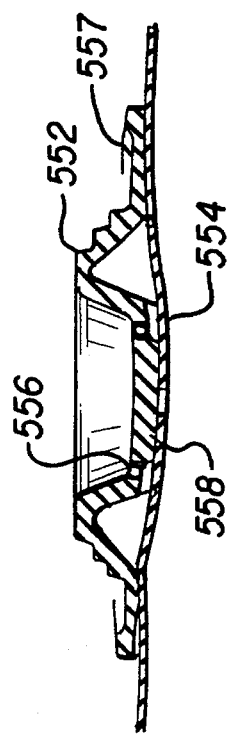
FIG. 66b is a cross-sectional view of the fluid release mechanism of FIG. 66a in the activated position.
Figure 67:
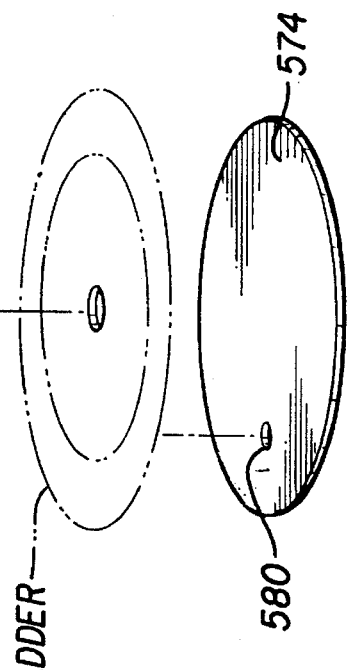
FIG. 67 is an alternate embodiment of a fluid release mechanism.

Alternative devices for releasing fluid from an inflatable bladder are illustrated in FIGS. 66, 67 and 68. With reference now to FIGS. 66a and 66b, a fluid release mechanism 550 of simple construction is illustrated. Fluid release mechanism 550 includes a sealing member 552 which is located above an apertured area 554 of an inflatable bladder. Sealing member 552 is circular in plan and is provided with two fluid escaping apertures 556 and a welding rim 557. The side wall of member 552 is stepped to enhance the flexibility of the release mechanism. On the undersurface of member 552, a plug 558 is provided which rests above the apertured portion 554 to seal fluid within the bladder. When the user wishes to release fluid from the bladder, the user simply applies a force to the side wall of the member to displace plug 558 from the apertured portion of the bladder. As plug 558 moves off the aperture of the bladder, fluid is allowed to exit the bladder via fluid escaping apertures 556. To reseal the bladder, the force applied to the side wall is relieved and plug 558 is automatically repositioned above the apertured portion of the bladder to seal the same.

Another fluid release mechanism of simple construction is illustrated in FIG. 67. Fluid release mechanism 570 comprises a sealing cap 572 and a sealing disk 574. On its side wall, sealing cap 572 is provided with a fluid escaping aperture 576. On its undersurface, cap 572 includes a button 578. Sealing disk 574 is circular in plan and also includes a fluid escaping aperture 580 which is off-set from the fluid escaping aperture of the cap.

As shown in FIG. 67, cap 572 and disk 574 are welded above and below an apertured portion of an inflatable bladder, respectively. To release fluid from the bladder, the user simply applies a force to the top surface of sealing cap 572. As the top surface is depressed, button 578 passes through the apertured portion of the bladder to push sealing disk 547 away from the bladder wall. As sealing disk 574 moves away from the bladder wall, fluid passes through aperture 580, around button 578 and out of fluid escaping aperture 576 to the atmosphere. To reseal the bladder, the user simply relieves the force applied to the cap to bring the sealing disk back into contact with the wall of the bladder. It should be noted that aperture 580 must be off-set from the apertured portion of the bladder in order to avoid interference with the button of the sealing cap.

Figure 68A:
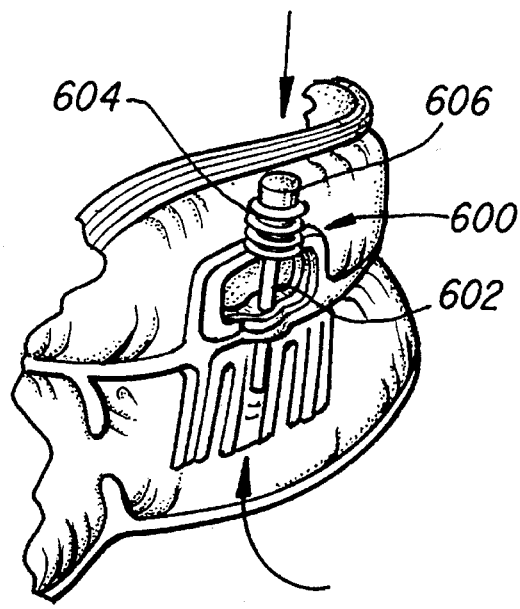
FIG. 68a is another embodiment of a fluid release mechanism.
Figure 68B:
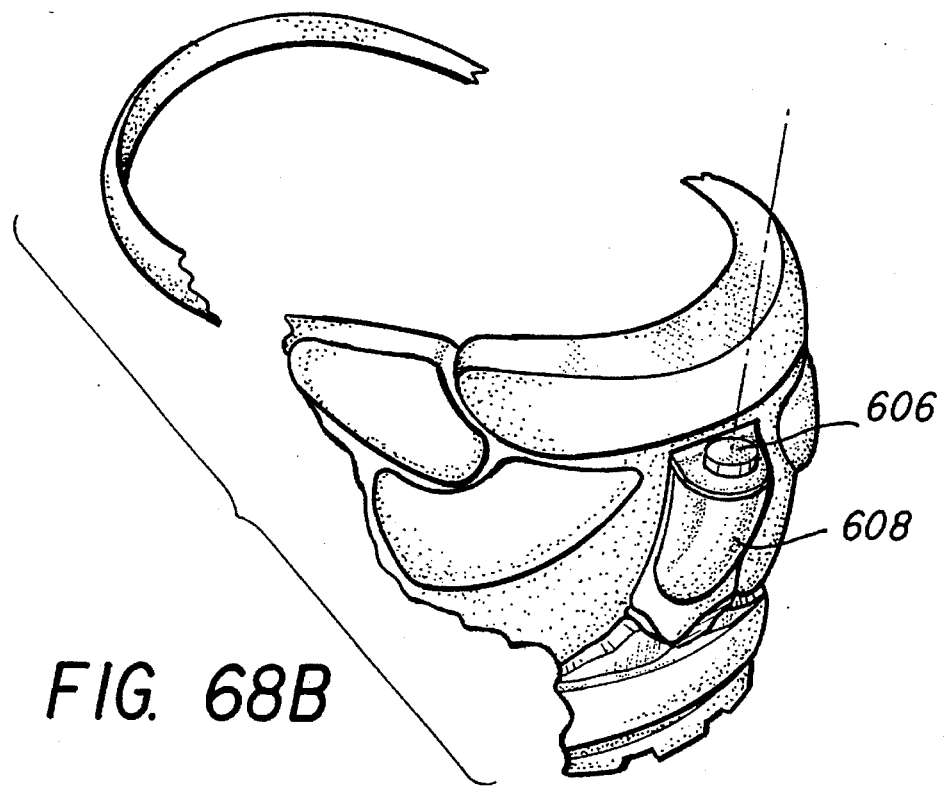

Yet another fluid release mechanism is illustrated in FIGS. 68a and 68b. Fluid release mechanism 600 is similar to that of inflation port 520 in that it is also configured for use with the seal of a one-way check valve. As illustrated in FIG. 68a, fluid release mechanism 600 comprises a hollow pin 602, a spring 604, and a cap 606. Spring 604 is employed to bias pin 602 in an up position which corresponds to a closed or sealed bladder. To release fluid from the bladder, the user applies a force (in the direction of the arrow) to cap 606 to push hollow pin 602 into a one-way check valve of the bladder. As pin 602 penetrates the seal of the check valve, fluid is released to the atmosphere. To reseal the bladder, the user relieves the force applied to the cap. A housing for protecting fluid release mechanism 600 is shown in FIG. 68b as element 608. Housing 608 may be formed from any rigid plastic.

Needle Adaptor

Figure 69:
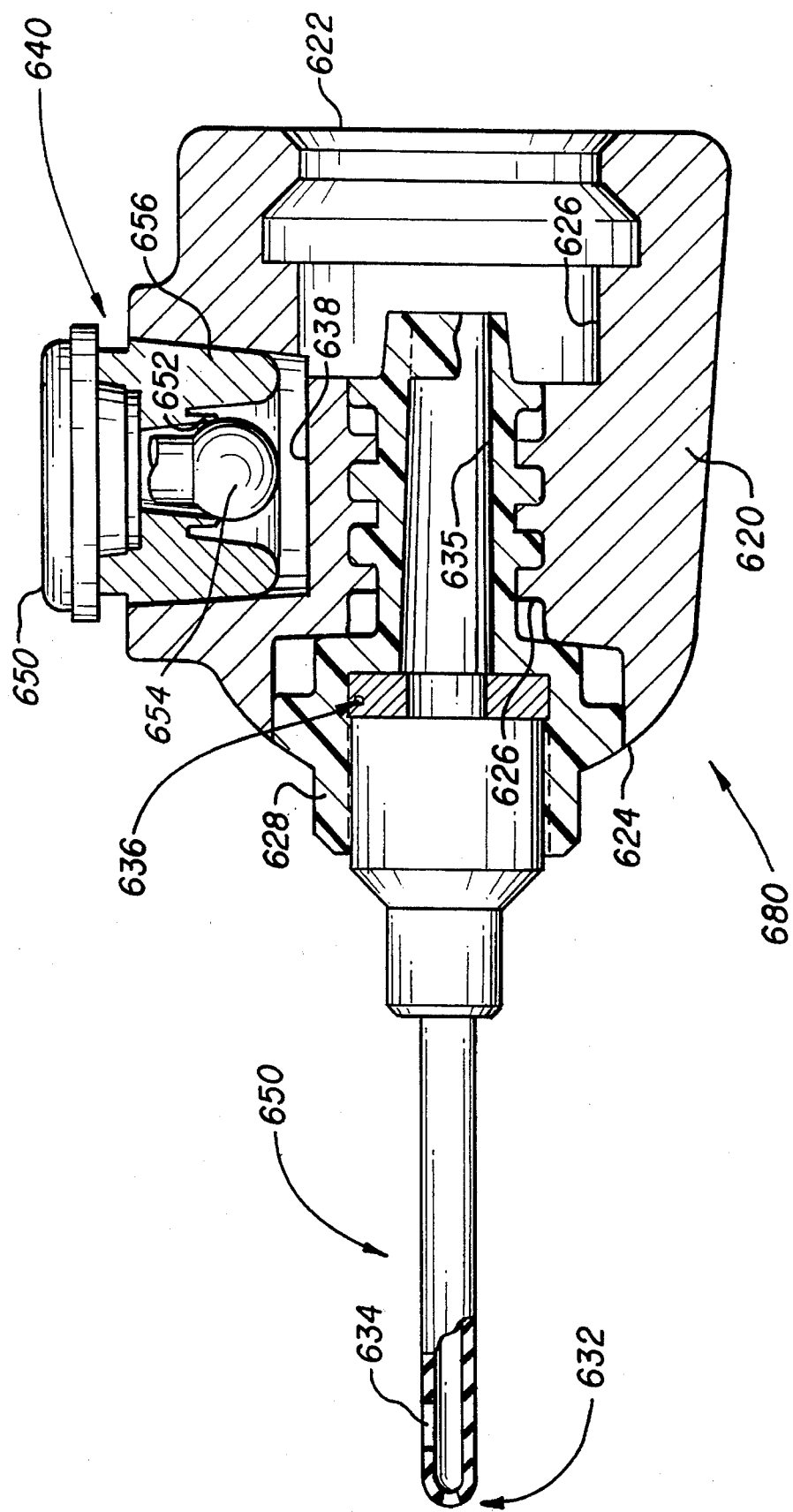
FIG. 69 is a cross-sectional view of a needle adaptor for the nozzle of the inflation device of the present invention.

In another aspect of the invention, the nozzle of inflation device 10 may be fitted with an adaptor which houses a hollow inflating needle for inflating various inflatable articles of manufacture including athletic shoes, sports balls, rafts, etc. Such an adapter is illustrated in FIG. 69 as element 680.

Adaptor 680 includes an elastomeric housing 620 which defines a proximal end 622 and a distal end 624. Extending between proximal end 622 and distal end 624 is a passageway 626 of varying diameter. Proximal end 622 is dimensioned to be snap fit onto the end of nozzle 16 of inflation device 10. Threaded or compression fit into distal end 624 is a needle hub 628 which supports a hollow inflating needle 630 having a rounded, non-piercing tip 632. Throughout its length, needle hub 628 includes a lumen 635 for transferring gas from the nozzle to needle 630. Along the side of needle 630, an aperture 634 is provided which allows gas to pass from needle 630 to an inflatable bladder. A seal 636 is fit within needle hub 628 to prevent unwanted leakage of gas around the needle hub.

Formed perpendicular to passageway 626 is a chamber 638 which receives a fluid release mechanism 640 for adaptor 680. Release mechanism 640 includes an actuator button 650 and a fitting 656 which receives a plunger 654. Chamber 638 and passageway 626 are in fluid communication to allow the release of gas from adaptor 680 when the fluid release mechanism is activated. Fluid release mechanism 640 is normally biased in a closed position (as shown in FIG. 69) by a spring (not shown) which maintains plunger 654 in intimate contact with a shoulder 652 of fitting 656. When plunger 654 is in contact with shoulder 652, gas is prevented from exiting fluid release mechanism 640. Operation of release mechanism 640 will be discussed in more detail below.

Adaptor 680 may be used to inflate any inflatable article of manufacture incorporating an elastomeric needle-type valve. More particularly, adaptor 680 may be used to inflate an inflatable bladder incorporating a novel sealing "gland." Such a gland may be incorporated into any type of inflatable article of manufacture including inflatable athletic shoes, weight belts, helmets, rafts, etc.

Inflation Gland

Figure 70:
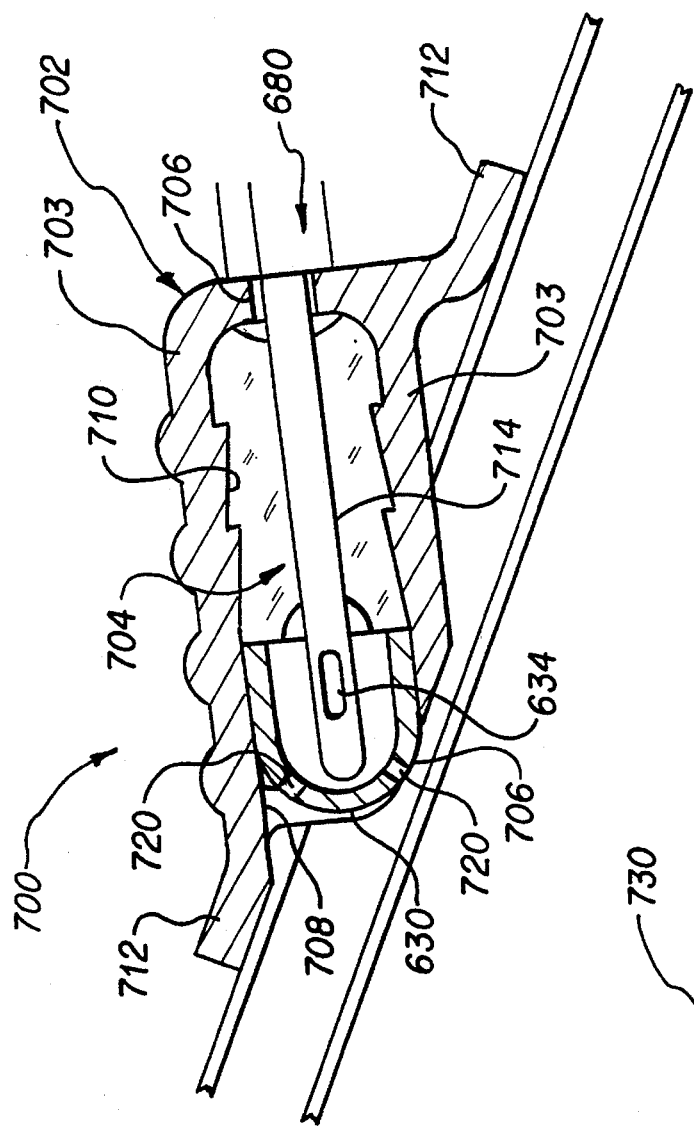
FIG. 70 is a cross-sectional view of an inflation gland.

With reference now to FIG. 70, gland 700 of the present invention is shown. Gland 700 includes a housing 702, a valve 704, and a needle stop 706. Housing 702 is preferably injection molded from a thermoplastic material such as KRATON™, available from Shell Chemical Company. Other thermoplastic materials capable of being ultrasonically welded to a thermoplastic bladder may also be used to form housing 702. In the embodiment of FIG. 70, the housing of gland 700 is generally rectangular shaped. However, housing 702 may take any other shape, such as cylindrical, square, etc.

Housing 702 includes a wall 704 which defines an inlet 706, an outlet 708 and a hollow interior area 710. Extending along the edge of housing 702 is a rim 712 for welding gland 700 to an inflatable bladder.

Positioned within interior area 710 is a valve 704. Valve 704 is preferably molded from rubber or any other elastomeric material which is capable of conforming about the exterior of needle 630. Valve 704 is provided with a centrally-disposed, longitudinally extending passageway 714 which is capable of conforming about the exterior of needle 630 to prevent leakage of gas to the atmosphere. Solvent bonded (or otherwise secured) within outlet 708 of gland 700 is a cup-shaped needle stop 706. Needle stop 706 includes an open upper portion 718 and a rounded bottom portion 716 which prevents needle 630 from puncturing the components of the bladder. Needle stop 706 is provided with a plurality of apertures 720 which allow fluid to pass to the inflatable bladder. In the preferred embodiment, needle stop 706 is injection molded from an elastomeric material such as urethane. Needle stop 706 is preferably harder than valve 704 to provide the user with a tactile sensation of reaching a positive stop when the needle of the adaptor is inserted within the gland.

Gland 700 is preferably set within an inflatable bladder at an angle of approximately 26° so that needle 630 may be fully inserted into the gland. To attach gland 700 to an inflatable bladder, the gland is positioned within an opening (slightly larger than housing 702) so that rim 712 rests on top of the outermost layer of the bladder. When the gland is properly positioned, needle stop 706 rests within the chamber of the bladder while inlet 706 of housing 702 is exterior to the bladder (See FIG. 71). After properly positioning the gland within the bladder, rf energy is applied to the rim of the housing to permanently weld the gland to the bladder.

To inflate a bladder using adaptor 680, needle 630 is inserted into inlet 706 of gland 700 (FIG. 72) and pushed through passageway 714 of valve 704 until the tip of needle 630 abuts against needle stop 706. When the needle is fully inserted within the gland, the inflation device is fired, and a bolus of gas passes through the adaptor to needle 630. (Gas is prevented from escaping to the atmosphere via fluid release mechanism 640, due to the fact that mechanism 640 is biased in the closed position.) Gas from inflation device 10 exits needle 630 through aperture 634 formed near the tip of the needle. As gas flows from the needle, it enters needle stop 706 and escapes therefrom to the bladder via apertures 720. The user continues to deliver a bolus of gas to the bladder until the desired pressure is obtained. After reaching the desired pressure, needle 630 is removed from gland 700. As needle 630 is removed, passageway 714 of valve 704 automatically seals to prevent fluid from leaking out of the bladder.

Although fluid may be released from the bladder using any of the fluid release mechanisms illustrated in FIGS. 66, 67 or 68, fluid may also be released from the bladder through gland 700 via fluid release mechanism 640 of adaptor 680. To deflate a bladder, needle 630 is inserted into gland 700 until the tip of needle 630 abuts against needle stop 706. With the needle properly positioned, gas may be released from the bladder by applying a force to button 650 of release mechanism 640 (FIG. 69). As a force is applied to button 650, plunger 654 moves away from shoulder 652 of fitting 656 to create an open passageway to the atmosphere. Thus, as the release mechanism opens, gas from within the bladder flows into gland 700, up into needle 630 through passageway 626 and chamber 638 and out to the atmosphere via an exit passageway beneath button 650 (not shown). When the desired amount of gas has been released from the bladder, the pressure on button 650 is released.

Figure 71:
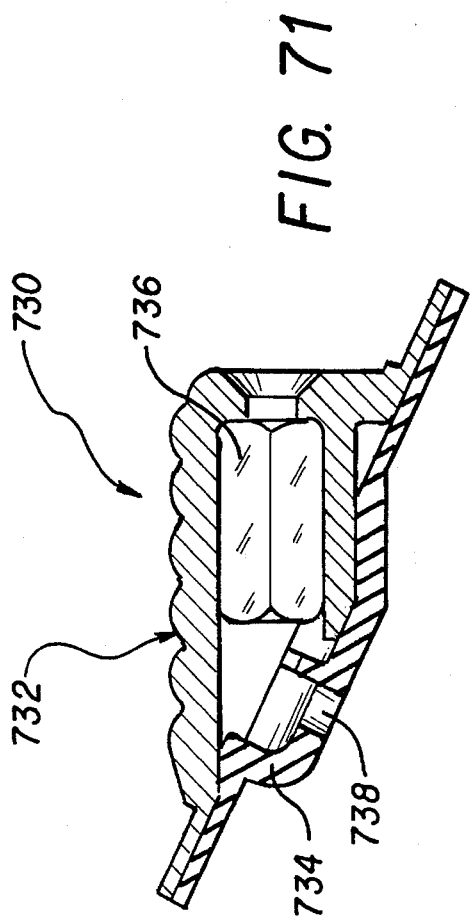
FIG. 71 is a cross-sectional view of an alternative inflation gland.

Alternative inflation glands for use with adaptor 680 are illustrated in FIGS. 71, 72, and 73. FIG. 71 shows an inflation gland 730 having a housing 732 and a needle stop 734 which are rf welded to the outermost layer of the bladder. Thus, no solvents are required to assemble the component parts of the gland. Like gland 700, gland 730 includes a valve 736 and fluid apertures 738 which allows gas to pass into and out of the bladder.

FIG. 72 illustrates another inflation gland 740 wherein the housing of the gland is rf welded to the needle stop. Unlike gland 730, however, gland 740 need not be positioned within the chamber of the bladder. Instead, a tube 742 is fit into an outlet 744 of needle stop 741 and connected to an inlet formed within the bladder so that the gland may be remotely positioned with respect to the bladder. Inflation gland 740 may be stitched to the inflatable article of manufacture (through stitching edge 746) at any suitable location.

Still another inflation gland which may be stitched to an inflatable article of manufacture is shown in FIG. 73. Inflation gland 750 is unlike glands 700, 730, and 740 in that housing 752 is dome-shaped. Formed beneath the outer domed surface is a cylindrical chamber 754 which receives an elastomeric valve 756 for conforming about the exterior of inflating needle 630. Welded to the bottom of housing 752 is a needle stop 758 which defines an outlet 760 for receiving a tube for transporting gas to an inflatable bladder. To attach gland 750 to an inflatable article of manufacture, the gland is stitched to the article through stitching edge 762 at a desired location.

While the present invention has been disclosed in connection with the preferred embodiment thereof, it should be understood that there are other embodiments which fall within the spirit and scope of the invention as defined by the following claims.

We claim:

1. An inflation device, comprising:
   a source of pressurized gas;
   a head unit, said head unit including an inlet and an outlet and a passageway extending between said inlet and said outlet;
   a housing for maintaining said source of pressurized gas in fluid communication with said inlet of said head unit;
   a nozzle in fluid communication with said outlet of said head unit such that a fluid pathway is established therebetween; and
   a means for creating and delivering a predetermined bolus of gas to said nozzle, said means being disposed within said head unit.

2. The inflation device of claim 1, wherein said head unit further comprises a means for relieving a build-up of excess pressure within said inflation device.

3. The inflation device of claim 2, wherein said means for relieving a build-up of excess pressure comprises a poppet, a spring, and a plug.

4. The inflation device of claim 1 further comprising a means for indicating to the user successful delivery of a bolus of gas to said nozzle of said inflation device.

5. The inflation device of claim 1, wherein said means for creating and delivering a bolus of gas to said nozzle comprises a sleeve positioned within said passageway of said head unit, a piston housed within said sleeve, a spring positioned in contact with said piston, and a reservoir which accommodates a predetermined quantity of gas.

6. The inflation device of claim 5, wherein said head unit is permanently attached to said nozzle by application of ultrasonic energy.

7. The inflation device of claim 6, wherein said head unit, said nozzle, and said housing are injection molded from a glass-filled plastic.

8. The inflation device of claim 5 further comprising a lever for actuating said inflation device, said lever being actuated by pinching said lever between a thumb and an index finger of a user's hand.

9. The inflation device of claim 8, wherein said lever of said inflation device is in direct contact with an actuation piston disposed within said head unit.

10. The inflation device of claim 9, wherein said actuation piston is in contact with a valve assembly for controlling the flow of fluid from said source of pressurized gas to said head unit when said lever of said device has been actuated.

11. The inflation device of claim 10, wherein said valve assembly comprises a sealing ring, a ball, and a spring.

12. The inflation device of claim 5, wherein said piston moves within said sleeve of said head unit to direct fluid to said reservoir.

13. The inflation device of claim 12, wherein when said fluid is directed to said reservoir, said fluid pathway between said head unit and said nozzle is momentarily closed.

14. The inflation device of claim 5 further comprising a safety pin which prevents the release of gas from said device when said nozzle of said device is not coupled to an inflation valve of an inflatable bladder.

15. The inflation device of claim 14, wherein said safety pin is housed within said nozzle.

16. The inflation device of claim 5 further comprising a collar which engages in a fluid-tight manner with an inflation valve of an inflatable bladder to prevent unwanted leakage of gas.

17. The inflation device of claim 16, wherein said collar is disposed about said nozzle of said inflation device.

18. The inflation device of claim 16, wherein said collar is formed from an elastomeric material.

19. The inflation device of claim 1 further comprising an adaptor which may be attached to said nozzle of said inflation device, said adaptor including a needle for inflating an inflatable bladder comprising an elastomeric inflating valve.

20. The inflation device of claim 1, wherein said bolus of gas is a single metered quantity of gas.

21. An inflation system, comprising:

a bladder comprised of an exterior layer and an interior layer;

an inflation port attached to said exterior layer of said bladder, said inflation port comprising an exterior housing, a seat, and a valve assembly for controlling fluid flow into and out of said inflation port;

an inflation device, said inflation device comprising a canister of pressurized gas, a head unit, a housing for maintaining said canister of pressurized gas in fluid communication with said head unit, and a nozzle, said head unit including a means for creating and delivering a predetermined metered quantity of gas to said nozzle of said device.

22. The inflation system of claim 21, wherein said inflation device further comprises a means for relieving a build-up of excess pressure within said device.

23. The inflation system of claim 22, wherein said means for relieving a build-up of excess pressure comprises a poppet, a spring and a plug.

24. The inflation system of claim 22, wherein said inflation device further comprises a means for audibly indicating to the user that said metered volume of gas has been successfully deliver to said nozzle.

25. The inflation system of claim 24, wherein said inflation device comprises a safety pin which comes into contact with said exterior housing of said inflation port to open said nozzle of said inflation device.

26. The inflation system of claim 25, wherein said bladder is incorporated into an athletic shoe.

27. An inflation device, comprising:

a source of pressurized gas;

an inflating head, said inflating head defining an inlet, an outlet and a fluid passageway extending between said inlet and, said outlet, said fluid passageway having an area which defines a reservoir for receiving a predetermined quantity of gas from said source of pressurized gas;

a nozzle in fluid communication with said outlet of said inflating head, said nozzle being connectable to a valve of an inflatable article of manufacture; and a housing for receiving said source of pressurized gas, said housing being detachably connected to said outlet of said inflating head, said inflating head having a first valve assembly positioned within said fluid passageway upstream of said reservoir for controlling the flow of gas from said source of pressurized gas to said reservoir, and a second valve assembly positioned within said fluid passageway downstream of said reservoir for controlling the flow of fluid between said reservoir and said nozzle, said second valve assembly being normally biased in a closed position to prevent gas from flowing downstream to said nozzle and out of said device while said reservoir is receiving pressurized gas from said source, said second valve assembly being moveable to an open position when the gas within said reservoir reaches a predetermined pressure, wherein when said second valve assembly opens, said predetermined quantity of gas flows from said reservoir to said nozzle to inflate the inflatable article of manufacture.

28. The inflation device of claim 27, wherein said second valve assembly comprises a sleeve, a piston positioned within said sleeve, and a spring.

29. The inflation device of claim 27, wherein said first valve assembly comprises a sealing ring, a valve ball and a spring.

* * * * *